United States Patent
Zhou et al.

(10) Patent No.: US 12,047,790 B2
(45) Date of Patent: Jul. 23, 2024

(54) INDICATION OF USER EQUIPMENT CAPABILITY FOR BEAM FAILURE DETECTION AND BEAM MANAGEMENT

(71) Applicant: QUALCOMM Incorporated, San Diego, CA (US)

(72) Inventors: Yan Zhou, San Diego, CA (US); Lei Xiao, San Jose, CA (US); Ruhua He, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 17/088,836

(22) Filed: Nov. 4, 2020

(65) Prior Publication Data

US 2021/0144569 A1 May 13, 2021

Related U.S. Application Data

(60) Provisional application No. 62/933,236, filed on Nov. 8, 2019.

(51) Int. Cl.
*H04W 24/08* (2009.01)
*H04B 17/336* (2015.01)
(Continued)

(52) U.S. Cl.
CPC .......... *H04W 24/08* (2013.01); *H04B 17/336* (2015.01); *H04L 5/001* (2013.01); *H04W 8/24* (2013.01)

(58) Field of Classification Search
CPC ...... H04W 24/08; H04W 8/24; H04B 17/336; H04B 7/0617; H04L 5/0094; H04L 5/001
See application file for complete search history.

(56) References Cited

U.S. PATENT DOCUMENTS

| 10,904,781 B2* | 1/2021 | Gheorghiu | ........ H04W 72/0453 |
| 2016/0081076 A1* | 3/2016 | Zhang | ............... H04W 72/0446 |
| | | | 370/336 |

(Continued)

FOREIGN PATENT DOCUMENTS

| CN | 112425089 A | 2/2021 |
| EP | 3796570 A1 | 3/2021 |

OTHER PUBLICATIONS

Huawei, et al., "Discussion on Beam Failure Detection for Beam Management", 3GPP Draft, 3GPP TSG-RAN WG4 Meeting #86bis, R4-1804790, 3rd Generation Partnership Project (3GPP), Mobile Competence Centre, 650, Route Des Lucioles, F-06921, Sophia-Antipolis Cedex, France, vol. RAN WG4, No. Melbourne, Australia; apr. 16, 2018-Apr. 20, 2018, Apr. 6, 2018 (Apr. 6, 2018), XP051418395, 3 pages, Retrieved from the Internet: URL: http://www.3gpp.org/ftp/tsg%5Fran/WG4%5FRadio/TSGR4%5F86Bis/Docs/ [retrieved on Apr. 6, 2018] the whole document.

(Continued)

*Primary Examiner* — Redentor Pasia
(74) *Attorney, Agent, or Firm* — Holland & Hart LLP

(57) ABSTRACT

Methods, systems, and devices for wireless communications are described. A UE may transmit a capability message to a base station. The capability message may indicate a capability of the UE to monitor a defined number of resources across a set of component carriers (CCs) within a time period. The resources may be channel measurement resources (CMRs) or interference measurement resources (IMRs) for signal to interference plus noise measurement, reference signal (RS) resources for channel state information (CSI) measurement, beam failure detection (BFD), reference signal receive power (RSRP) measurement, link quality monitoring, or different active beams. Based on the capability of the UE, the base station may transmit a monitoring configuration to the UE that indicates a set of (Continued)

resources or active beams for the UE to monitor in the set of CCs. The UE may monitor the defined resources or beams received in the monitoring configuration from the base station.

28 Claims, 20 Drawing Sheets

(51) Int. Cl.
*H04L 5/00* (2006.01)
*H04W 8/24* (2009.01)

(56) References Cited

U.S. PATENT DOCUMENTS

| | | | | |
|---|---|---|---|---|
| 2016/0302182 | A1* | 10/2016 | Nogami | H04L 5/0044 |
| 2017/0093544 | A1* | 3/2017 | Kazmi | H04L 5/14 |
| 2017/0279580 | A1* | 9/2017 | Chen | H04W 74/0833 |
| 2018/0006774 | A1* | 1/2018 | Yiu | H04W 24/10 |
| 2018/0227958 | A1* | 8/2018 | Xiong | H04W 88/023 |
| 2019/0007943 | A1* | 1/2019 | Takeda | H04W 72/23 |
| 2019/0058517 | A1* | 2/2019 | Kang | H04L 5/0023 |
| 2019/0103928 | A1 | 4/2019 | Nagaraja et al. | |
| 2019/0109679 | A1* | 4/2019 | Liu | H04B 7/0456 |
| 2019/0165846 | A1* | 5/2019 | Kim | H04B 7/0643 |
| 2019/0223204 | A1* | 7/2019 | Kim | H04L 5/0055 |
| 2019/0260557 | A1* | 8/2019 | Zhang | H04W 72/23 |
| 2019/0281487 | A1* | 9/2019 | Liu | H04L 5/0048 |
| 2019/0312668 | A1* | 10/2019 | Park | H04L 5/0057 |
| 2020/0007298 | A1* | 1/2020 | Korhonen | H04L 5/0055 |
| 2020/0068557 | A1* | 2/2020 | Lee | H04L 5/0035 |
| 2020/0280357 | A1* | 9/2020 | Bae | H04W 24/10 |
| 2021/0022015 | A1* | 1/2021 | Oh | H04W 16/28 |
| 2021/0126690 | A1* | 4/2021 | Matsumura | H04B 7/0695 |
| 2021/0377923 | A1* | 12/2021 | Ge | H04W 8/24 |
| 2022/0109547 | A1* | 4/2022 | Svedman | H04L 5/0053 |

OTHER PUBLICATIONS

Intel: "CR to TS 38.133: Implementation of Endorsed Draft CRs from RAN4#92 (Rel-16)," 3GPP Draft, 3GPP TSG RAN WG4#92 Meeting, 38133 CR0085 (REL-16), R4-1910357 3rd Generation Partnership Project (3GPP), Mobile Competence Centre, 650, Route Des Lucioles, F-06921, Sophia-Antipolis Cedex, France, vol. RAN WG4, No. Ljubljana, Slovenia; Aug. 26, 2019-Aug. 30, 2019, Sep. 10, 2019 (Sep. 10, 2019), XP051779247, 993 pages, Retrieved from the Internet: URL: http://www.3gpp.org/ftp/Email_Discussions/RAN4/CR%20packs/CRpacks_RAN%2385/draft_RP-192022.zip [retrieved on Sep. 10, 2019], section 9.5.1.
International Search Report and Written Opinion—PCT/US2020/059093—ISA/EPO—Feb. 24, 2021.
Qualcomm Incorporated: "Clarification on Channel Bandwidth Capabilities," 3GPP Draft, 3GPP TSG-RAN WG2 Meeting #106, R2-1906105, 3rd Generation Partnership Project (3GPP), Mobile Competence Centre, 650, Route Des Lucioles, F-06921, Sophia-Antipolis Cedex, France, vol. RAN WG2, No. Reno, USA; May 13, 2019-May 17, 2019, May 13, 2019 (May 13, 2019), XP051729582, 15 pages, Retrieved from the Internet: URL: http://www.3gpp.org/ftp/Meetings%5F3GPP%5FSYNC/RAN2/Docs/R2%2D1906105%2Ezip [retrieved on May 13, 2019] p. 13—last paragraph.

* cited by examiner

INDICATION OF USER EQUIPMENT CAPABILITY FOR BEAM FAILURE DETECTION AND BEAM MANAGEMENT

CROSS REFERENCE

The present Application for Patent claims the benefit of U.S. Provisional Patent Application No. 62/933,236 by Zhou et al., entitled "INDICATION OF USER EQUIPMENT CAPABILITY FOR BEAM FAILURE DETECTION AND BEAM MANAGEMENT," filed Nov. 8, 2019, assigned to the assignee hereof, and expressly incorporated by reference herein.

FIELD OF TECHNOLOGY

The following relates generally to wireless communications and more specifically to indication of user equipment (UE) capability for beam failure detection and beam management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In a wireless communications system utilizing beamforming, a UE and a base station may communicate using a number of uplink beams and downlink beams. To facilitate such communication, the UE may perform beam failure detection (BFD) and generate beam measurements on particular beams. Conventional BFD and beam monitoring techniques are deficient.

SUMMARY

The described techniques relate to improved methods, systems, devices, and apparatuses that support indication of user equipment (UE) capability for beam failure detection (BFD) and beam management. Generally, the described techniques provide for a UE to transmit a capability message to a base station to indicate a capability of the UE to monitor a defined number of link quality monitoring reference signal (RS) resources, a defined number of channel state information (CSI) measurement RS resources, a defined number of RS resources, a defined number of different active beams, or any combination thereof. In some cases, the capability may indicate a defined number (e.g., maximum) of resources or beams the UE is capable of monitoring or using for communication. Based on the capability of the UE, the base station may transmit a monitoring configuration to the UE that indicates a set of resources (e.g., link quality monitoring resources, CSI measurement RS resources, RS resources) or active beams for the UE to monitor in one or more component carriers (CCs) or to use for communication. The UE may monitor the defined resources or beams received in the monitoring configuration from the base station. In some examples, the UE may measure the resources for detecting beam failure, for reporting a measurement, or the like, to improve bean failure detection and beam management.

A method of wireless communications by a UE is described. The method may include transmitting a capability message that indicates a capability of the UE to monitor a defined number of resources across a set of CCs within a transmission time interval (TTI), receiving a monitoring configuration that indicates a set of resources for the UE to monitor in one or more CCs within the TTI based on the capability message, and monitoring, within the TTI, the set of resources indicated in the monitoring configuration.

An apparatus for wireless communications by a UE is described. The apparatus may include a processor, memory coupled with the processor, and instructions stored in the memory. The instructions may be executable by the processor to cause the apparatus to transmit a capability message that indicates a capability of the UE to monitor a defined number of resources across a set of CCs within a TTI, receive a monitoring configuration that indicates a set of resources for the UE to monitor in one or more CCs within the TTI based on the capability message, and monitor, within the TTI, the set of resources indicated in the monitoring configuration.

Another apparatus for wireless communications by a UE is described. The apparatus may include means for transmitting a capability message that indicates a capability of the UE to monitor a defined number of resources across a set of CCs within a TTI, receiving a monitoring configuration that indicates a set of resources for the UE to monitor in one or more CCs within the TTI based on the capability message, and monitoring, within the TTI, the set of resources indicated in the monitoring configuration.

A non-transitory computer-readable medium storing code for wireless communications by a UE is described. The code may include instructions executable by a processor to transmit a capability message that indicates a capability of the UE to monitor a defined number of resources across a set of CCs within a TTI, receive a monitoring configuration that indicates a set of resources for the UE to monitor in one or more CCs within the TTI based on the capability message, and monitor, within the TTI, the set of resources indicated in the monitoring configuration.

In some examples of the method, apparatuses, and non-transitory computer-readable medium described herein, transmitting the capability message may include operations, features, means, or instructions for transmitting the capability message that indicates the capability of the UE to monitor the defined number of resources that may be channel measurement resources (CMRs) for signal to interference plus noise measurement.

In some examples of the method, apparatuses, and non-transitory computer-readable medium described herein, the signal to interference plus noise measurement may be a layer one signal to interference plus noise ratio (SINR) (L1-SINR) measurement of a CMR of the set of resources.

In some examples of the method, apparatuses, and non-transitory computer-readable medium described herein, transmitting the capability message may include operations, features, means, or instructions for transmitting the capability message that indicates the capability of the UE to monitor the defined number of resources that may be interference measurement resources (IMRs) for signal to interference plus noise measurement.

In some examples of the method, apparatuses, and non-transitory computer-readable medium described herein, the signal to interference plus noise measurement may be a L1-SINR measurement of an IMR of the set of resources.

In some examples of the method, apparatuses, and non-transitory computer-readable medium described herein, transmitting the capability message may include operations, features, means, or instructions for transmitting the capability message that indicates the capability of the UE to monitor the defined number of resources or a maximum number of resources within the TTI.

In some examples of the method, apparatuses, and non-transitory computer-readable medium described herein, transmitting the capability message may include operations, features, means, or instructions for transmitting the capability message that indicates the capability of the UE to monitor the defined number of resources that may be RS resources, synchronization signal block resources, or both.

In some examples of the method, apparatuses, and non-transitory computer-readable medium described herein, transmitting the capability message may include operations, features, means, or instructions for transmitting the capability message that indicates the capability of the UE to monitor the defined number of resources across the set of CCs that may be a set of serving CCs in a set of frequency bands.

In some examples of the method, apparatuses, and non-transitory computer-readable medium described herein, transmitting the capability message may include operations, features, means, or instructions for transmitting the capability message that indicates the capability of the UE to monitor the defined number of resources across the set of CCs that may be a set of serving CCs in a cell group.

In some examples of the method, apparatuses, and non-transitory computer-readable medium described herein, transmitting the capability message may include operations, features, means, or instructions for transmitting the capability message that indicates the capability of the UE to monitor the defined number of resources across the set of CCs that may be a set of serving CCs in a single frequency band.

In some examples of the method, apparatuses, and non-transitory computer-readable medium described herein, transmitting the capability message may include operations, features, means, or instructions for transmitting the capability message that indicates the capability of the UE to monitor the defined number of resources across the set of CCs within the TTI that may be a slot.

In some examples of the method, apparatuses, and non-transitory computer-readable medium described herein, the TTI may be a slot and a duration of the slot may be based on a numerology of at least one CC of the set of CCs.

In some examples of the method, apparatuses, and non-transitory computer-readable medium described herein, transmitting the capability message may include operations, features, means, or instructions for transmitting the capability message that indicates the capability of the UE to monitor the defined number of resources that include one or more new beam identification resources.

In some examples of the method, apparatuses, and non-transitory computer-readable medium described herein, transmitting the capability message may include operations, features, means, or instructions for transmitting the capability message that indicates the capability of the UE to monitor the defined number of resources that include one or more RS resources for reference signal receive power (RSRP) measurement, one or more RS resources for signal to interference plus noise measurement, one or more RS resources for BFD, one or more RS resources for radio link monitoring, one or more RS resources for link quality monitoring, one or more RS resources for CSI measurement, or any combination thereof.

A method of wireless communications by a base station is described. The method may include receiving a capability message that indicates a capability of a UE to monitor a defined number of resources across a set of CCs within a TTI, transmitting a monitoring configuration that indicates a set of resources for the UE to monitor in one or more CCs within the TTI based on the capability message, and transmitting, within the TTI, a set of reference signals within the set of resources indicated in the monitoring configuration.

An apparatus for wireless communications by a base station is described. The apparatus may include a processor, memory coupled with the processor, and instructions stored in the memory. The instructions may be executable by the processor to cause the apparatus to receive a capability message that indicates a capability of a UE to monitor a defined number of resources across a set of CCs within a TTI, transmit a monitoring configuration that indicates a set of resources for the UE to monitor in one or more CCs within the TTI based on the capability message, and transmit, within the TTI, a set of reference signals within the set of resources indicated in the monitoring configuration.

Another apparatus for wireless communications by a base station is described. The apparatus may include means for receiving a capability message that indicates a capability of a UE to monitor a defined number of resources across a set of CCs within a TTI, transmitting a monitoring configuration that indicates a set of resources for the UE to monitor in one or more CCs within the TTI based on the capability message, and transmitting, within the TTI, a set of reference signals within the set of resources indicated in the monitoring configuration.

A non-transitory computer-readable medium storing code for wireless communications by a base station is described. The code may include instructions executable by a processor to receive a capability message that indicates a capability of a UE to monitor a defined number of resources across a set of CCs within a TTI, transmit a monitoring configuration that indicates a set of resources for the UE to monitor in one or more CCs within the TTI based on the capability message, and transmit, within the TTI, a set of reference signals within the set of resources indicated in the monitoring configuration.

In some examples of the method, apparatuses, and non-transitory computer-readable medium described herein, receiving the capability message may include operations, features, means, or instructions for receiving the capability message that indicates the capability of the UE to monitor the defined number of resources that may be CMRs for signal to interference plus noise measurement.

In some examples of the method, apparatuses, and non-transitory computer-readable medium described herein, receiving the capability message may include operations, features, means, or instructions for receiving the capability message that indicates the capability of the UE to monitor the defined number of resources that may be IMRs for signal to interference plus noise measurement.

In some examples of the method, apparatuses, and non-transitory computer-readable medium described herein, receiving the capability message may include operations, features, means, or instructions for receiving the capability message that indicates the capability of the UE to monitor the defined number of resources that may be RS resources, synchronization signal block resources, or both.

In some examples of the method, apparatuses, and non-transitory computer-readable medium described herein, receiving the capability message may include operations, features, means, or instructions for receiving the capability message that indicates the capability of the UE to monitor the defined number of resources across the set of CCs that may be a set of serving CCs in a set of frequency bands.

In some examples of the method, apparatuses, and non-transitory computer-readable medium described herein, receiving the capability message may include operations, features, means, or instructions for receiving the capability message that indicates the capability of the UE to monitor the defined number of resources across the set of CCs that may be a set of serving CCs in a cell group.

In some examples of the method, apparatuses, and non-transitory computer-readable medium described herein, receiving the capability message may include operations, features, means, or instructions for receiving the capability message that indicates the capability of the UE to monitor the defined number of resources across the set of CCs that may be a set of serving CCs in a single frequency band.

In some examples of the method, apparatuses, and non-transitory computer-readable medium described herein, receiving the capability message may include operations, features, means, or instructions for receiving the capability message that indicates the capability of the UE to monitor the defined number of resources across the set of CCs and a CC list that identifies the set of CCs.

In some examples of the method, apparatuses, and non-transitory computer-readable medium described herein, receiving the capability message may include operations, features, means, or instructions for receiving the capability message that indicates the capability of the UE to monitor the defined number of resources across the set of CCs within the TTI that may be a slot.

In some examples of the method, apparatuses, and non-transitory computer-readable medium described herein, the TTI may be a slot and a duration of the slot may be based on a numerology of at least one CC of the set of CCs.

In some examples of the method, apparatuses, and non-transitory computer-readable medium described herein, the defined number of resources may be beam resources.

Some examples of the method, apparatuses, and non-transitory computer-readable medium described herein may further include operations, features, means, or instructions for transmitting a measurement report indicating at least one measurement of at least one CSI measurement RS resource of the set of resources within the TTI based on the monitoring.

In some examples of the method, apparatuses, and non-transitory computer-readable medium described herein, transmitting the measurement report may include operations, features, means, or instructions for transmitting the measurement report indicating the at least one measurement that may be a layer one RSRP (L1-RSRP) measurement, a L1-SINR measurement of a CMR of the set of resources, a L1-SINR measurement of an IMR of the set of resources, or any combination thereof.

In some examples of the method, apparatuses, and non-transitory computer-readable medium described herein, receiving the capability message may include operations, features, means, or instructions for receiving the capability message that indicates the capability of the UE to monitor the defined number of resources that include one or more RS resources for RSRP measurement, one or more RS resources for signal to interference plus noise measurement, one or more RS resources for BFD, one or more RS resources for radio link monitoring, one or more RS resources for link quality monitoring, one or more RS resources for CSI measurement, or any combination thereof.

A method of wireless communications by a UE is described. The method may include a processor, memory coupled with the processor, instructions stored in the memory and executable by the processor to cause the apparatus to, receiving a monitoring configuration that indicates a set of resources for the UE to monitor in one or more CCs within the TTI based on the capability message, and monitoring, within the TTI, the set of resources indicated in the monitoring configuration.

An apparatus for wireless communications by a UE is described. The apparatus may include a processor, memory coupled with the processor, and instructions stored in the memory. The instructions may be executable by the processor to cause the apparatus to a processor, memory coupled with the processor, instructions stored in the memory and executable by the processor to cause the apparatus to, receive a monitoring configuration that indicates a set of resources for the UE to monitor in one or more CCs within the TTI based on the capability message, and monitor, within the TTI, the set of resources indicated in the monitoring configuration.

Another apparatus for wireless communications by a UE is described. The apparatus may include means for a processor, memory coupled with the processor, instructions stored in the memory and executable by the processor to cause the apparatus to, receiving a monitoring configuration that indicates a set of resources for the UE to monitor in one or more CCs within the TTI based on the capability message, and monitoring, within the TTI, the set of resources indicated in the monitoring configuration.

A non-transitory computer-readable medium storing code for wireless communications by a UE is described. The code may include instructions executable by a processor to a processor, memory coupled with the processor, instructions stored in the memory and executable by the processor to cause the apparatus to, receive a monitoring configuration that indicates a set of resources for the UE to monitor in one or more CCs within the TTI based on the capability message, and monitor, within the TTI, the set of resources indicated in the monitoring configuration.

A method of wireless communications by a base station is described. The method may include a processor, memory coupled with the processor, instructions stored in the memory and executable by the processor to cause the apparatus to, transmitting a monitoring configuration that indicates a set of resources for the UE to monitor in one or more CCs within the TTI based on the capability message, and transmitting, within the TTI, a set of reference signals within the set of resources indicated in the monitoring configuration.

An apparatus for wireless communications by a base station is described. The apparatus may include a processor, memory coupled with the processor, and instructions stored in the memory. The instructions may be executable by the processor to cause the apparatus to a processor, memory coupled with the processor, instructions stored in the memory and executable by the processor to cause the apparatus to, transmit a monitoring configuration that indicates a set of resources for the UE to monitor in one or more CCs within the TTI based on the capability message, and transmit, within the TTI, a set of reference signals within the set of resources indicated in the monitoring configuration.

Another apparatus for wireless communications by a base station is described. The apparatus may include means for a processor, memory coupled with the processor, instructions stored in the memory and executable by the processor to cause the apparatus to, transmitting a monitoring configuration that indicates a set of resources for the UE to monitor in one or more CCs within the TTI based on the capability message, and transmitting, within the TTI, a set of reference signals within the set of resources indicated in the monitoring configuration.

A non-transitory computer-readable medium storing code for wireless communications by a base station is described. The code may include instructions executable by a processor to a processor, memory coupled with the processor, instructions stored in the memory and executable by the processor to cause the apparatus to, transmit a monitoring configuration that indicates a set of resources for the UE to monitor in one or more CCs within the TTI based on the capability message, and transmit, within the TTI, a set of reference signals within the set of resources indicated in the monitoring configuration.

A method of wireless communications by a UE is described. The method may include transmitting a capability message that indicates a capability of the UE to monitor a defined number of link quality monitoring RS resources across a set of CCs within a TTI, receiving a monitoring configuration that indicates a set of link quality monitoring RS resources for the UE to monitor in one or more CCs within the TTI based on the capability message, and monitoring, within the TTI, the set of link quality monitoring RS resources indicated in the monitoring configuration.

An apparatus for wireless communications by a UE is described. The apparatus may include a processor, memory coupled with the processor, and instructions stored in the memory. The instructions may be executable by the processor to cause the apparatus to transmit a capability message that indicates a capability of the UE to monitor a defined number of link quality monitoring RS resources across a set of CCs within a TTI, receive a monitoring configuration that indicates a set of link quality monitoring RS resources for the UE to monitor in one or more CCs within the TTI based on the capability message, and monitor, within the TTI, the set of link quality monitoring RS resources indicated in the monitoring configuration.

Another apparatus for wireless communications by a UE is described. The apparatus may include means for transmitting a capability message that indicates a capability of the UE to monitor a defined number of link quality monitoring RS resources across a set of CCs within a TTI, receiving a monitoring configuration that indicates a set of link quality monitoring RS resources for the UE to monitor in one or more CCs within the TTI based on the capability message, and monitoring, within the TTI, the set of link quality monitoring RS resources indicated in the monitoring configuration.

A non-transitory computer-readable medium storing code for wireless communications by a UE is described. The code may include instructions executable by a processor to transmit a capability message that indicates a capability of the UE to monitor a defined number of link quality monitoring RS resources across a set of CCs within a TTI, receive a monitoring configuration that indicates a set of link quality monitoring RS resources for the UE to monitor in one or more CCs within the TTI based on the capability message, and monitor, within the TTI, the set of link quality monitoring RS resources indicated in the monitoring configuration.

In some examples of the method, apparatuses, and non-transitory computer-readable medium described herein, transmitting the capability message may include operations, features, means, or instructions for transmitting the capability message that indicates the capability of the UE to monitor the defined number of link quality monitoring RS resources that may be RS resources, synchronization signal block resources, or both.

In some examples of the method, apparatuses, and non-transitory computer-readable medium described herein, transmitting the capability message may include operations, features, means, or instructions for transmitting the capability message that indicates the capability of the UE to monitor the defined number of link quality monitoring RS resources that may be new beam identification resources.

In some examples of the method, apparatuses, and non-transitory computer-readable medium described herein, transmitting the capability message may include operations, features, means, or instructions for transmitting the capability message that indicates the capability of the UE to monitor the defined number of link quality monitoring RS resources across the set of CCs that may be a set of serving CCs in a set of frequency bands.

In some examples of the method, apparatuses, and non-transitory computer-readable medium described herein, transmitting the capability message may include operations, features, means, or instructions for transmitting the capability message that indicates the capability of the UE to monitor the defined number of link quality monitoring RS resources across the set of CCs that may be a set of serving CCs in a cell group.

In some examples of the method, apparatuses, and non-transitory computer-readable medium described herein, transmitting the capability message may include operations, features, means, or instructions for transmitting the capability message that indicates the capability of the UE to monitor the defined number of link quality monitoring RS resources across the set of CCs that may be a set of serving CCs in a single frequency band.

In some examples of the method, apparatuses, and non-transitory computer-readable medium described herein, transmitting the capability message may include operations, features, means, or instructions for transmitting the capability message that indicates the capability of the UE to monitor the defined number of link quality monitoring RS resources across the set of CCs and a CC list that identifies the set of CCs.

In some examples of the method, apparatuses, and non-transitory computer-readable medium described herein, transmitting the capability message may include operations, features, means, or instructions for transmitting the capability message that indicates the capability of the UE to monitor the defined number of link quality monitoring RS resources across the set of CCs within the TTI that may be a slot.

Some examples of the method, apparatuses, and non-transitory computer-readable medium described herein may further include operations, features, means, or instructions for transmitting a beam failure message corresponding to a first link quality monitoring RS resource of the set of link quality monitoring RS resources based on the monitoring, and receiving a second monitoring configuration that indicates a second link quality monitoring RS resource that differs from the first link quality monitoring RS resource.

In some examples of the method, apparatuses, and non-transitory computer-readable medium described herein, the set of link quality monitoring RS resources include one or more radio link monitoring RSs.

In some examples of the method, apparatuses, and non-transitory computer-readable medium described herein, the set of link quality monitoring RS resources include one or more BFD RSs.

A method of wireless communications by a UE is described. The method may include transmitting a capability message that indicates a capability of the UE to monitor a defined number of CSI measurement RS resources for RSRP measurement, interference measurement, or both, across a set of CCs within a TTI, receiving a monitoring configuration that indicates a set of CSI measurement RS resources for the UE to monitor in one or more CCs within the TTI based on the capability message, and monitoring, within the TTI, the set of CSI measurement RS resources indicated in the monitoring configuration.

An apparatus for wireless communications by a UE is described. The apparatus may include a processor, memory coupled with the processor, and instructions stored in the memory. The instructions may be executable by the processor to cause the apparatus to transmit a capability message that indicates a capability of the UE to monitor a defined number of CSI measurement RS resources for RSRP measurement, interference measurement, or both, across a set of CCs within a TTI, receive a monitoring configuration that indicates a set of CSI measurement RS resources for the UE to monitor in one or more CCs within the TTI based on the capability message, and monitor, within the TTI, the set of CSI measurement RS resources indicated in the monitoring configuration.

Another apparatus for wireless communications by a UE is described. The apparatus may include means for transmitting a capability message that indicates a capability of the UE to monitor a defined number of CSI measurement RS resources for RSRP measurement, interference measurement, or both, across a set of CCs within a TTI, receiving a monitoring configuration that indicates a set of CSI measurement RS resources for the UE to monitor in one or more CCs within the TTI based on the capability message, and monitoring, within the TTI, the set of CSI measurement RS resources indicated in the monitoring configuration.

A non-transitory computer-readable medium storing code for wireless communications by a UE is described. The code may include instructions executable by a processor to transmit a capability message that indicates a capability of the UE to monitor a defined number of CSI measurement RS resources for RSRP measurement, interference measurement, or both, across a set of CCs within a TTI, receive a monitoring configuration that indicates a set of CSI measurement RS resources for the UE to monitor in one or more CCs within the TTI based on the capability message, and monitor, within the TTI, the set of CSI measurement RS resources indicated in the monitoring configuration.

In some examples of the method, apparatuses, and non-transitory computer-readable medium described herein, transmitting the capability message may include operations, features, means, or instructions for transmitting the capability message that indicates the capability of the UE to monitor the defined number of CSI measurement RS resources that may be RS resources, synchronization signal block resources, or both.

In some examples of the method, apparatuses, and non-transitory computer-readable medium described herein, transmitting the capability message may include operations, features, means, or instructions for transmitting the capability message that indicates the capability of the UE to monitor the defined number of CSI measurement RS resources that may be aperiodic resources, periodic resources, semi-static resources, or any combination thereof.

In some examples of the method, apparatuses, and non-transitory computer-readable medium described herein, transmitting the capability message may include operations, features, means, or instructions for transmitting the capability message that indicates the capability of the UE to monitor the defined number of CSI measurement RS resources that may be a RSRP resource, a CMR, an IMR, or any combination thereof.

Some examples of the method, apparatuses, and non-transitory computer-readable medium described herein may further include operations, features, means, or instructions for transmitting a beam measurement report indicating at least one measurement of at least one CSI measurement RS resource of the set of CSI measurement RS resources within the TTI based on the monitoring.

In some examples of the method, apparatuses, and non-transitory computer-readable medium described herein, transmitting the beam measurement report may include operations, features, means, or instructions for transmitting the beam measurement report indicating the at least one measurement that may be a L1-RSRP, a L1-SINR measurement of a CMR of the set of CSI measurement RS resources, a L1-SINR measurement of an IMR of the set of CSI measurement RS resources, or any combination thereof.

A method of wireless communications by a UE is described. The method may include transmitting a capability message that indicates a capability of the UE to monitor a defined number of RS resources across a set of CCs within a TTI and indicates a duration of the TTI, a first numerology of a first CC of the set of CCs being different than a second numerology of a second CC of the set of CCs, receiving a monitoring configuration that indicates a set of RS resources for the UE to monitor in one or more CCs within the TTI based on the capability message, and monitoring, within the TTI, the set of RS resources indicated in the monitoring configuration.

An apparatus for wireless communications by a UE is described. The apparatus may include a processor, memory coupled with the processor, and instructions stored in the memory. The instructions may be executable by the processor to cause the apparatus to transmit a capability message that indicates a capability of the UE to monitor a defined number of RS resources across a set of CCs within a TTI and indicates a duration of the TTI, a first numerology of a first CC of the set of CCs being different than a second numerology of a second CC of the set of CCs, receive a monitoring configuration that indicates a set of RS resources for the UE to monitor in one or more CCs within the TTI based on the capability message, and monitor, within the TTI, the set of RS resources indicated in the monitoring configuration.

Another apparatus for wireless communications by a UE is described. The apparatus may include means for transmitting a capability message that indicates a capability of the UE to monitor a defined number of RS resources across a set of CCs within a TTI and indicates a duration of the TTI, a first numerology of a first CC of the set of CCs being different than a second numerology of a second CC of the set of CCs, receiving a monitoring configuration that indicates a set of RS resources for the UE to monitor in one or more CCs within the TTI based on the capability message, and monitoring, within the TTI, the set of RS resources indicated in the monitoring configuration.

A non-transitory computer-readable medium storing code for wireless communications by a UE is described. The code may include instructions executable by a processor to transmit a capability message that indicates a capability of the UE to monitor a defined number of RS resources across a set of CCs within a TTI and indicates a duration of the TTI, a first numerology of a first CC of the set of CCs being different than a second numerology of a second CC of the set of CCs, receive a monitoring configuration that indicates a set of RS resources for the UE to monitor in one or more CCs within the TTI based on the capability message, and monitor, within the TTI, the set of RS resources indicated in the monitoring configuration.

In some examples of the method, apparatuses, and non-transitory computer-readable medium described herein, transmitting the capability message may include operations, features, means, or instructions for transmitting the capability message that indicates the duration of the TTI based on a subset of the set of CCs that may have a same numerology.

In some examples of the method, apparatuses, and non-transitory computer-readable medium described herein, transmitting the capability message may include operations, features, means, or instructions for transmitting the capability message that indicates the duration of the TTI based on one numerology of the set of CCs.

In some examples of the method, apparatuses, and non-transitory computer-readable medium described herein, the one numerology may be a highest numerology of the set of CCs.

In some examples of the method, apparatuses, and non-transitory computer-readable medium described herein, transmitting the capability message may include operations, features, means, or instructions for transmitting the capability message that indicates the duration of the TTI based on a set of TTIs overlapping in time across the set of CCs.

In some examples of the method, apparatuses, and non-transitory computer-readable medium described herein, transmitting the capability message may include operations, features, means, or instructions for transmitting the capability message that indicates the duration of the TTI based on a reference time duration.

In some examples of the method, apparatuses, and non-transitory computer-readable medium described herein, the set of RS resources include RSs for link quality monitoring.

In some examples of the method, apparatuses, and non-transitory computer-readable medium described herein, the set of RS resources include one or more radio link monitoring RSs.

In some examples of the method, apparatuses, and non-transitory computer-readable medium described herein, the set of RS resources include one or more BFD RSs.

In some examples of the method, apparatuses, and non-transitory computer-readable medium described herein, the set of RS resources include RSs for CSI measurement.

In some examples of the method, apparatuses, and non-transitory computer-readable medium described herein, the set of RS resources include RSs for L1-RSRP measurement, for L1-SINR measurement, or both.

A method of wireless communications by a UE is described. The method may include transmitting a capability message that indicates a capability of the UE to monitor a defined number of different active beams across a set of CCs or a set of bandwidth parts, receiving a monitoring configuration that indicates a set of active beams for the UE to monitor across one or more CCs or one or more bandwidth parts based on the capability message, and monitoring the set of active beams indicated in the monitoring configuration.

An apparatus for wireless communications by a UE is described. The apparatus may include a processor, memory coupled with the processor, and instructions stored in the memory. The instructions may be executable by the processor to cause the apparatus to transmit a capability message that indicates a capability of the UE to monitor a defined number of different active beams across a set of CCs or a set of bandwidth parts, receive a monitoring configuration that indicates a set of active beams for the UE to monitor across one or more CCs or one or more bandwidth parts based on the capability message, and monitor the set of active beams indicated in the monitoring configuration.

Another apparatus for wireless communications by a UE is described. The apparatus may include means for transmitting a capability message that indicates a capability of the UE to monitor a defined number of different active beams across a set of CCs or a set of bandwidth parts, receiving a monitoring configuration that indicates a set of active beams for the UE to monitor across one or more CCs or one or more bandwidth parts based on the capability message, and monitoring the set of active beams indicated in the monitoring configuration.

A non-transitory computer-readable medium storing code for wireless communications by a UE is described. The code may include instructions executable by a processor to transmit a capability message that indicates a capability of the UE to monitor a defined number of different active beams across a set of CCs or a set of bandwidth parts, receive a monitoring configuration that indicates a set of active beams for the UE to monitor across one or more CCs or one or more bandwidth parts based on the capability message, and monitor the set of active beams indicated in the monitoring configuration.

In some examples of the method, apparatuses, and non-transitory computer-readable medium described herein, the defined number may be a maximum supported number of different active beams.

In some examples of the method, apparatuses, and non-transitory computer-readable medium described herein, the maximum supported number of different active beams that may be downlink beams may be defined based on a number of different activated transmission configuration indicator state identifiers (IDs).

In some examples of the method, apparatuses, and non-transitory computer-readable medium described herein, the maximum supported number of different active beams that may be downlink beams may be defined based on a number of different quasi co-location (QCL) RS IDs for a set of different activated transmission configuration indicator state IDs.

In some examples of the method, apparatuses, and non-transitory computer-readable medium described herein, the maximum supported number of different active beams that may be downlink beams may be defined based on a number of different root QCL RS IDs for a set of different activated transmission configuration indicator state IDs.

In some examples of the method, apparatuses, and non-transitory computer-readable medium described herein, the maximum supported number of different active beams that may be uplink beams may be defined based on a number of different activated spatial relation information IDs that correspond to the set of active beams that may be uplink beams.

In some examples of the method, apparatuses, and non-transitory computer-readable medium described herein, the maximum supported number of different active beams that may be uplink beams may be defined based on a number of different spatial RS IDs for a set of different activated spatial relation information IDs.

In some examples of the method, apparatuses, and non-transitory computer-readable medium described herein, transmitting the capability message may include operations, features, means, or instructions for transmitting the capability message that indicates the capability of the UE to monitor the defined number of different active beams that may be one or more downlink beams, one or more uplink beams, or any combination thereof.

In some examples of the method, apparatuses, and non-transitory computer-readable medium described herein, receiving the monitoring configuration may include operations, features, means, or instructions for receiving the monitoring configuration that indicates a set of different activated transmission configuration indicator state IDs that correspond to the set of active beams that may be downlink beams.

In some examples of the method, apparatuses, and non-transitory computer-readable medium described herein, receiving the monitoring configuration may include operations, features, means, or instructions for receiving the monitoring configuration that indicates a set of different activated transmission configuration indicator state IDs, where the set of active beams may be downlink beams and correspond to a set of different QCL RS IDs for the set of different activated transmission configuration indicator state IDs.

In some examples of the method, apparatuses, and non-transitory computer-readable medium described herein, the set of different QCL RS IDs may be a set of QCL type D RS IDs.

In some examples of the method, apparatuses, and non-transitory computer-readable medium described herein, receiving the monitoring configuration may include operations, features, means, or instructions for receiving the monitoring configuration that indicates a set of different activated transmission configuration indicator state IDs, where the set of active beams may be downlink beams and correspond to a set of different root QCL RS IDs for the set of different activated transmission configuration indicator state IDs.

In some examples of the method, apparatuses, and non-transitory computer-readable medium described herein, the set of different root QCL RS IDs may be a set of different root QCL type D RS IDs in a QCL chain.

In some examples of the method, apparatuses, and non-transitory computer-readable medium described herein, receiving the monitoring configuration may include operations, features, means, or instructions for receiving the monitoring configuration that indicates a set of different activated spatial relation information IDs that correspond to the set of active beams that may be uplink beams.

In some examples of the method, apparatuses, and non-transitory computer-readable medium described herein, receiving the monitoring configuration may include operations, features, means, or instructions for receiving the monitoring configuration that indicates a set of different activated spatial relation information IDs, where the set of active beams may be uplink beams and correspond to a set of different spatial RS IDs for the set of different activated spatial relation information IDs.

Some examples of the method, apparatuses, and non-transitory computer-readable medium described herein may further include operations, features, means, or instructions for transmitting a beam failure message corresponding to a first beam of the set of active beams based on the monitoring.

Some examples of the method, apparatuses, and non-transitory computer-readable medium described herein may further include operations, features, means, or instructions for receiving a second monitoring configuration indicating activation of a second beam that differs from the first beam based on the beam failure message.

Some examples of the method, apparatuses, and non-transitory computer-readable medium described herein may further include operations, features, means, or instructions for transmitting a beam measurement report indicating at least one measurement of at least one active beam of the set of beams based on the monitoring.

A method of wireless communications by a base station is described. The method may include receiving a capability message that indicates a capability of a UE to monitor a defined number of link quality monitoring RS resources across a set of CCs within a TTI, transmitting a monitoring configuration that indicates a set of link quality monitoring RS resources for the UE to monitor in one or more CCs within the TTI based on the capability message, and transmitting, within the TTI, a set of RSs within the set of link quality monitoring RS resources indicated in the monitoring configuration.

An apparatus for wireless communications by a base station is described. The apparatus may include a processor, memory coupled with the processor, and instructions stored in the memory. The instructions may be executable by the processor to cause the apparatus to receive a capability message that indicates a capability of a UE to monitor a defined number of link quality monitoring RS resources across a set of CCs within a TTI, transmit a monitoring configuration that indicates a set of link quality monitoring RS resources for the UE to monitor in one or more CCs within the TTI based on the capability message, and transmit, within the TTI, a set of RSs within the set of link quality monitoring RS resources indicated in the monitoring configuration.

Another apparatus for wireless communications by a base station is described. The apparatus may include means for receiving a capability message that indicates a capability of a UE to monitor a defined number of link quality monitoring RS resources across a set of CCs within a TTI, transmitting a monitoring configuration that indicates a set of link quality monitoring RS resources for the UE to monitor in one or more CCs within the TTI based on the capability message, and transmitting, within the TTI, a set of RSs within the set of link quality monitoring RS resources indicated in the monitoring configuration.

A non-transitory computer-readable medium storing code for wireless communications by a base station is described. The code may include instructions executable by a processor to receive a capability message that indicates a capability of a UE to monitor a defined number of link quality monitoring RS resources across a set of CCs within a TTI, transmit a monitoring configuration that indicates a set of link quality monitoring RS resources for the UE to monitor in one or more CCs within the TTI based on the capability message, and transmit, within the TTI, a set of RSs within the set of link quality monitoring RS resources indicated in the monitoring configuration.

In some examples of the method, apparatuses, and non-transitory computer-readable medium described herein, receiving the capability message may include operations, features, means, or instructions for receiving the capability message that indicates the capability of the UE to monitor the defined number of link quality monitoring RS resources that may be RS resources, synchronization signal block resources, or both.

In some examples of the method, apparatuses, and non-transitory computer-readable medium described herein, receiving the capability message may include operations, features, means, or instructions for receiving the capability message that indicates the capability of the UE to monitor the defined number of link quality monitoring RS resources that may be new beam identification resources.

In some examples of the method, apparatuses, and non-transitory computer-readable medium described herein, receiving the capability message may include operations, features, means, or instructions for receiving the capability message that indicates the capability of the UE to monitor the defined number of link quality monitoring RS resources across the set of CCs that may be a set of serving CCs in a set of frequency bands.

In some examples of the method, apparatuses, and non-transitory computer-readable medium described herein, receiving the capability message may include operations, features, means, or instructions for receiving the capability message that indicates the capability of the UE to monitor the defined number of link quality monitoring RS resources across the set of CCs that may be a set of serving CCs in a cell group.

In some examples of the method, apparatuses, and non-transitory computer-readable medium described herein, receiving the capability message may include operations, features, means, or instructions for receiving the capability message that indicates the capability of the UE to monitor the defined number of link quality monitoring RS resources across the set of CCs that may be a set of serving CCs in a single frequency band.

In some examples of the method, apparatuses, and non-transitory computer-readable medium described herein, receiving the capability message may include operations, features, means, or instructions for receiving the capability message that indicates the capability of the UE to monitor the defined number of link quality monitoring RS resources across the set of CCs and a CC list that identifies the set of CCs.

In some examples of the method, apparatuses, and non-transitory computer-readable medium described herein, receiving the capability message may include operations, features, means, or instructions for receiving the capability message that indicates the capability of the UE to monitor the defined number of link quality monitoring RS resources across the set of CCs within the TTI that may be a slot.

Some examples of the method, apparatuses, and non-transitory computer-readable medium described herein may further include operations, features, means, or instructions for receiving a beam failure message corresponding a first beam link quality monitoring RS resource of the set of link quality monitoring RS resources based on the monitoring, and transmitting a second monitoring configuration that indicates a second link quality monitoring RS resource that differs from the first link quality monitoring RS resource.

In some examples of the method, apparatuses, and non-transitory computer-readable medium described herein, receiving the capability message may include operations, features, means, or instructions for receiving the capability message that indicates the capability of the UE to monitor the defined number of link quality monitoring RS resources for RSRP measurement, interference measurement, or both, across the set of CCs within the TTI.

A method of wireless communications by a base station is described. The method may include receiving a capability message that indicates a capability of a UE to monitor a defined number of CSI measurement RS resources for RSRP measurement, interference measurement, or both, across a set of CCs within a TTI, transmitting a monitoring configuration that indicates a set of CSI measurement RS resources for the UE to monitor in one or more CCs within the TTI based on the capability message, and transmitting, within the TTI, a set of RSs within the set of CSI measurement RS resources indicated in the monitoring configuration.

An apparatus for wireless communications by a base station is described. The apparatus may include a processor, memory coupled with the processor, and instructions stored in the memory. The instructions may be executable by the processor to cause the apparatus to receive a capability message that indicates a capability of a UE to monitor a defined number of CSI measurement RS resources for RSRP measurement, interference measurement, or both, across a set of CCs within a TTI, transmit a monitoring configuration that indicates a set of CSI measurement RS resources for the UE to monitor in one or more CCs within the TTI based on the capability message, and transmit, within the TTI, a set of RSs within the set of CSI measurement RS resources indicated in the monitoring configuration.

Another apparatus for wireless communications by a base station is described. The apparatus may include means for receiving a capability message that indicates a capability of a UE to monitor a defined number of CSI measurement RS resources for RSRP measurement, interference measurement, or both, across a set of CCs within a TTI, transmitting a monitoring configuration that indicates a set of CSI measurement RS resources for the UE to monitor in one or more CCs within the TTI based on the capability message, and transmitting, within the TTI, a set of RSs within the set of CSI measurement RS resources indicated in the monitoring configuration.

A non-transitory computer-readable medium storing code for wireless communications by a base station is described. The code may include instructions executable by a processor to receive a capability message that indicates a capability of a UE to monitor a defined number of CSI measurement RS resources for RSRP measurement, interference measurement, or both, across a set of CCs within a TTI, transmit a monitoring configuration that indicates a set of CSI measurement RS resources for the UE to monitor in one or more CCs within the TTI based on the capability message, and transmit, within the TTI, a set of RSs within the set of CSI measurement RS resources indicated in the monitoring configuration.

In some examples of the method, apparatuses, and non-transitory computer-readable medium described herein, receiving the capability message may include operations, features, means, or instructions for receiving the capability message that indicates the capability of the UE to monitor the defined number of CSI measurement RS resources that may be RS resources, synchronization signal block resources, or both.

In some examples of the method, apparatuses, and non-transitory computer-readable medium described herein, receiving the capability message may include operations, features, means, or instructions for receiving the capability message that indicates the capability of the UE to monitor the defined number of CSI measurement RS resources that may be aperiodic resources, periodic resources, semi-static resources, or any combination thereof.

In some examples of the method, apparatuses, and non-transitory computer-readable medium described herein, receiving the capability message may include operations, features, means, or instructions for receiving the capability message that indicates the capability of the UE to monitor the defined number of CSI measurement RS resources that may be a RSRP resource, a CMR, an IMR, or any combination thereof.

Some examples of the method, apparatuses, and non-transitory computer-readable medium described herein may further include operations, features, means, or instructions for receiving a beam measurement report indicating at least one measurement of at least one CSI measurement RS resource of the set of CSI measurement RS resources within the TTI based on the monitoring.

In some examples of the method, apparatuses, and non-transitory computer-readable medium described herein, receiving the beam measurement report may include operations, features, means, or instructions for receiving the beam measurement report indicating the at least one measurement that may be a L1-RSRP measurement, a L1-SINR measurement of a CMR of the set of CSI measurement RS resources, a L1-SINR measurement of an IMR of the set of CSI measurement RS resources, or any combination thereof.

In some examples of the method, apparatuses, and non-transitory computer-readable medium described herein, the defined number of CSI measurement RS resources includes one or more reference signals for L1-RSRP measurement, for signal part measurement of L1-SINR, for interference part measurement of L1-SINR measurement, or any combination thereof.

A method of wireless communications by a base station is described. The method may include receiving a capability message that indicates a capability of a UE to monitor a defined number of RS resources across a set of CCs within a TTI and indicates a duration of the TTI, a first numerology of a first CC of the set of CCs being different than a second numerology of a second CC of the set of CCs, transmitting a monitoring configuration that indicates a set of RS resources for the UE to monitor in one or more CCs within the TTI based on the capability message, and transmitting, within the TTI, a set of RSs within the set of RS resources indicated in the monitoring configuration.

An apparatus for wireless communications by a base station is described. The apparatus may include a processor, memory coupled with the processor, and instructions stored in the memory. The instructions may be executable by the processor to cause the apparatus to receive a capability message that indicates a capability of a UE to monitor a defined number of RS resources across a set of CCs within a TTI and indicates a duration of the TTI, a first numerology of a first CC of the set of CCs being different than a second numerology of a second CC of the set of CCs, transmit a monitoring configuration that indicates a set of RS resources for the UE to monitor in one or more CCs within the TTI based on the capability message, and transmit, within the TTI, a set of RSs within the set of RS resources indicated in the monitoring configuration.

Another apparatus for wireless communications by a base station is described. The apparatus may include means for receiving a capability message that indicates a capability of a UE to monitor a defined number of RS resources across a set of CCs within a TTI and indicates a duration of the TTI, a first numerology of a first CC of the set of CCs being different than a second numerology of a second CC of the set of CCs, transmitting a monitoring configuration that indicates a set of RS resources for the UE to monitor in one or more CCs within the TTI based on the capability message, and transmitting, within the TTI, a set of RSs within the set of RS resources indicated in the monitoring configuration.

A non-transitory computer-readable medium storing code for wireless communications by a base station is described. The code may include instructions executable by a processor to receive a capability message that indicates a capability of a UE to monitor a defined number of RS resources across a set of CCs within a TTI and indicates a duration of the TTI, a first numerology of a first CC of the set of CCs being different than a second numerology of a second CC of the set of CCs, transmit a monitoring configuration that indicates a set of RS resources for the UE to monitor in one or more CCs within the TTI based on the capability message, and transmit, within the TTI, a set of RSs within the set of RS resources indicated in the monitoring configuration.

In some examples of the method, apparatuses, and non-transitory computer-readable medium described herein, receiving the capability message may include operations, features, means, or instructions for receiving the capability message that indicates the duration of the TTI based on a subset of the set of CCs that may have a same numerology.

In some examples of the method, apparatuses, and non-transitory computer-readable medium described herein, receiving the capability message may include operations, features, means, or instructions for receiving the capability message that indicates the duration of the TTI based on a highest numerology of the set of CCs.

In some examples of the method, apparatuses, and non-transitory computer-readable medium described herein, receiving the capability message may include operations, features, means, or instructions for receiving the capability message that indicates the duration of the TTI based on a set of TTI s overlapping in time across the set of CCs.

In some examples of the method, apparatuses, and non-transitory computer-readable medium described herein, receiving the capability message may include operations, features, means, or instructions for receiving the capability message that indicates the duration of the TTI based on a reference time duration.

In some examples of the method, apparatuses, and non-transitory computer-readable medium described herein, the set of RS resources include RSs for link quality monitoring.

In some examples of the method, apparatuses, and non-transitory computer-readable medium described herein, the set of RS resources include one or more radio link monitoring RSs.

In some examples of the method, apparatuses, and non-transitory computer-readable medium described herein, the set of RS resources include one or more BFD RSs.

In some examples of the method, apparatuses, and non-transitory computer-readable medium described herein, the set of RS resources include RSs for CSI measurement.

In some examples of the method, apparatuses, and non-transitory computer-readable medium described herein, the set of RS resources include RSs for layer one RSRP measurement, for layer one signal to interference plus noise measurement, or both.

A method of wireless communications by a base station is described. The method may include receiving a capability message that indicates a capability of a UE to monitor a defined number of different active beams across a set of CCs or a set of bandwidth parts, transmitting a monitoring configuration that indicates a set of active beams for the UE to monitor across one or more CCs or one or more bandwidth parts based on the capability message, and transmitting a set of RSs via the set of active beams in accordance with the monitoring configuration.

An apparatus for wireless communications by a base station is described. The apparatus may include a processor, memory coupled with the processor, and instructions stored in the memory. The instructions may be executable by the processor to cause the apparatus to receive a capability message that indicates a capability of a UE to monitor a defined number of different active beams across a set of CCs or a set of bandwidth parts, transmit a monitoring configuration that indicates a set of active beams for the UE to monitor across one or more CCs or one or more bandwidth parts based on the capability message, and transmit a set of RSs via the set of active beams in accordance with the monitoring configuration.

Another apparatus for wireless communications by a base station is described. The apparatus may include means for receiving a capability message that indicates a capability of a UE to monitor a defined number of different active beams across a set of CCs or a set of bandwidth parts, transmitting a monitoring configuration that indicates a set of active beams for the UE to monitor across one or more CCs or one or more bandwidth parts based on the capability message, and transmitting a set of RSs via the set of active beams in accordance with the monitoring configuration.

A non-transitory computer-readable medium storing code for wireless communications by a base station is described. The code may include instructions executable by a processor to receive a capability message that indicates a capability of a UE to monitor a defined number of different active beams across a set of CCs or a set of bandwidth parts, transmit a monitoring configuration that indicates a set of active beams for the UE to monitor across one or more CCs or one or more bandwidth parts based on the capability message, and transmit a set of RSs via the set of active beams in accordance with the monitoring configuration.

In some examples of the method, apparatuses, and non-transitory computer-readable medium described herein, the defined number may be a maximum supported number of different active beams.

In some examples of the method, apparatuses, and non-transitory computer-readable medium described herein, the maximum supported number of different active beams that may be downlink beams may be defined based on a number of different activated transmission configuration indicator state IDs.

In some examples of the method, apparatuses, and non-transitory computer-readable medium described herein, the maximum supported number of different active beams that may be downlink beams may be defined based on a number of different QCL RS IDs for a set of different activated transmission configuration indicator state IDs.

In some examples of the method, apparatuses, and non-transitory computer-readable medium described herein, the maximum supported number of different active beams that may be downlink beams may be defined based on a number of different root QCL RS IDs for a set of different activated transmission configuration indicator state IDs.

In some examples of the method, apparatuses, and non-transitory computer-readable medium described herein, the maximum supported number of different active beams that may be uplink beams may be defined based on a number of different activated spatial relation information IDs that correspond to the set of active beams that may be uplink beams.

In some examples of the method, apparatuses, and non-transitory computer-readable medium described herein, the maximum supported number of different active beams that may be uplink beams may be defined based on a number of different spatial RS IDs for a set of different activated spatial relation information IDs.

In some examples of the method, apparatuses, and non-transitory computer-readable medium described herein, receiving the capability message may include operations, features, means, or instructions for receiving the capability message that indicates the capability of the UE to monitor the defined number of different active beams that may be one or more downlink beams, one or more uplink beams, or any combination thereof.

In some examples of the method, apparatuses, and non-transitory computer-readable medium described herein, transmitting the monitoring configuration may include operations, features, means, or instructions for transmitting the monitoring configuration that indicates a set of different activated transmission configuration indicator state IDs that correspond to the set of active beams that may be downlink beams.

In some examples of the method, apparatuses, and non-transitory computer-readable medium described herein, transmitting the monitoring configuration may include operations, features, means, or instructions for transmitting the monitoring configuration that indicates a set of different activated transmission configuration indicator state IDs, where the set of active beams may be downlink beams and correspond to a set of different QCL RS IDs for the set of different activated transmission configuration indicator state IDs.

In some examples of the method, apparatuses, and non-transitory computer-readable medium described herein, the set of different QCL RS IDs may be a set of QCL type D RS IDs.

In some examples of the method, apparatuses, and non-transitory computer-readable medium described herein, transmitting the monitoring configuration may include operations, features, means, or instructions for transmitting the monitoring configuration that indicates a set of different activated transmission configuration indicator state IDs, where the set of active beams may be downlink beams and correspond to a set of different root QCL RS IDs for the set of different activated transmission configuration indicator state IDs.

In some examples of the method, apparatuses, and non-transitory computer-readable medium described herein, the set of different root QCL RS IDs may be a set of different root QCL type D RS IDs in a QCL chain.

In some examples of the method, apparatuses, and non-transitory computer-readable medium described herein, transmitting the monitoring configuration may include operations, features, means, or instructions for transmitting the monitoring configuration that indicates a set of different activated spatial relation information IDs that correspond to the set of active beams that may be uplink beams.

In some examples of the method, apparatuses, and non-transitory computer-readable medium described herein, transmitting the monitoring configuration may include operations, features, means, or instructions for transmitting the monitoring configuration that indicates a set of different activated spatial relation information IDs, where the set of active beams may be uplink beams and correspond to a set of different spatial RS IDs for the set of different activated spatial relation information IDs.

Some examples of the method, apparatuses, and non-transitory computer-readable medium described herein may further include operations, features, means, or instructions for receiving a beam failure message corresponding to a first beam of the set of active beams based on the monitoring.

Some examples of the method, apparatuses, and non-transitory computer-readable medium described herein may further include operations, features, means, or instructions for transmitting a second monitoring configuration indicating activation of a second beam that differs from the first beam based on the beam failure message.

Some examples of the method, apparatuses, and non-transitory computer-readable medium described herein may further include operations, features, means, or instructions for receiving a beam measurement report indicating at least one measurement of at least one active beam of the set of beams based on the monitoring.

DETAILED DESCRIPTION

Figure 1:
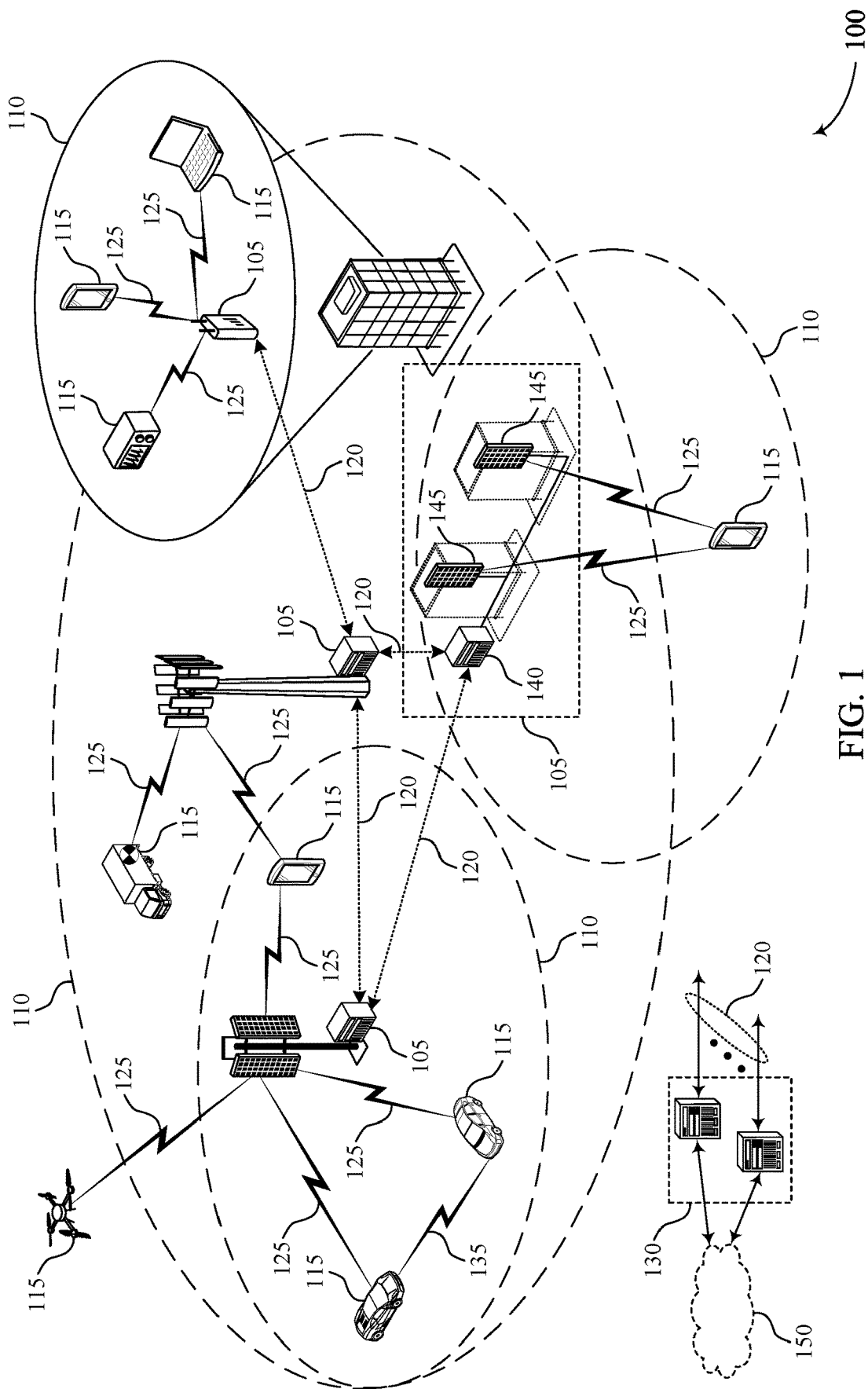
FIG. 1 illustrates an example of a system for wireless communications that supports indication of user equipment (UE) capability for beam failure detection and beam management in accordance with aspects of the present disclosure.

In some wireless communication systems, the complexity in performing beam failure detection (BFD) by a user equipment (UE) may be based on a defined number (e.g., a maximum number) of channel state information reference signal (CSI-RS) resources or synchronization signal blocks (SSB)s across multiple component carriers (CCs) that the UE is capable of monitoring. BFD in conventional wireless communication systems may not account for how often the CSI-RS resources or SSB resources are to be monitored within a given time duration. As a result, a base station may attempt to configure the UE to monitor more resources within a given time duration than the UE is capable of monitoring, which may result in unsatisfactory performance. Further, beam management (BM) measurement complexity may be based on a maximum number of CSI-RS resources or SSB resources for layer 1 (e.g., L1) reference signal receive power (RSRP) (e.g., L1-RSRP) across all CCs in a transmission time interval (TTI), such as a slot. Some BM measurement procedures may not include resources for L1 signal-to-interference-plus-noise ratio (L1-SINR) as an option for a reporting metric, as the BM procedure may only include resources for L1-RSRP reporting as a metric. As such, interference may negatively impact data throughput and conventional procedures may lack a mechanism for reporting interference observed by a UE on a particular beam. Conventional procedures may also lack a definition for the duration in time of a TTI that prevent a UE from meaningfully reporting how many beams the UE supports, how many resources the UE may monitor, or the like, within a given time duration. Specifically, a universal definition of a TTI in cases of mixed numerologies across CCs may result in ambiguity of an indicated UE capability to monitor resources and/or a number of supported beams.

In some wireless communication systems, when a set of transmission configuration indicator (TCI)-state identifiers (IDs) for a physical downlink shared channel (PDSCH) are activated by a medium access control (MAC) control element (MAC-CE) for a set of CCs or bandwidth parts (BWPs) at least for the same frequency band, the applicable list of CCs may be indicated by radio resource control (RRC) signaling, and the same set of TCI-state IDs may be applied for the all BWPs in the indicated CCs. Applying the same set of TCI-state IDs for the all BWPs in the indicated CCs may result in ambiguity in the definition of the number of active downlink beams, uplink beams, or both, resulting in the wireless network in some cases exceeding the number of active downlink or uplink beams the UE is capable of simultaneously supporting for uplink or downlink transmissions.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to indication of UE capability for BFD and beam management.

FIG. 1 illustrates an example of a wireless communications system 100 that supports indication of UE capability for BFD and beam management in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$)

and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple CCs.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals (RSs), beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a RS (e.g., a cell-specific RS (CRS), a channel state information RS (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, RSs, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

One or more UEs 115 and one or more base station 105 may communicate using beams in a beamforming wireless communication system. A UE 115 in a beamforming wireless communication system may perform BFD and beam monitoring. A UE 115 performing beamforming communications, including BFD and beam monitoring, may transmit a capability message to a base station 105. The capability message may indicate a capability of the UE 115 to monitor a defined number of link quality monitoring RS resources, a defined number of CSI measurement RS resources, a defined number of RS resources, a defined number of different active beams, or any combination thereof. Based on the capability of the UE 115, the base station 105 may transmit a monitoring configuration to the UE 115 that indicates a set of resources (e.g., link quality monitoring resources, CSI measurement RS resources, RS resources) or active beams for the UE to monitor and/or to utilize in one or more CCs. The UE 115 may monitor the defined resources or communicate using the beams indicate in the monitoring configuration.

Figure 2:
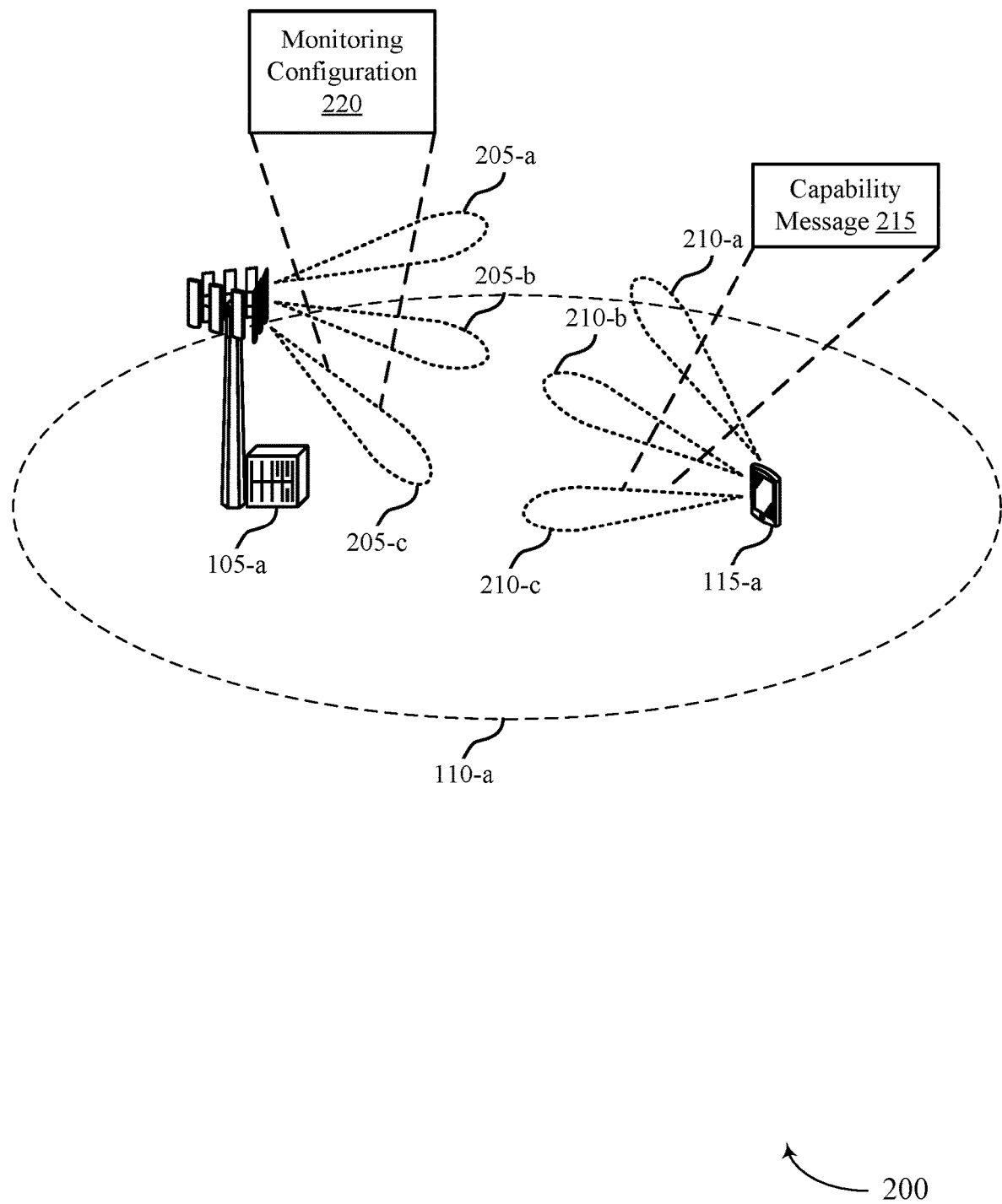
FIG. 2 illustrates an example of a wireless communications system in accordance with aspects of the present disclosure.

FIG. 2 illustrates an example of a wireless communications system 200 that supports indication of UE capability for BFD and beam management in accordance with aspects of the present disclosure. In some examples, wireless communications system 200 may implement aspects of wireless communication system 100. UE 115-a may communicate with base station 105-a within coverage area 110-a using beamforming communications techniques. UE 115-a may transmit to base station 105-a using one or more uplink beams 210 (e.g., uplink beams 210-a, 210-b, and 210-c). Base station 105-a may communicate with UE 115-a using one or more downlink beams 205 (e.g., downlink beams 205-a, 205-b, and 205-c).

UE 115-a may perform BFD during communications with base station 105-a using uplink beams 210 and downlink beams 205. UE 115-a and base station 105-a may communicate over multiple different CCs and frequency ranges (e.g., FR1 and FR2). Each CC or frequency range may have a configured number of resources for different communication types, such as CSI-RS, SSBs, and other RSs. The number of resources for each type of communication and measurement may also vary over time.

UE 115-a may be configured by the network (e.g., via signaling from base station 105-a) to monitor some or a combination of these resources to perform BFD. The monitoring of the resources for BFD may be based on a maximum number of CSI-RS resources, or SSBs for BFD, across multiple CCs, that UE 115-a is capable of monitoring within a given time duration (e.g., one or more symbol periods, slot, subframe, frame, etc.). The monitoring configuration 220 indicated by a base station 105-a may therefore be based on the UE capability to monitor CSI-RS and SSB resources within a given time duration. Although base station 105-a may configure a monitoring configuration 220 for UE 115-a, conventional systems do not consider how often CSI-RS resources or SSBs resources occur within a particular time duration, and may result in the UE 115-a being asked to monitor resources that exceed its capability.

For example, the complexity of beam failure recovery may be based on a maximal number of CSI-RS resources across all CCs in a system that UE 115-a may use to monitor for physical downlink control channel (PDCCH) quality. In another example, beam failure recovery may be based on a maximal number of different SSBs across all CCs for UE 115-a to use to monitor PDCCH quality. In another example, the beam failure recovery may be based on different CSI-RS resources or SSB resources across all CCs for new beam identifications. The beam failure recovery may be a CSI-RS based BFD where UE 115-a monitors a CSI-RS to determine whether beam failure has occurred.

For example, for a first CC, the candidate value may be set from 1 to 16. For a second CC, the candidate value may be set from 1 to 16. For a third CC, the candidate value may be set from 1 to 128. In some cases, UE 115-a may be mandated to support at least 64 CC candidate values. In some cases, there may be mandatory capability signaling for FR2 and optional capability signaling FR1. In some cases, UE 115-a may be mandated to support at least 32 candidate values for FR2.

In order to improve efficiency of beam failure recovery and ensure flexibility and adaptivity of the beam failure recovery configuration, UE 115-a may signal a defined number of resources that UE 115-a is capable of monitoring across a set of CCs within a given time duration (e.g., a slot), and the network (e.g., via signaling from base station 105-a) may configure UE 115-a to monitor the defined number of CSI-RS or SSB resources when UE 115-a performs BFD. The BFD complexity may be based on the maximum number of CSI-RS resources or SSBs resources for BFD or radio link monitoring (RLM) across CCs in a given time period. The resources may be for BFD, RLM, or both. The list of CCs may include serving CCs in all bands, CCs for a particular cell group, CCs for a particular frequency band, or an indicated CC list.

UE 115-a may additionally or alternatively perform beam management. The monitoring configuration 220 of the resources and procedures for UE 115-a to use for beam management and measurement may be indicated to UE 115-a through signaling over downlink beams 205 by base station 105-a. The beam management measurement complexity, depending on UE 115-a capabilities, may be based on a maximum number of CSI-RS or SSB resources for the L1-RSRP across all CCs in a slot. In some cases, the beam management measurement configuration, as indicated by monitoring configuration 220, may only include resources to measure for L1-RSRP and may not include resources to measure for L1-SINR. If UE 115-a uses L1-RSRP measurement and not L1-SINR measurements, UE 115-a may not have an indication of potential interference on one or more beams, and UE 115-a may be constrained to report RSRP of the beam that does not indicate interference. Further, UE 115-a may measure L1-RSRP over particular slots for beam management, and the slots may also not be specifically defined in cases of mixed numerologies across CCs.

For example, the maximum number of SSB resources or CSI-RS resources (e.g., for one transmission) across all CCs configured to measure L1-RSRP within a slot may not exceed a particular configuration (e.g., MB_1). The particular configuration (e.g., MB_1) may be an example of capability signaling. For example, for a first CC 1, the candidate value set of MB_1 may be {0, 8, 16, 32, 64}. On the frequency band FR2, UE 115-a may be mandated to signal MB_1≥8. On FR1, MB_1≥8 may be supported by UE 115-a based on UE 115-a transmitting capability signaling indicating support by UE 115-a.

The available CSI-RS resources may be a sum of aperiodic, periodic, or semi-persistent resources, or a combination of one or more of these. Further, the maximum number of CSI-RS resources (e.g., a sum of aperiodic, periodic, and semi-persistent resources) across all CCs configured to measure the L1-RSRP may not exceed MC_1. On a CC 1a, the candidate value set for MC_1 may be {0, 4, 8, 16, 32, 64}. In some examples, for FR1, UE 115-a may be mandated to report at least 8 as its capability signaling.

In another example, the maximum number of CSI-RS (e.g., two transmission resources) resources (e.g., a sum of periodic, periodic, and semi-persistent resources) across all CCs to measure L1-RRP within a slot may not exceed MB_2. On this second CC, the candidate value set for MB_2 may be {0, 4, 8, 16, 32, 64}.

In some cases, there may be a supported density of CSI-RS resources. The maximum number of aperiodic CSI-RS resources across all the CCs configured to measure L1-RSRP may not exceed MD_1. This candidate set may be a candidate value set of {"not supported", "1 only", "3 only", "both 1 and 3"}. On FR2, UE 115-a may be mandated to signal either "3 only" or "both 1 and 3". On FR1, either "3 only" or "both 1 and 3" may be mandatory for UE capability signaling, rather than both. For a fourth CC, the candidate value set for MD_2 may be {0, 1, 4, 8, 16, 32, 64}. For both FR1 and FR2, UE 115-a may be mandated to report at least 4.

Thus, UE 115-a may ensure a measurement of both power and interference by signaling a defined number of resources over which UE 115-a is capable of monitoring for L1-RSRP and L1-SINR across a set of CCs. The UE capability may be transmitted by UE 115-a in capability message 215. The monitoring configuration 220 may be transmitted by base station 105-a in response to capability message 215. Base station 105-a may configure UE 115-a to monitor no more than the defined number of resources in order for UE 115-a to perform beam management measurements.

The particular characteristics and boundaries of a slot in cases of mixed numerologies may be defined across CCs. In one option, the slot may be defined for all CCs with the same numerology. In a second option, the slot may be based on one numerology across all CCs available (e.g., the highest numerology). In another option, the slot may be defined as any set of overlapped time across CCs. In another option, the slot may be defined independent of any numerology, and the slot may be defined with an absolute time duration. The particular characteristics of the resources that UE 115-a is capable of monitoring, depending on the numerology and slot definition, may be indicated to base station 105-a through a capability message. The capability message may indicate the number of resources that UE 115-a is capable of monitoring in relation to the slot definition.

UE 115-a may also be able to support a set number of unique active uplink beams 210, and a set number of unique downlink beams 205. UE 115-a may indicate a capability to support the number of uplink beams 210 and downlink beams 205 in a capability message 215 transmitted to base station 105-a. Base station 105-a may respond with monitoring configuration 220, indicating to UE 115-a which beams to monitor for.

Figure 3:
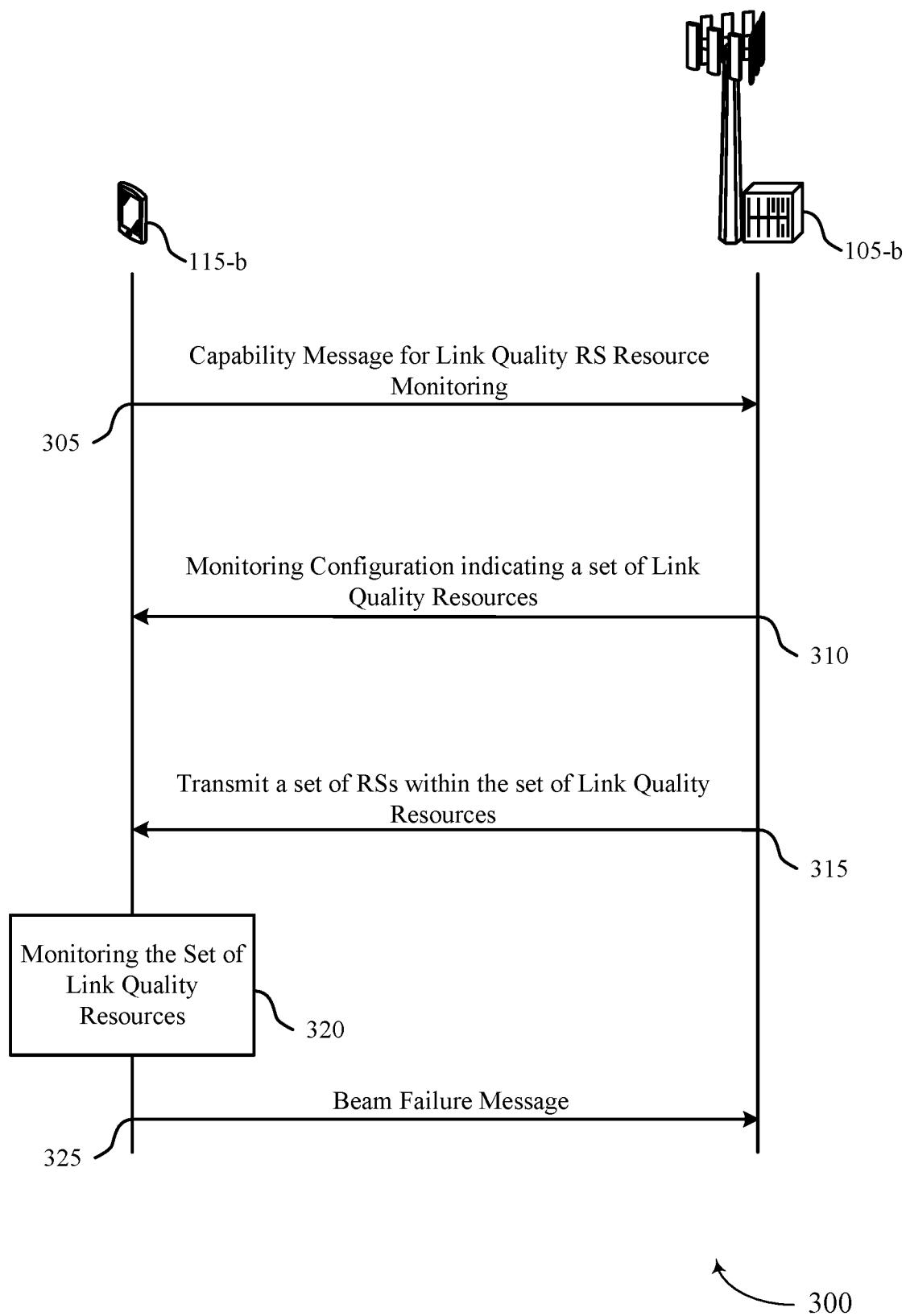
FIG. 3 illustrates an example of a process flow in accordance with aspects of the present disclosure.

FIG. 3 illustrates an example of a process flow 300 that supports indication of UE capability for BFD and beam management in accordance with aspects of the present disclosure. In some examples, process flow 300 may implement aspects of wireless communication systems 100 and 200. UE 115-b may communicate with base station 105-b in a beamforming communications system. UE 115-b may transmit an indication of UE capabilities to base station 105-b, and base station 105-b may transmit an indication of resources for UE 115-b to monitor based on the capabilities of UE 115-b. The techniques described herein may provide an occurrence frequency limit on BFD link quality monitoring RS resources across a set of CCs within a TTI to avoid exceeding the UE capability to monitor those resources.

At 305, UE 115-b may transmit a capability message that indicates a capability UE 115-b to monitor a defined number (e.g., a maximum number) of link quality monitoring RS resources across a set of CCs within a TTI. In some examples, the capability message may indicate a defined number of RS resources (e.g., CSI-RS resources), SSB resources, or both. UE 115-b may transmit the capability message that indicates the capability of UE 115-b to monitor the defined number of link quality monitoring RS resources that are new beam ID resources. UE 115-b may transmit the capability message that indicates the capability of UE 115-b to monitor the defined number of link quality monitoring RS resources across the set of CCs that are a set of serving CCs in a set of frequency bands.

In some examples, UE 115-b may transmit the capability message that indicates the capability of UE 115-b to monitor the defined number of link quality monitoring RS resources across the set of CCs that are a set of serving CCs in a cell group. UE 115-b may also transmit the capability message that indicates the capability of UE 115-b to monitor the defined number of link quality monitoring RS resources across the set of CCs that are a set of serving CCs in a single frequency band. UE 115-b may further transmit the capability message that indicates the capability of UE 115-b to monitor the defined number of link quality monitoring RS resources across the set of CCs and a CC list that identifies the one or more CCs within the set of CCs.

In some examples, UE 115-b may transmit the capability message that indicates the capability of UE 115-b to monitor the defined number of link quality monitoring RS resources across the set of CCs within the TTI that is a slot. The slot may be defined depending on numerologies across the CCs.

At 310, UE 115-b may receive a monitoring configuration that indicates a set of link quality monitoring RS resources for UE 115-b to monitor in one or more CCs within the TTI based on the capability message. The link quality monitoring RS resources may include one or more RLM RSs. The link quality monitoring RS resources may also include one or more BFD RSs.

At 315, base station 105-b may transmit a set of RSs within the set of link quality monitoring RS resources indicated in the monitoring configuration. At 320, UE 115-b may monitor, within the TTI, the set of link quality monitoring RS resources indicated in the monitoring configuration.

When the UE 115-b detects beam failure based on a measurement of one or more of link quality monitoring RS resources, at 325, UE 115-b may transmit a beam failure message that corresponds to a first link quality monitoring RS resource of the set of link quality monitoring RS resources based on the monitoring. In some cases, after reporting beam failure on one or more beams, UE 115-b may receive a second monitoring configuration from base station 105-b that indicates a second link quality monitoring RS resource that differs from the first link quality monitoring RS resource. UE 115-b may communicate using a new beam corresponding to the second link quality monitoring RS resource, and may measure the second link quality monitoring RS resource for detection of beam failure, if any, on the new beam.

Figure 4:
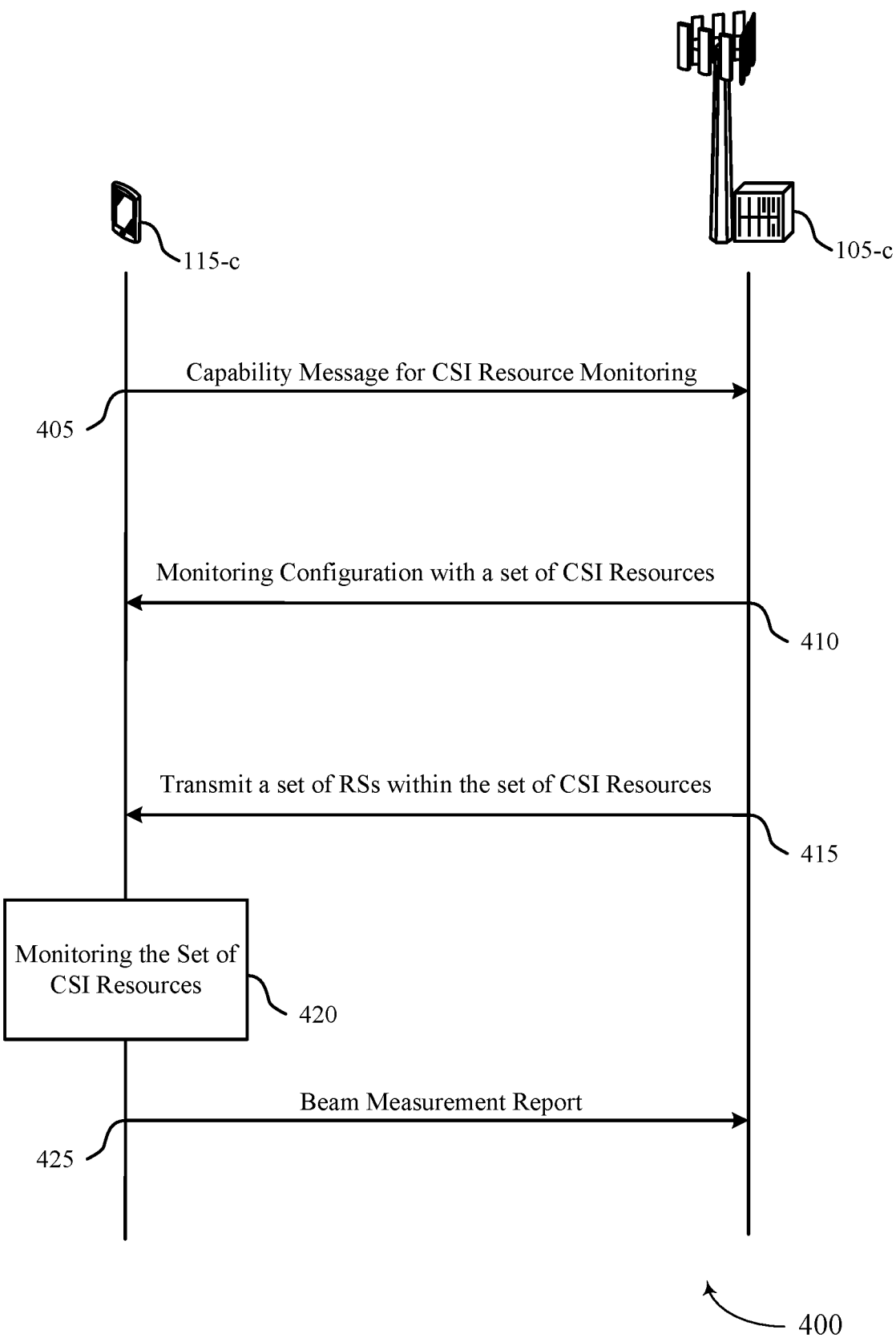
FIG. 4 illustrates an example of a process flow in accordance with aspects of the present disclosure.

FIG. 4 illustrates an example of a process flow 400 that supports indication of UE capability for BFD and beam management in accordance with aspects of the present disclosure. In some examples, process flow 400 may implement aspects of wireless communication system 100. UE 115-c may communicate with base station 105-c in a beamforming communications system. UE 115-c may transmit an indication of UE capabilities to base station 105-c, and base station 105-c may transmit an indication of resources for UE 115-c to monitor base on capabilities of UE 115-c.

At 405, UE 115-c may transmit a capability message that indicates a capability of UE 115-c to monitor a defined number (e.g., maximum number) of CSI measurement RS resources for RSRP measurement, SINR measurement, or both, across a set of CCs within a TTI. In some cases, UE 115-c may transmit the capability message that indicates the capability of UE 115-c to monitor the defined number of CSI measurement RS resources that are RS resources, SSB resources, of both. UE 115-c may also transmit the capability message that indicates the capability of UE 115-c to monitor the defined number of CSI measurement RS resources that are aperiodic resources, periodic resources, semi-static resources, or a combination of these. UE 115-c may further transmit the capability message that indicates the capability of UE 115-c to monitor the defined number of CSI measurements RS resources that is a RSRP resources (e.g., a L1-RSRP resource), a channel measurement report, an interference measurement report, or a combination of these.

At 410, UE 115-c may receive a monitoring configuration that indicates a set of CSI measurement RS resources for UE 115-c to monitor in one or more CCs within the TTI based on the capability message.

At 415, base station 105-c may transmit, within the TTI, a set of RSs within the set of CSI measurement RS resources indicated in the monitoring configuration.

At 420, UE 115-c may monitor, within the TTI, the set of CSI measurement RS resources indicated in the monitoring configuration. The RS resources may be for L1-RSRP measurement, for a L1-SINR measurement of a CSI-RS channel measurement resource (CMR), for a L1-SINR measurement of an interference measurement resource (IMR), or a combination of these.

At 425, UE 115-c may transmit a beam measurement report indicating the at least one measurement that is the L1-RSRP measurement, the L1-SINR measurement of the CMR, the L1-SINR measurement of the IMR, or a combination of these. The base station 105-c may receive the report and may utilize to configure which beams are used for communication with the UE 115-c. In some cases, the base station 105-c may maintain one or more currently configured beams, or may change one or more configured beams, based on the report.

Figure 5:
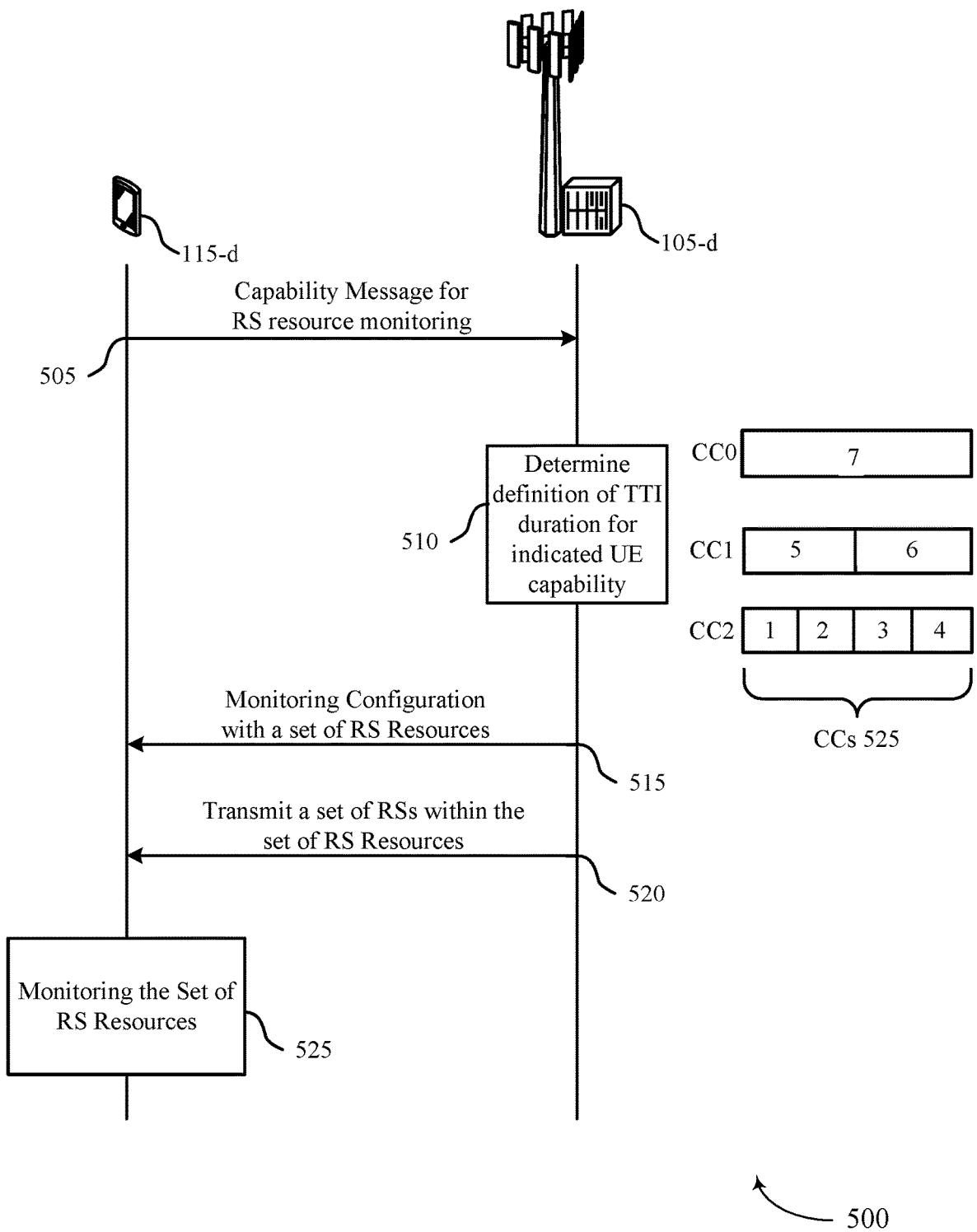
FIG. 5 illustrates an example of a process flow in accordance with aspects of the present disclosure.

FIG. 5 illustrates an example of a process flow 500 that supports indication of UE capability for BFD and beam management in accordance with aspects of the present disclosure. In some examples, process flow 500 may implement aspects of wireless communication systems 100 and 200. UE 115-d may communicate with base station 105-d in a beamforming communications system. UE 115-d may transmit an indication of UE capabilities to base station 105-d, and base station 105-d may transmit an indication of resources for UE 115-d to monitor base on capabilities of UE 115-d. In some cases, the UE 115-d may be configured to communicate with the base station 105-d over a set of CCs, and in some cases, the CCs may not all have the same numerology. The techniques described herein provide for definition of UE capability and for defining the duration of a TTI corresponding to the UE capability.

At 505, UE 115-d may transmit a capability message that indicates a capability of UE 115-d to monitor a defined number (e.g., a maximum) of RS resources across a set of CCs within a TTI and indicates a duration of the TTI, a first numerology of the first CC of the set of CCs being different than a second numerology of a second CC of the set of CCs.

In some examples, UE 115-*d* may transmit the capability message that indicates the duration of the TTI based on a subset of the set of CCs that have a same numerology. UE 115-*d* may transmit the capability message that indicates the duration of the TTI based on one numerology of the set of CCs. The one numerology may be a highest numerology of the set of CCs, or any other numerology.

UE 115-*d* may transmit the capability message that indicates the duration of the TTI based on a set of TTIs overlapping in time across the set of CCs. UE 115-*d* may transmit the capability message that indicates the duration of the TTI based on a reference time duration (e.g., an absolute time duration that is independent of any numerology). The set of RS resources may include RSs for link quality monitoring, one or more RLM RSs, one or more BFD RSs, RSs for CSI measurement, RSs for L1-RSRP measurement, L1-SINR measurement, or both, or a combination of these.

UE 115-*d* may support a particular density of these resources. For example, UE 115-*d* may support a maximum number of aperiodic CSI-RS resources across example slots in CCs 525, and UE 115-*d* may be configured to measure L1-RSRP that may not exceed the UE capability for the numerology. UE 115-*d* may transmit the UE capability which may be in the form of a candidate slot as numbered from a candidate set. The candidate slot number may indicate the resources or numerology supported by UE 115-*d*. This candidate set may be a candidate value of a set of, for example, {"not supported", "1 only", "3 only", "both 1 and 3"}.

At 510, base station 105-*d* may determine the definition of a TTI duration for the indicated UE capability. In some cases, the UE capability may be for a TTI having a duration defined for all CCs with the same numerology. In a second option, the UE capability may be for a TTI having a duration defined on one numerology across all CCs available (e.g., the highest numerology). In another option, the slot may be defined independent of any numerology, and the slot may be defined with an absolute time duration. In another option, the slot may be defined as any set of overlapped time across CCs. For example, CC0, CC1, and CC2 may have overlap in time and may have TTIs of different durations. In the depicted example, the TTI of CC0 may have a longest duration, the TTI of CC1 may be half the duration of the TTI of CC0, and the TTI of CC2 may be half the duration of the TTI of CC1. For overlapping TTIs of different durations, the base station 105-*d* may configure the UE 115-*d* up to its reported RS resource monitoring capability. For example, 7 TTIs fall within the duration of the TTI of CC0. If UE 115-*d* reports being capable of monitoring 7 or more RS resources, the base station 105-*d* may configure UE 115-*d* to monitor a RS resource in each of the 7 overlapping TTIs across CC0, CC1, and CC2. If UE 115-*d* reports being capable of monitoring 6 or fewer RS resources, the base station 105-*d* may configure UE 115-*d* to monitor no more than the reported number of RS resources across the 7 overlapping TTIs CC0, CC1, and CC2. For example, if UE 115-*d* reports being capable of monitoring 3 RS resources, the base station 105-*d* may configure UE 115-*d* to monitor 3 RS resources across the 7 overlapping TTIs CC0, CC1, and CC2 (e.g., TTI7, TTI5, and TT2).

At 515, UE 115-*d* may receive a monitoring configuration that indicates a set of RS resources for UE 115-*d* to monitor in one or more CCs within the TTI based on the capability message. The monitoring configuration may be determined by base station 105-*d* based on the information in the capability message. For example, for FR2 as described herein, and based on the capability message, UE 115-*d* may be configured, by base station 105-*d* to signal a particular CC or candidate slot value. For example, on FR2, UE 115-*d* may be configured to signal either "3 only" or "both 1 and 3", in terms of which slot or TTI UE 115-*d* may measure based on the numerology of CCs 525. UE 115-*d*, for FR1, may be configured for either "3 only" or "both 1 and 3". For a fourth CC, the candidate value set for MD_2 may be {0, 1, 4, 8, 16, 32, 64}. For both FR1 and FR2, UE 115-*d* may be mandated to report at least 4 candidate slots in this case of the fourth CC.

At 520, base station 105-*d* may transmit, within the TTI (e.g., one or more of slots 1 through 7 in CCs 525), a set of RSs within the set of RS resources indicated in the monitoring configuration. At 525, UE 115-*d* may monitor, within the TTI, the set of RS resources indicated in the monitoring configuration. In some cases, the UE 115-*d* may generate measurements of the RS resources for detecting whether beam failure has occurred, or for beam measurement reporting, as described herein.

Figure 6:
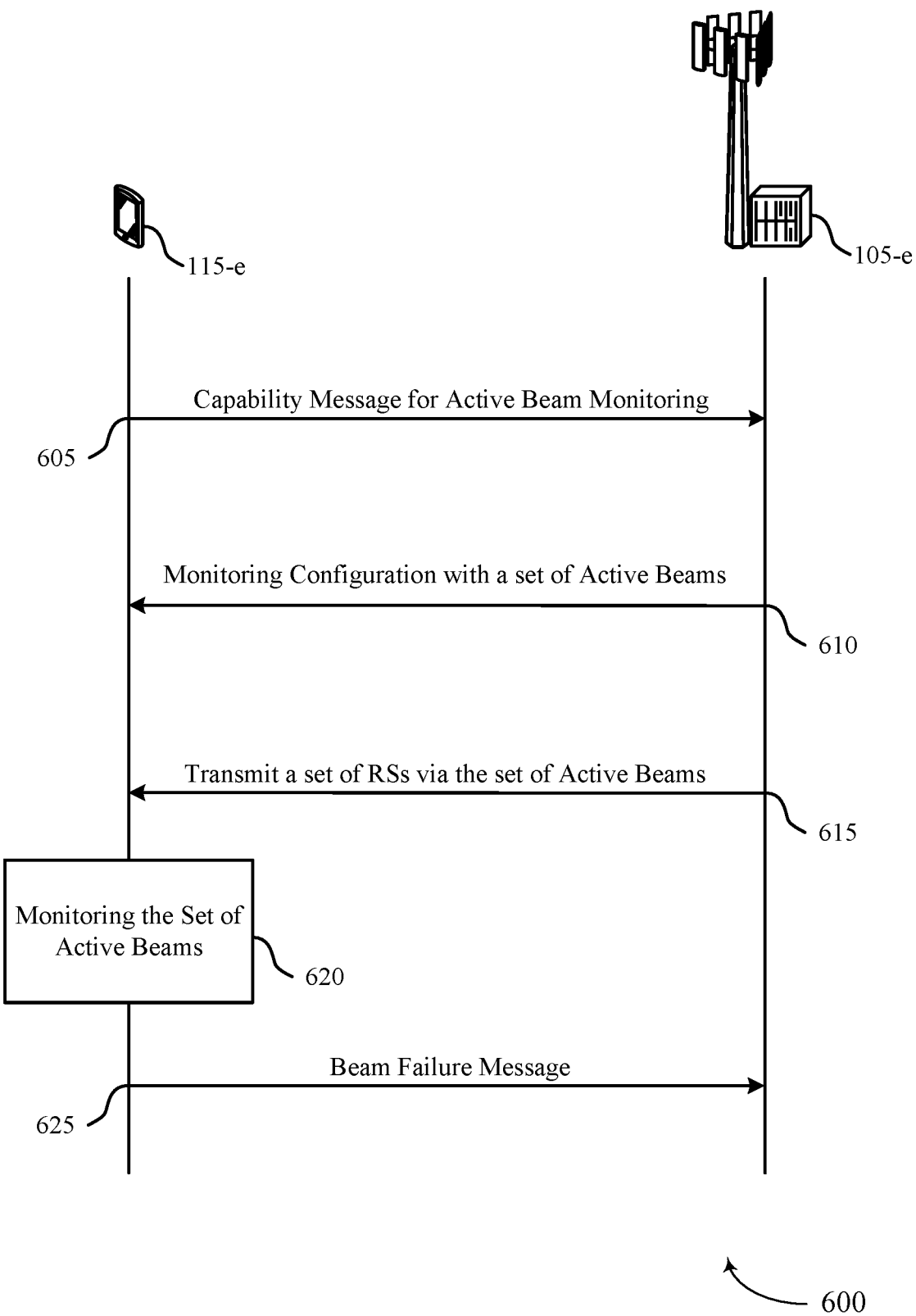
FIG. 6 illustrates an example of a process flow in accordance with aspects of the present disclosure.

FIG. 6 illustrates an example of a process flow 600 that supports indication of UE capability for BFD and beam management in accordance with aspects of the present disclosure. In some examples, process flow 600 may implement aspects of wireless communication systems 100 and 200. UE 115-*e* may communicate with base station 105-*e* in a beamforming communications system. UE 115-*e* may transmit an indication of UE capabilities to base station 105-*e*, and base station 105-*e* may transmit an indication of resources for UE 115-*e* to monitor base on capabilities of UE 115-*e*. In some examples, base station 105-*e* may transmit control signaling (e.g., RRC signaling) that indicates a list of CC. When base station 105-*e* activates a set of TCI-state IDs for PDSCH by a MAC CE for a set of CCs or BWPs at least for the same band, where the applicable list of CCs is indicated by RRC signaling, the same set of TCI-state IDs are applied for all BWPs in the indicated CCs. The UE 115-*e* may report its capability to support a defined number (e.g., maximum) of unique beams for a group of CCs or BWPs. The techniques may provide for the UE 115-*e* to indicate a maximum number of supported active beams that avoids ambiguity, and the following techniques provide for defining the maximum number based on unique TCI state IDs, spatial relation information IDs, or both.

At 605, UE 115-*e* may transmit a capability message that indicates a capability of UE 115-*e* to monitor a defined number of different active beams across a set of CCs or a set of BWPs. In some cases, UE 115-*e* may transmit the capability message that indicate the capability of UE 115-*e* to monitor the defined number of different active beams that are one or more downlink beams (e.g., downlink beams 205), one or more uplink beams (e.g., uplink beams 210) or any combination of these.

The defined number of beams may be a maximum supported number of different active beams. In some cases, the maximum supported number of different active beams that are downlink beams may be defined based on a number of different activate TCI-state IDs. In some cases, the maximum supported number of different active beams that are downlink beams may be based on a number of different quasi co-location (QCL) RS IDs for a set of different activated TCI-states IDs. In some cases, the maximum supported number of different active beams that are downlink beams may be defined based on a number of different QCL RS IDs for a set of different activated TCI-state IDs.

In some cases, the maximum number of different active beams that are uplink beams may be defined based on a number of different activated spatial relation IDs that correspond to the set of active beams that are uplink beams. In some cases, the maximum supported number of different active beams that are uplink beams is defines based on a number of different spatial RS IDs for a set of different activated spatial relation IDs.

At 610, UE 115-*e* may receive a monitoring configuration that indicates a set of active beams for UE 115-*e* to monitor across one or more CCs or one or more BWPs based on the capability message. UE 115-*e* may receive the monitoring configuration that indicates a set of different activated TCI-state IDs that correspond to the set of active beams that are downlink beams. For example, the monitoring configuration may indicate one or more unique activated TCI state IDs to identify the one or more unique active downlink (DL) beams (e.g., unique active DL beams may be identified by unique activated TCI state IDs). In another example, the UE 115-*e* may also receive the monitoring configuration that indicates a set of different activated TCI-states IDs, where the set of active beams are downlink beams and correspond to a set of different QCL RS IDs for the set of different activated TCI-state IDs. The set of different QCL RS IDs may be a set of QCL Type-D RS IDs. For example, the monitoring configuration may indicate one or more activated TCI states, and the set of unique active downlink beams correspond to one or more unique QCL Type-D RS IDs in the one or more activated TCI states.

In another example, UE 115-*e* may receive the monitoring configuration that indicates a set of different activated TCI-state IDs, where the set of active beams may be downlink beams and may correspond to a set of different QCL RS IDs for the set of different activated TCI-state IDs. In some cases, the set of different root QCL RS IDs may be a set of different root QCL Type-D RS IDs in a QCL chain. For example, the monitoring configuration may indicate one or more activated states in a QCL chain, and the set of unique active downlink beams correspond to one or more unique root QCL Type-D RS IDs of the one or more activated TCI states in the QCL chain.

In another example, UE 115-*e* may receive the monitoring configuration that indicates a set of different activated spatial relation information IDs that correspond to the set of active beams that are uplink beams. For example, the monitoring configuration may indicate one or more unique activated spatial relation information IDs, and the one or more unique active uplink (UL) beams may be identified by the one or more unique activated spatial relation information IDs.

In a further example, UE 115-*e* may also receive the monitoring configuration that may indicates a set of different activated spatial relation information IDs, where the set of active beams may be uplink beams and may correspond to a set of different spatial RS IDs for the set of different activated spatial relation information IDs. For example, the monitoring configuration may indicate activated spatial relation information, and the one or more unique active UL beams may be identified by the unique spatial reference signal identifiers in the activated spatial relation information.

At 615, base station 105-*e* may transmit a set of RSs via the set of active beams in accordance with the monitoring configuration. At 620, UE 115-*e* may monitor the set of active beams indicated in the monitoring configuration.

At 625, UE 115-*e* may transmit a beam failure message corresponding to a first beam of the set of active beams based on the monitoring. In some cases, UE 115-*e* may receive a second monitoring configuration indicating activation of a second beam that differs from the first beam based on the beam failure message. In some cases, UE 115-*e* may transmit a beam measurement report of at least one active beam of the set of beams based on the monitoring. In some cases, the UE 115-*e* may generate measurements of the unique active DL beams, UL beams, or both, for detecting whether beam failure has occurred, or for beam measurement reporting, as described herein.

Figure 7:
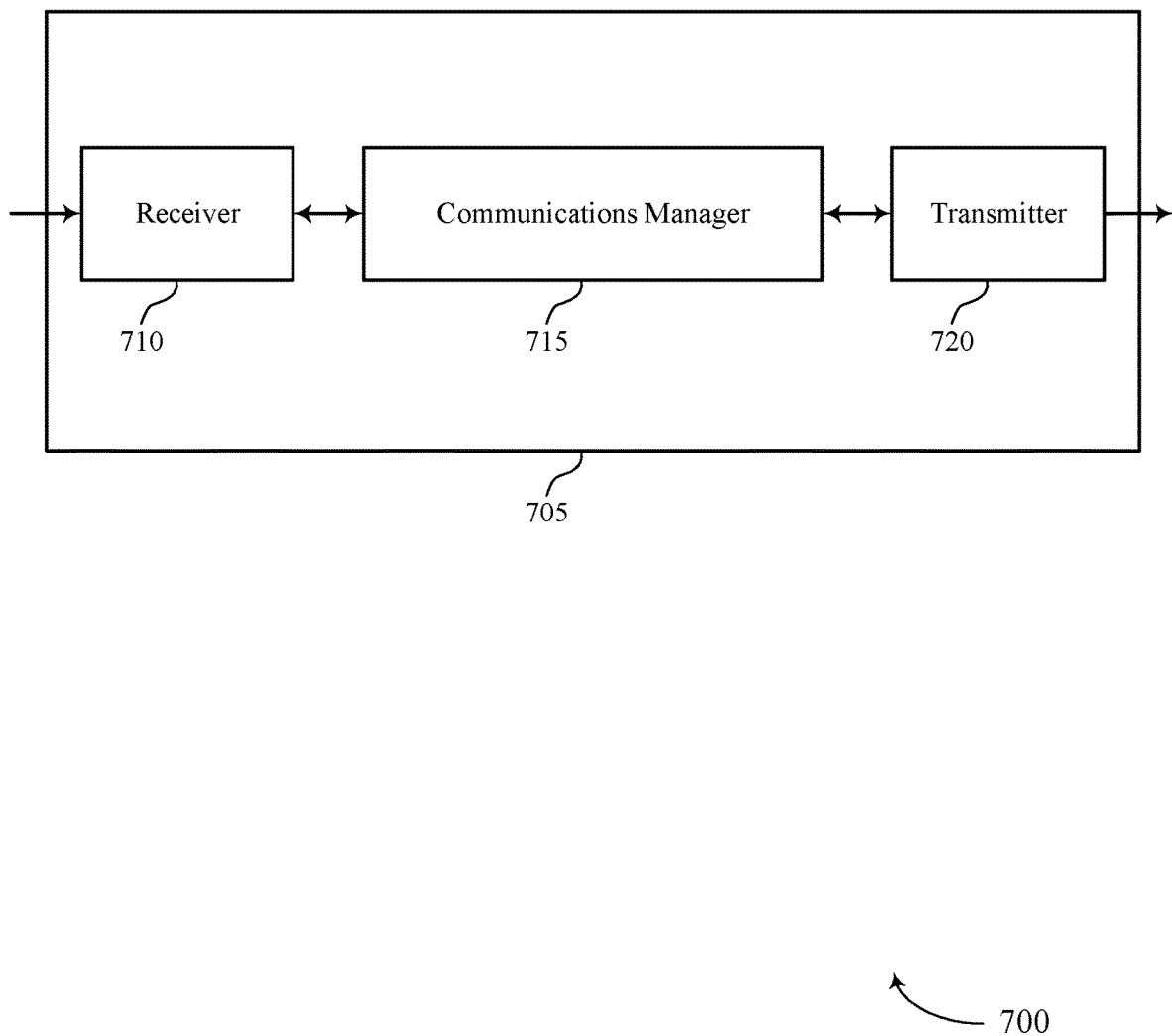
FIGS. 7 and 8 show block diagrams of devices in accordance with aspects of the present disclosure.

FIG. 7 shows a block diagram 700 of a device 705 that supports indication of UE capability for BFD and beam management in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to indication of UE capability for BFD and beam management, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may transmit a capability message that indicates a capability of the UE to monitor a defined number of resources across a set of CCs within a TTI, receive a monitoring configuration that indicates a set of resources for the UE to monitor in one or more CCs within the TTI based on the capability message, and monitor, within the TTI, the set of resources indicated in the monitoring configuration. The communications manager 715 may transmit a capability message that indicates a capability of the UE to monitor a defined number of link quality monitoring RS resources across a set of CCs within a TTI, receive a monitoring configuration that indicates a set of link quality monitoring RS resources for the UE to monitor in one or more CCs within the TTI based on the capability message, and monitor, within the TTI, the set of link quality monitoring RS resources indicated in the monitoring configuration. The communications manager 715 may also transmit a capability message that indicates a capability of the UE to monitor a defined number of channel state information measurement RS resources for RSRP measurement, interference measurement, or both, across a set of CCs within a TTI, receive a monitoring configuration that indicates a set of channel state information measurement RS resources for the UE to monitor in one or more CCs within the TTI based on the capability message, and monitor, within the TTI, the set of channel state information measurement RS resources indicated in the monitoring configuration. The communications manager 715 may also transmit a capability message that indicates a capability of the UE to monitor a defined number of RS resources across a set of CCs within a TTI and indicates a duration of the TTI, a first numerology of a first CC of the set of CCs being different than a second numerology of a second CC of the set of CCs, receive a monitoring configuration that indicates a set of RS resources for the UE to monitor in one or more CCs within the TTI based on the capability message, and monitor, within the TTI, the set of RS resources indicated in the monitoring configuration. The communications manager 715 may also transmit a capability message that indicates a capability of the UE to monitor a defined number of different active beams across a set of CCs or a set of bandwidth parts, receive a monitoring configuration that indicates a set of active beams for the UE to monitor across one or more CCs or one or more bandwidth parts based on the capability message, and monitor the set of active beams indicated in the monitoring configuration. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the communications manager 715 described herein may be implemented as a chipset of a wireless modem, and the receiver 710 and the transmitter 720 may be implemented as sets of analog components (e.g., amplifiers, filters, phase shifters, antennas, etc.) The wireless modem may obtain and decode signals from the receiver 710 over a receive interface, and may output signals for transmission to the transmitter 720 over a transmit interface.

The actions performed by communications manager 715 as described herein may be implemented to realize one or more potential advantages. One implementation may allow the device 705 (e.g., a UE 115) to save power and increase battery life by improving the efficiency of the BFD and BM by the device 705. Improvement in BFD and BM may enable the device 705 to decrease the number of retransmissions and thereby improve battery life and overall communications efficiency. In some examples, the device 705 may signal a number of resources that the device 705 may be capable of monitoring for across a set of CCs within a given time duration (e.g., a slot), and the network may configure the device 705 to monitor no more than the indicated number of resources for performing BFD or beam management. As such, the device 705 perform BFD and beam management more accurately and efficiently.

Figure 8:
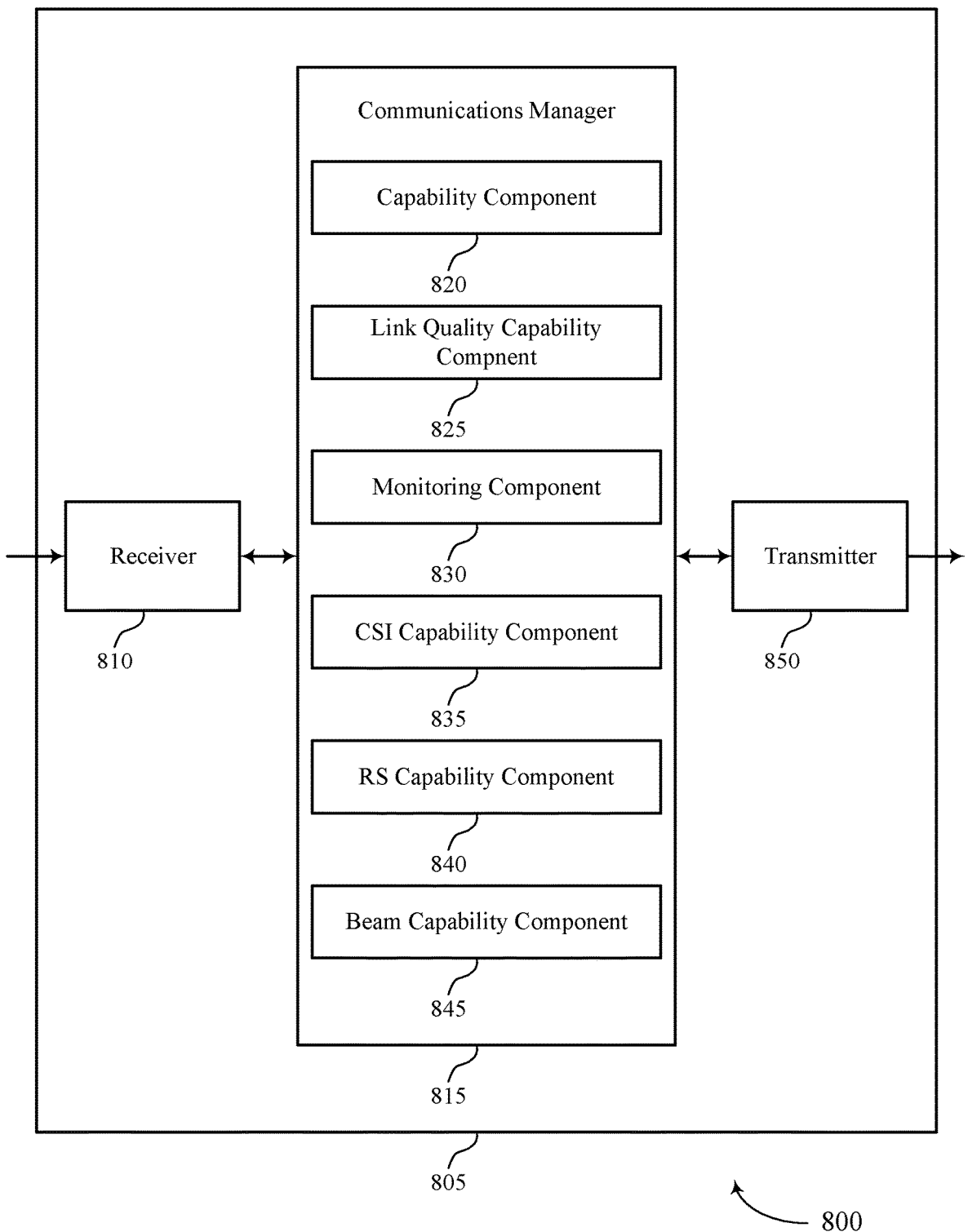

FIG. 8 shows a block diagram 800 of a device 805 that supports indication of UE capability for BFD and beam management in accordance with aspects of the present disclosure. The device 805 may be an example of aspects of a device 705, or a UE 115 as described herein. The device 805 may include a receiver 810, a communications manager 815, and a transmitter 850. The device 805 may also include a processor. Each of these components may be in communication with one another (e.g., via one or more buses).

The receiver 810 may receive information such as packets, user data, or control information associated with various information channels (e.g., control channels, data channels, and information related to indication of UE capability for BFD and beam management, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a capability component 820, a link quality capability component 825, a monitoring component 830, a CSI capability component 835, a RS capability component 840, and a beam capability component 845. The communications manager 815 may be an example of aspects of the communications manager 1010 described herein.

The capability component 820 may transmit a capability message that indicates a capability of the UE to monitor a defined number of resources across a set of CCs within a TTI.

The monitoring component 830 may receive a monitoring configuration that indicates a set of resources for the UE to monitor in one or more CCs within the TTI based on the capability message. The monitoring component 830 may monitor, within the TTI, the set of resources indicated in the monitoring configuration.

The link quality capability component 825 may transmit a capability message that indicates a capability of the UE to monitor a defined number of link quality monitoring RS resources across a set of CCs within a TTI.

The monitoring component 830 may receive a monitoring configuration that indicates a set of link quality monitoring RS resources for the UE to monitor in one or more CCs within the TTI based on the capability message. The monitoring component 830 may monitor, within the TTI, the set of link quality monitoring RS resources indicated in the monitoring configuration.

The CSI capability component 835 may transmit a capability message that indicates a capability of the UE to monitor a defined number of CSI measurement RS resources for RSRP measurement, interference measurement, or both, across a set of CCs within a TTI.

The monitoring component 830 may receive a monitoring configuration that indicates a set of channel state information measurement RS resources for the UE to monitor in one or more CCs within the TTI based on the capability message. The monitoring component 830 may monitor, within the TTI, the set of channel state information measurement RS resources indicated in the monitoring configuration.

The RS capability component 840 may transmit a capability message that indicates a capability of the UE to monitor a defined number of RS resources across a set of CCs within a TTI and indicates a duration of the TTI, a first numerology of a first CC of the set of CCs being different than a second numerology of a second CC of the set of CCs.

The monitoring component 830 may receive a monitoring configuration that indicates a set of RS resources for the UE to monitor in one or more CCs within the TTI based on the capability message. The monitoring component 830 may monitor, within the TTI, the set of RS resources indicated in the monitoring configuration.

The beam capability component 845 may transmit a capability message that indicates a capability of the UE to monitor a defined number of different active beams across a set of CCs or a set of bandwidth parts.

The monitoring component 830 may receive a monitoring configuration that indicates a set of active beams for the UE to monitor across one or more CCs or one or more bandwidth parts based on the capability message. The monitoring component 830 may monitor the set of active beams indicated in the monitoring configuration.

The transmitter 850 may transmit signals generated by other components of the device 805. In some examples, the transmitter 850 may be collocated with a receiver 810 in a transceiver module. For example, the transmitter 850 may be an example of aspects of the transceiver 1020 described with reference to FIG. 10. The transmitter 850 may utilize a single antenna or a set of antennas.

A processor of a UE 115 (e.g., controlling the receiver 810, the transmitter 850, or the transceiver 1020, as described with reference to FIG. 10) may efficiently determine to transmit, via transmitter 850, an indication of UE capabilities to a base station 105. The actions of the processor to configure the transmission of the UE capabilities may improve the efficiency of the UE 115, by improving utilization of resources, measurement of RSs, and thereby decrease number of retransmissions. The decrease in the number of retransmissions, by improving beamforming communication efficiency and reliability, may improve battery life and save power at a UE 115.

Figure 9:
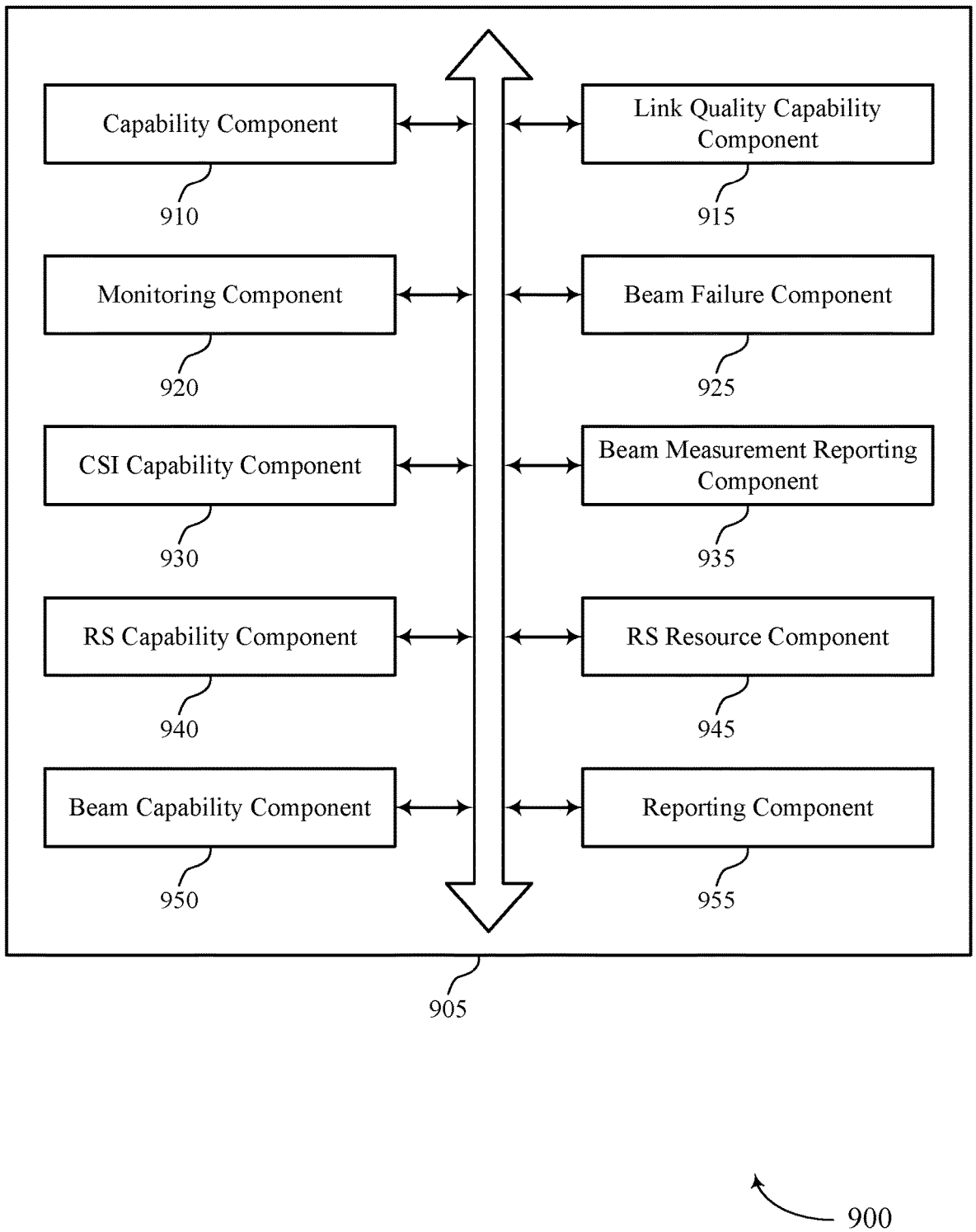
FIG. 9 shows a block diagram of a communications manager in accordance with aspects of the present disclosure.

FIG. 9 shows a block diagram 900 of a communications manager 905 that supports indication of UE capability for BFD and beam management in accordance with aspects of the present disclosure. The communications manager 905 may be an example of aspects of a communications manager 715, a communications manager 815, or a communications manager 1010 described herein. The communications manager 905 may include a capability component 910, a link quality capability component 915, a monitoring component 920, a beam failure component 925, a CSI capability component 930, a beam measurement reporting component 935, a RS capability component 940, a RS resource component 945, a beam capability component 950, and a reporting component 955. Each of these modules may communicate, directly or indirectly, with one another (e.g., via one or more buses).

The capability component 910 may transmit a capability message that indicates a capability of the UE to monitor a defined number of resources across a set of CCs within a TTI.

In some examples, the capability component 910 may transmit the capability message that indicates the capability of the UE to monitor the defined number of resources that are CMRs for signal to interference plus noise measurement. In some examples, the signal to interference plus noise measurement is a L1-SINR measurement of a CMR of the set of resources.

In some examples, the capability component 910 may transmit the capability message that indicates the capability of the UE to monitor the defined number of resources that are IMRs for signal to interference plus noise measurement.

In some examples, the signal to interference plus noise measurement is a L1-SINR measurement of an IMR of the set of resources.

In some examples, the capability component 910 may transmit the capability message that indicates the capability of the UE to monitor the defined number of resources or a maximum number of resources within a TTI.

In some examples, the capability component 910 may transmit the capability message that indicates the capability of the UE to monitor the defined number of resources that are RSs, SSBs, or both.

In some examples, the capability component 910 may transmit the capability message that indicates the capability of the UE to monitor the defined number of resources across the set of CCs that are a set of serving CCs in a set of frequency bands.

In some examples, the capability component 910 may transmit the capability message that indicates the capability of the UE to monitor the defined number of resources across the set of CCs that are a set of serving CCs in a cell group.

In some examples, the capability component 910 may transmit the capability message that indicates the capability of the UE to monitor the defined number of resources across the set of CCs that are a set of serving CCs in a single frequency band.

In some examples, the capability component 910 may transmit the capability message that indicates the capability of the UE to monitor the defined number of resources across the set of CCs within the TTI that is a slot. In some examples, the TTI is a slot and a duration of the slot is based on a numerology of at least one CC of the set of CCs.

In some examples, the capability component 910 may transmit the capability message that indicates the capability of the UE to monitor the defined number of resources that include one or more new beam identification resources.

In some examples, the capability component 910 may transmit the capability message that indicates the capability of the UE to monitor the defined number of resources that include one or more RS resources for RSRP measurement, one or more RS resources for signal to interference plus noise measurement, one or more RS resources for BFD, one or more RS resources for RLM, one or more RS resources for link quality monitoring, one or more RS resources for CSI measurement, or any combination thereof.

The link quality capability component 915 may transmit a capability message that indicates a capability of the UE to monitor a defined number of link quality monitoring RS resources across a set of CCs within a TTI.

In some examples, the link quality capability component 915 may transmit the capability message that indicates the capability of the UE to monitor the defined number of link quality monitoring RS resources that are RS resources, synchronization signal block resources, or both.

In some examples, the link quality capability component 915 may transmit the capability message that indicates the capability of the UE to monitor the defined number of link quality monitoring RS resources that are new beam identification resources.

In some examples, the link quality capability component 915 may transmit the capability message that indicates the capability of the UE to monitor the defined number of link quality monitoring RS resources across the set of CCs that are a set of serving CCs in a set of frequency bands.

In some examples, the link quality capability component 915 may transmit the capability message that indicates the capability of the UE to monitor the defined number of link quality monitoring RS resources across the set of CCs that are a set of serving CCs in a cell group.

In some examples, the link quality capability component 915 may transmit the capability message that indicates the capability of the UE to monitor the defined number of link quality monitoring RS resources across the set of CCs that are a set of serving CCs in a single frequency band.

In some examples, the link quality capability component 915 may transmit the capability message that indicates the capability of the UE to monitor the defined number of link quality monitoring RS resources across the set of CCs and a CC list that identifies the set of CCs.

In some examples, the link quality capability component 915 may transmit the capability message that indicates the capability of the UE to monitor the defined number of link quality monitoring RS resources across the set of CCs within the TTI that is a slot.

In some cases, the set of link quality monitoring RS resources include one or more radio link monitoring RSs.

In some cases, the set of link quality monitoring RS resources include one or more BFD RSs.

The monitoring component 920 may receive a configuration that indicates a set of resources for the UE to monitor in one or more CCs within the TTI based on the capability message.

In some examples, the monitoring component 920 may receive a monitoring configuration that indicates a set of link quality monitoring RS resources for the UE to monitor in one or more CCs within the TTI based on the capability message.

In some examples, the monitoring component 920 may receive a monitoring configuration that indicates a set of channel state information measurement RS resources for the UE to monitor in one or more CCs within the TTI based on the capability message.

In some examples, the monitoring component 920 may receive a monitoring configuration that indicates a set of RS resources for the UE to monitor in one or more CCs within the TTI based on the capability message.

In some examples, the monitoring component 920 may receive a monitoring configuration that indicates a set of active beams for the UE to monitor across one or more CCs or one or more bandwidth parts based on the capability message.

In some examples, the monitoring component 920 may receive a second monitoring configuration that indicates a second link quality monitoring RS resource that differs from the first link quality monitoring RS resource.

In some examples, the monitoring component 920 may receive the monitoring configuration that indicates a set of different activated transmission configuration indicator state identifiers that correspond to the set of active beams that are downlink beams.

In some examples, the monitoring component 920 may receive the monitoring configuration that indicates a set of different activated transmission configuration indicator state identifiers, where the set of active beams are downlink beams and correspond to a set of different QCL RS identifiers for the set of different activated transmission configuration indicator state identifiers.

In some examples, the monitoring component 920 may receive the monitoring configuration that indicates a set of different activated transmission configuration indicator state identifiers, where the set of active beams are downlink beams and correspond to a set of different root QCL RS identifiers for the set of different activated transmission configuration indicator state identifiers.

In some examples, the monitoring component 920 may receive the monitoring configuration that indicates a set of different activated spatial relation information identifiers that correspond to the set of active beams that are uplink beams.

In some examples, the monitoring component 920 may receive the monitoring configuration that indicates a set of different activated spatial relation information identifiers, where the set of active beams are uplink beams and correspond to a set of different spatial RS identifiers for the set of different activated spatial relation information identifiers.

In some cases, the set of different QCL RS identifiers are a set of QCL type D RS identifiers.

In some cases, the set of different root QCL RS identifiers are a set of different root QCL type D RS identifiers in a QCL chain.

In some examples, the monitoring component 920 may monitor, within the TTI, the set of resources indicated in the monitoring configuration.

In some examples, the monitoring component 920 may monitor, within the TTI, the set of link quality monitoring RS resources indicated in the monitoring configuration.

In some examples, the monitoring component 920 may monitor, within the TTI, the set of channel state information measurement RS resources indicated in the monitoring configuration.

In some examples, the monitoring component 920 may monitor, within the TTI, the set of RS resources indicated in the monitoring configuration.

In some examples, the monitoring component 920 may monitor the set of active beams indicated in the monitoring configuration.

The CSI capability component 930 may transmit a capability message that indicates a capability of the UE to monitor a defined number of channel state information measurement RS resources for RSRP measurement, interference measurement, or both, across a set of CCs within a TTI.

In some examples, the CSI capability component 930 may transmit the capability message that indicates the capability of the UE to monitor the defined number of channel state information measurement RS resources that are RS resources, synchronization signal block resources, or both.

In some examples, the CSI capability component 930 may transmit the capability message that indicates the capability of the UE to monitor the defined number of channel state information measurement RS resources that are aperiodic resources, periodic resources, semi-static resources, or any combination thereof.

In some examples, the CSI capability component 930 may transmit the capability message that indicates the capability of the UE to monitor the defined number of channel state information measurement RS resources that is a RSRP resource, a CMR, an IMR, or any combination thereof.

The RS capability component 940 may transmit a capability message that indicates a capability of the UE to monitor a defined number of RS resources across a set of CCs within a TTI and indicates a duration of the TTI, a first numerology of a first CC of the set of CCs being different than a second numerology of a second CC of the set of CCs.

In some examples, the RS capability component 940 may transmit the capability message that indicates the duration of the TTI based on a subset of the set of CCs that have a same numerology.

In some examples, the RS capability component 940 may transmit the capability message that indicates the duration of the TTI based on one numerology of the set of CCs.

In some examples, the RS capability component 940 may transmit the capability message that indicates the duration of the TTI based on a set of TTIs overlapping in time across the set of CCs.

In some examples, the RS capability component 940 may transmit the capability message that indicates the duration of the TTI based on a reference time duration.

In some cases, the one numerology is a highest numerology of the set of CCs.

The beam capability component 950 may transmit a capability message that indicates a capability of the UE to monitor a defined number of different active beams across a set of CCs or a set of bandwidth parts.

In some examples, the beam capability component 950 may transmit the capability message that indicates the capability of the UE to monitor the defined number of different active beams that are one or more downlink beams, one or more uplink beams, or any combination thereof.

In some cases, the defined number is a maximum supported number of different active beams.

In some cases, the maximum supported number of different active beams that are downlink beams is defined based on a number of different activated transmission configuration indicator state identifiers.

In some cases, the maximum supported number of different active beams that are downlink beams is defined based on a number of different QCL RS identifiers for a set of different activated transmission configuration indicator state identifiers.

In some cases, the maximum supported number of different active beams that are downlink beams is defined based on a number of different root QCL RS identifiers for a set of different activated transmission configuration indicator state identifiers.

In some cases, the maximum supported number of different active beams that are uplink beams is defined based on a number of different activated spatial relation information identifiers that correspond to the set of active beams that are uplink beams.

In some cases, the maximum supported number of different active beams that are uplink beams is defined based on a number of different spatial RS identifiers for a set of different activated spatial relation information identifiers.

The beam failure component 925 may transmit a beam failure message corresponding to a first link quality monitoring RS resource of the set of link quality monitoring RS resources based on the monitoring.

In some examples, the beam failure component 925 may transmit a beam failure message corresponding to a first beam of the set of active beams based on the monitoring.

In some examples, the beam failure component 925 may receive a second monitoring configuration indicating activation of a second beam that differs from the first beam based on the beam failure message.

The beam measurement reporting component 935 may transmit a beam measurement report indicating at least one measurement of at least one channel state information measurement RS resource of the set of channel state information measurement RS resources within the TTI based on the monitoring.

In some examples, the beam measurement reporting component 935 may transmit the beam measurement report indicating the at least one measurement that is a layer one RSRP measurement, a layer one signal to interference plus noise ratio measurement of a CMR of the set of channel state information measurement RS resources, a layer one signal to interference plus noise ratio measurement of an IMR of the set of channel state information measurement RS resources, or any combination thereof. In some examples, the defined number of channel state information measurement reference signal resources includes one or more reference signals for layer one reference signal receive power measurement, for signal part measurement of layer one signal to interference plus noise measurement, for interference part measurement of layer one signal to interference plus noise measurement, or any combination thereof.

The RS resource component 945 may configure the set of RS resources. In some cases, the set of RS resources include RSs for link quality monitoring. In some cases, the set of RS resources include one or more radio link monitoring RSs. In some cases, the set of RS resources include one or more BFD RSs. In some cases, the set of RS resources include RSs for channel state information measurement. In some cases, the set of RS resources include one or more RSs for layer one RSRP measurement, for signal part measurement of layer one signal to interference plus noise measurement, for interference part measurement of layer one signal to interference plus noise measurement, or any combination thereof.

The reporting component 955 may transmit a beam measurement report indicating at least one measurement of at least one active beam of the set of beams based on the monitoring.

Figure 10:
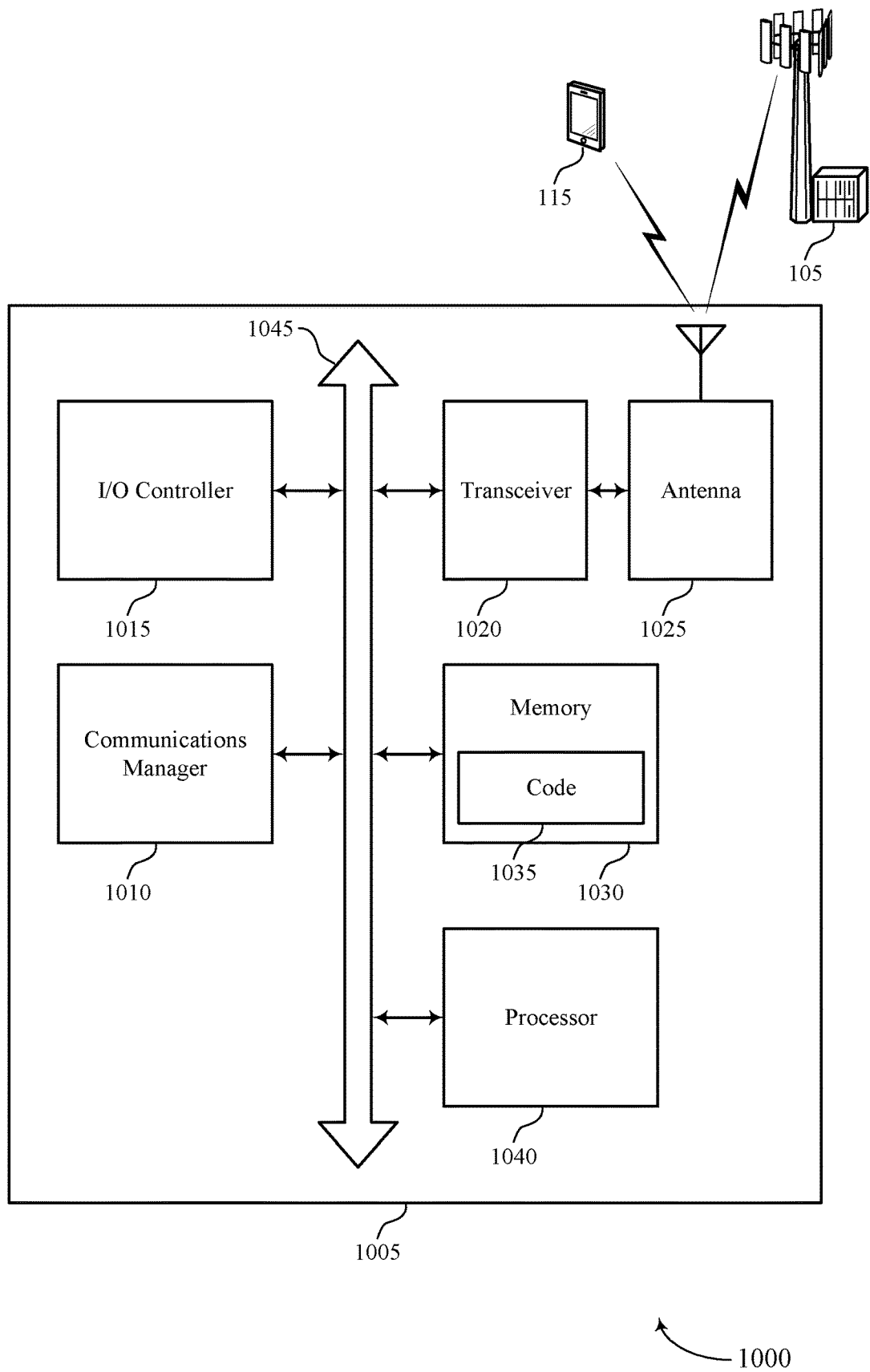
FIG. 10 shows a diagram of a system including a device in accordance with aspects of the present disclosure.

FIG. 10 shows a diagram of a system 1000 including a device 1005 that supports indication of UE capability for BFD and beam management in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may transmit a capability message that indicates a capability of the UE to monitor a defined number of resources across a set of CCs within a TTI, receive a monitoring configuration that indicates a set of resources for the UE to monitor in one or more CCs within the TTI based on the capability message, and monitor, within the TTI, the set of resources indicated in the monitoring configuration. The communications manager 1010 may also transmit a capability message that indicates a capability of the UE to monitor a defined number of link quality monitoring RS resources across a set of CCs within a TTI, receive a monitoring configuration that indicates a set of link quality monitoring RS resources for the UE to monitor in one or more CCs within the TTI based on the capability message, and monitor, within the TTI, the set of link quality monitoring RS resources indicated in the monitoring configuration. The communications manager 1010 may also transmit a capability message that indicates a capability of the UE to monitor a defined number of channel state information measurement RS resources for RSRP measurement, interference measurement, or both, across a set of CCs within a TTI, receive a monitoring configuration that indicates a set of channel state information measurement RS resources for the UE to monitor in one or more CCs within the TTI based on the capability message, and monitor, within the TTI, the set of channel state information measurement RS resources indicated in the monitoring configuration. The communications manager 1010 may also transmit a capability message that indicates a capability of the UE to monitor a defined number of RS resources across a set of CCs within a TTI and indicates a duration of the TTI, a first numerology of a first CC of the set of CCs being different than a second numerology of a second CC of the set of CCs, receive a monitoring configuration that indicates a set of RS resources for the UE to monitor in one or more CCs within the TTI based on the capability message, and monitor, within the TTI, the set of RS resources indicated in the monitoring configuration. The communications manager 1010 may also transmit a capability message that indicates a capability of the UE to monitor a defined number of different active beams across a set of CCs or a set of bandwidth parts, receive a monitoring configuration that indicates a set of active beams for the UE to monitor across one or more CCs or one or more bandwidth parts based on the capability message, and monitor the set of active beams indicated in the monitoring configuration.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting indication of UE capability for BFD and beam management).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
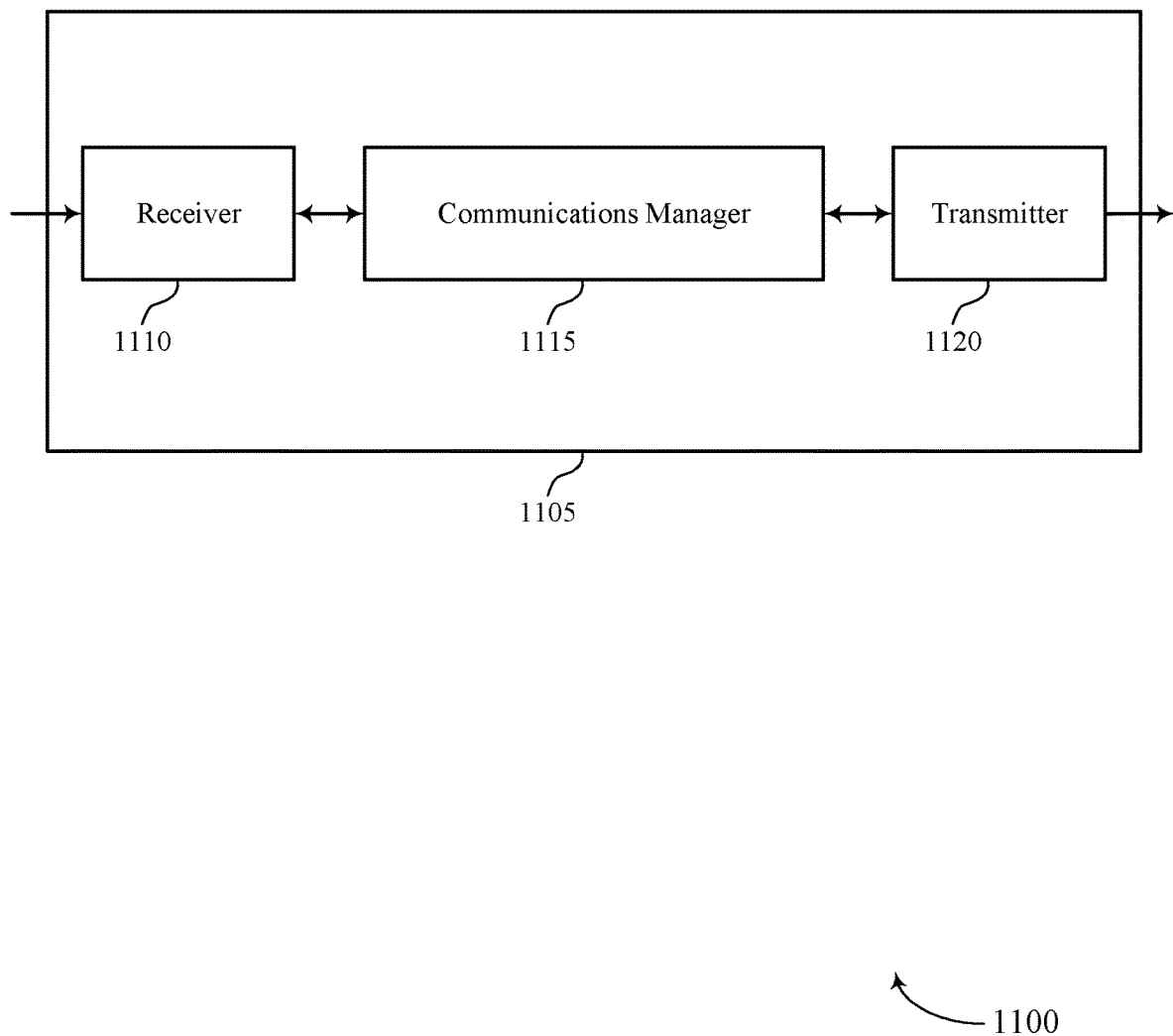
FIGS. 11 and 12 show block diagrams of devices in accordance with aspects of the present disclosure.

FIG. 11 shows a block diagram 1100 of a device 1105 that supports indication of UE capability for BFD and beam management in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to indication of UE capability for BFD and beam management, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may receive a capability message that indicates a capability of a UE to monitor a defined number of resources across a set of CCs within a TTI, transmit a monitoring configuration that indicates a set of resources for the UE to monitor in one or more CCs within the TTI based on the capability message, and transmit, within the TTI, a set of RSs within the set of resources indicated in the monitoring configuration. The communications manager 1115 may also receive a capability message that indicates a capability of a UE to monitor a defined number of link quality monitoring RS resources across a set of CCs within a TTI, transmit a monitoring configuration that indicates a set of link quality monitoring RS resources for the UE to monitor in one or more CCs within the TTI based on the capability message, and transmit, within the TTI, a set of RSs within the set of link quality monitoring RS resources indicated in the monitoring configuration. The communications manager 1115 may also receive a capability message that indicates a capability of a UE to monitor a defined number of channel state information measurement RS resources for RSRP measurement, interference measurement, or both, across a set of CCs within a TTI, transmit a monitoring configuration that indicates a set of channel state information measurement RS resources for the UE to monitor in one or more CCs within the TTI based on the capability message, and transmit, within the TTI, a set of RSs within the set of channel state information measurement RS resources indicated in the monitoring configuration. The communications manager 1115 may also receive a capability message that indicates a capability of a UE to monitor a defined number of RS resources across a set of CCs within a TTI and indicates a duration of the TTI, a first numerology of a first CC of the set of CCs being different than a second numerology of a second CC of the set of CCs, transmit a monitoring configuration that indicates a set of RS resources for the UE to monitor in one or more CCs within the TTI based on the capability message, and transmit, within the TTI, a set of RSs within the set of RS resources indicated in the monitoring configuration. The communications manager 1115 may also receive a capability message that indicates a capability of a UE to monitor a defined number of different active beams across a set of CCs or a set of bandwidth parts, transmit a monitoring configuration that indicates a set of active beams for the UE to monitor across one or more CCs or one or more bandwidth parts based on the capability message, and transmit a set of RSs via the set of active beams in accordance with the monitoring configuration. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
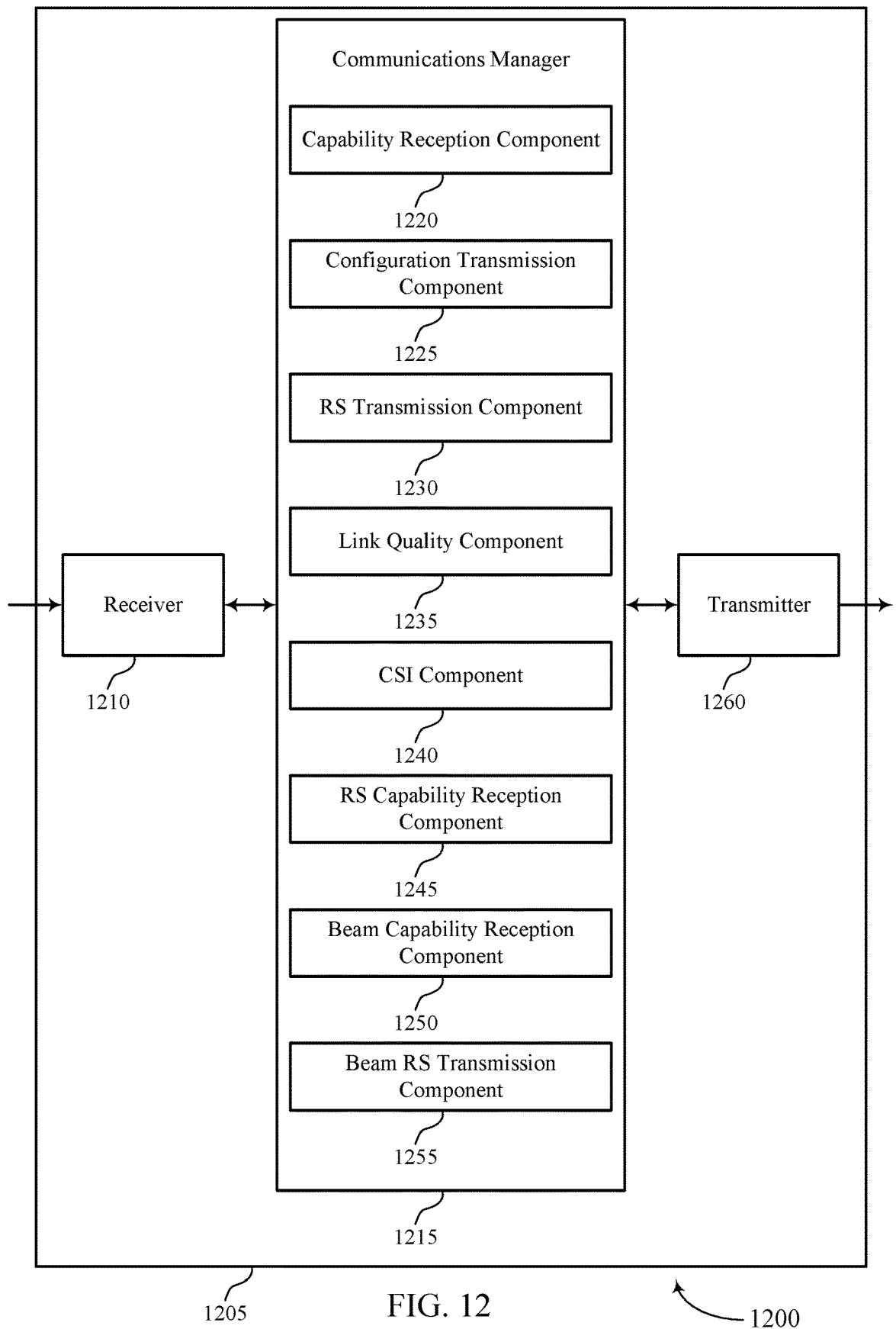

FIG. 12 shows a block diagram 1200 of a device 1205 that supports indication of UE capability for BFD and beam management in accordance with aspects of the present disclosure. The device 1205 may be an example of aspects of a device 1105, or a base station 105 as described herein. The device 1205 may include a receiver 1210, a communications manager 1215, and a transmitter 1260. The device 1205 may also include a processor. Each of these components may be in communication with one another (e.g., via one or more buses).

The receiver 1210 may receive information such as packets, user data, or control information associated with various information channels (e.g., control channels, data channels, and information related to indication of UE capability for BFD and beam management, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a capability reception component 1220, a configuration transmission component 1225, a RS transmission component 1230, a link quality component 1235, a CSI component 1240, a RS capability reception component 1245, a beam capability reception component 1250, and a beam RS transmission component 1255. The communications manager 1215 may be an example of aspects of the communications manager 1410 described herein.

The capability component 1220 may receive a capability message that indicates a capability of a UE to monitor a defined number of resources across a set of CCs within a TTI.

The configuration transmission component 1225 may transmit a monitoring configuration that indicates a set of resources for the UE to monitor in one or more CCs within the TTI based on the capability message.

The RS transmission component 1230 may transmit, within the TTI, a set of RSs within the set of resources indicated in the monitoring configuration.

The link quality component 1235 may receive a capability message that indicates a capability of a UE to monitor a defined number of link quality monitoring RS resources across a set of CCs within a TTI.

The configuration transmission component 1225 may transmit a monitoring configuration that indicates a set of link quality monitoring RS resources for the UE to monitor in one or more CCs within the TTI based on the capability message.

The RS transmission component 1230 may transmit, within the TTI, a set of RSs within the set of link quality monitoring RS resources indicated in the monitoring configuration.

The CSI component 1240 may receive a capability message that indicates a capability of a UE to monitor a defined number of channel state information measurement RS resources for RSRP measurement, interference measurement, or both, across a set of CCs within a TTI.

The configuration transmission component 1225 may transmit a monitoring configuration that indicates a set of channel state information measurement RS resources for the UE to monitor in one or more CCs within the TTI based on the capability message.

The CSI component 1240 may transmit, within the TTI, a set of RSs within the set of channel state information measurement RS resources indicated in the monitoring configuration.

The RS capability reception component 1245 may receive a capability message that indicates a capability of a UE to monitor a defined number of RS resources across a set of CCs within a TTI and indicates a duration of the TTI, a first numerology of a first CC of the set of CCs being different than a second numerology of a second CC of the set of CCs.

The configuration transmission component 1225 may transmit a monitoring configuration that indicates a set of RS resources for the UE to monitor in one or more CCs within the TTI based on the capability message.

The RS transmission component 1230 may transmit, within the TTI, a set of RSs within the set of RS resources indicated in the monitoring configuration.

The beam capability reception component 1250 may receive a capability message that indicates a capability of a UE to monitor a defined number of different active beams across a set of CCs or a set of bandwidth parts.

The configuration transmission component 1225 may transmit a monitoring configuration that indicates a set of active beams for the UE to monitor across one or more CCs or one or more bandwidth parts based on the capability message.

The beam RS transmission component 1255 may transmit a set of RSs via the set of active beams in accordance with the monitoring configuration.

The transmitter 1260 may transmit signals generated by other components of the device 1205. In some examples, the transmitter 1260 may be collocated with a receiver 1210 in a transceiver module. For example, the transmitter 1260 may be an example of aspects of the transceiver 1420 described with reference to FIG. 14. The transmitter 1260 may utilize a single antenna or a set of antennas.

Figure 13:
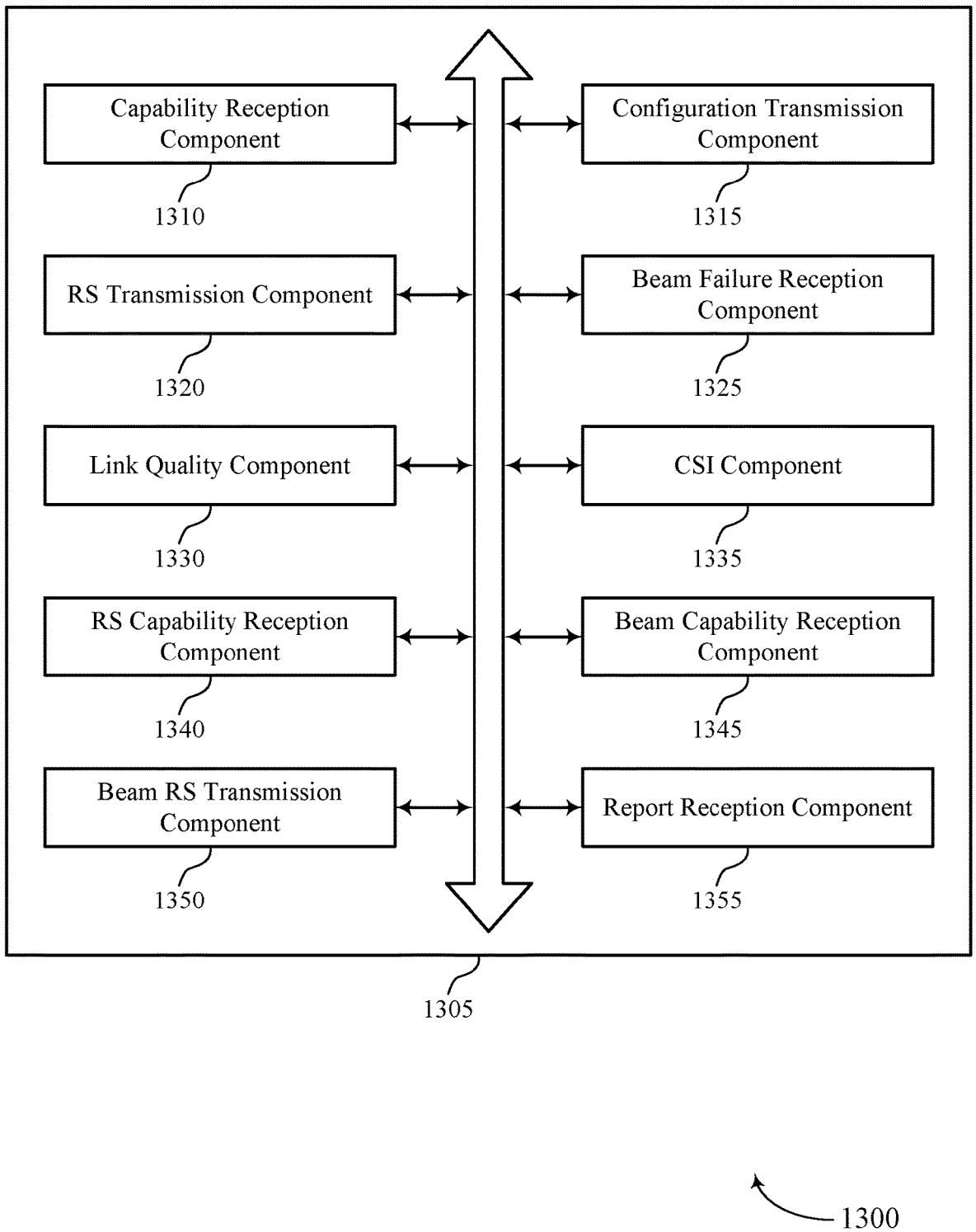
FIG. 13 shows a block diagram of a communications manager in accordance with aspects of the present disclosure.

FIG. 13 shows a block diagram 1300 of a communications manager 1305 that supports indication of UE capability for BFD and beam management in accordance with aspects of the present disclosure. The communications manager 1305 may be an example of aspects of a communications manager 1115, a communications manager 1215, or a communications manager 1410 described herein. The communications manager 1305 may include a capability reception component 1310, a configuration transmission component 1315, a RS transmission component 1320, a beam failure reception component 1325, a link quality component 1330, a CSI component 1335, a RS capability reception component 1340, a beam capability reception component 1345, a beam RS transmission component 1350, and a report reception component 1355. Each of these modules may communicate, directly or indirectly, with one another (e.g., via one or more buses).

The capability reception component 1310 may receive a capability message that indicates a capability of a UE to monitor a defined number of resources across a set of CCs within a TTI.

In some examples, the capability reception component 1310 may receive the capability message that indicates the capability of the UE to monitor the defined number of resources that are CMRs for signal to interference plus noise measurement.

In some examples, the capability reception component 1310 may receive the capability message that indicates the capability of the UE to monitor the defined number of resources that are IMRs for signal to interference plus noise measurement.

In some examples, the capability reception component 1310 may receive the capability message that indicates the capability of the UE to monitor the defined number of resources that are RS resources, SSB resources, or both.

In some examples, the capability reception component 1310 may receive the capability message that indicates the capability of the UE to monitor the defined number of resources across the set of CCs that are a set of serving CCs in a set of frequency bands.

In some examples, the capability reception component 1310 may receive the capability message that indicates the capability of the UE to monitor the defined number of resources across the set of CCs that are a set of serving CCs in a cell group.

In some examples, the capability reception component 1310 may receive the capability message that indicates the capability of the UE to monitor the defined number of resources across the set of CCs that are a set of serving CCs in a single frequency band.

In some examples, the capability reception component 1310 may receive the capability message that indicates the capability of the UE to monitor the defined number of resources across the set of CCs within the TTI that is a slot. In some examples, the TTI may be a slot and a duration of the slot may be based on a numerology of at least one CC of the set of CCs.

In some examples, the capability reception component 1310 may receive the capability message that indicates the capability of the UE to monitor the defined number of resources that include one or more RS resources for RSRP measurement, one or more RS resources for signal to interference plus noise measurement, one or more RS resources for BFD, one or more RS resources for RLM, one or more RS resources for link quality monitoring, one or more RS resources for CSI measurement, or any combination thereof. In some examples, the defined number of resources may be beam resources.

The link quality component 1330 may receive a capability message that indicates a capability of a UE to monitor a defined number of link quality monitoring RS resources across a set of CCs within a TTI.

In some examples, the link quality component 1330 may receive the capability message that indicates the capability of the UE to monitor the defined number of link quality monitoring RS resources that are RS resources, synchronization signal block resources, or both.

In some examples, the link quality component 1330 may receive the capability message that indicates the capability of the UE to monitor the defined number of link quality monitoring RS resources that are new beam identification resources.

In some examples, the link quality component 1330 may receive the capability message that indicates the capability of the UE to monitor the defined number of link quality monitoring RS resources across the set of CCs that are a set of serving CCs in a set of frequency bands.

In some examples, the link quality component 1330 may receive the capability message that indicates the capability of the UE to monitor the defined number of link quality monitoring RS resources across the set of CCs that are a set of serving CCs in a cell group.

In some examples, the link quality component 1330 may receive the capability message that indicates the capability of the UE to monitor the defined number of link quality monitoring RS resources across the set of CCs that are a set of serving CCs in a single frequency band.

In some examples, the link quality component 1330 may receive the capability message that indicates the capability of the UE to monitor the defined number of link quality monitoring RS resources across the set of CCs and a CC list that identifies the set of CCs.

In some examples, the link quality component 1330 may receive the capability message that indicates the capability of the UE to monitor the defined number of link quality monitoring RS resources across the set of CCs within the TTI that is a slot.

In some examples, the link quality component 1330 may receive the capability message that indicates the capability of the UE to monitor the defined number of link quality monitoring RS resources for RSRP measurement, interference measurement, or both, across the set of CCs within the TTI.

The configuration transmission component 1315 may transmit a monitoring configuration that indicates a set of resources for the UE to monitor in one or more CCs within the TTI based on the capability message.

In some examples, the configuration transmission component 1315 may transmit a monitoring configuration that indicates a set of link quality monitoring RS resources for the UE to monitor in one or more CCs within the TTI based on the capability message.

In some examples, the configuration transmission component 1315 may transmit a monitoring configuration that indicates a set of channel state information measurement RS resources for the UE to monitor in one or more CCs within the TTI based on the capability message.

In some examples, the configuration transmission component 1315 may transmit a monitoring configuration that indicates a set of RS resources for the UE to monitor in one or more CCs within the TTI based on the capability message.

In some examples, the configuration transmission component 1315 may transmit a monitoring configuration that indicates a set of active beams for the UE to monitor across one or more CCs or one or more bandwidth parts based on the capability message.

In some examples, the configuration transmission component 1315 may transmit a second monitoring configuration that indicates a second link quality monitoring RS resource that differs from the first link quality monitoring RS resource.

In some examples, the configuration transmission component 1315 may transmit the monitoring configuration that indicates a set of different activated transmission configuration indicator state identifiers that correspond to the set of active beams that are downlink beams.

In some examples, the configuration transmission component 1315 may transmit the monitoring configuration that indicates a set of different activated transmission configuration indicator state identifiers, where the set of active beams are downlink beams and correspond to a set of different QCL RS identifiers for the set of different activated transmission configuration indicator state identifiers.

In some examples, the configuration transmission component 1315 may transmit the monitoring configuration that indicates a set of different activated transmission configuration indicator state identifiers, where the set of active beams are downlink beams and correspond to a set of different root QCL RS identifiers for the set of different activated transmission configuration indicator state identifiers.

In some examples, the configuration transmission component 1315 may transmit the monitoring configuration that indicates a set of different activated spatial relation information identifiers that correspond to the set of active beams that are uplink beams.

In some examples, the configuration transmission component 1315 may transmit the monitoring configuration that indicates a set of different activated spatial relation information identifiers, where the set of active beams are uplink beams and correspond to a set of different spatial RS identifiers for the set of different activated spatial relation information identifiers.

In some examples, the configuration transmission component 1315 may transmit a second monitoring configuration indicating activation of a second beam that differs from the first beam based on the beam failure message.

In some cases, the set of RS resources include RSs for link quality monitoring.

In some cases, the set of RS resources include one or more radio link monitoring RSs.

In some cases, the set of RS resources include one or more BFD RSs.

In some cases, the set of RS resources include RSs for channel state information measurement.

In some cases, the set of RS resources include one or more RSs for layer one RSRP measurement, for signal part measurement of layer one signal to interference plus noise measurement, for interference part measurement of layer one signal to interference plus noise measurement, or any combination thereof.

In some cases, the set of different QCL RS identifiers are a set of QCL type D RS identifiers.

In some cases, the set of different root QCL RS identifiers are a set of different root QCL type D RS identifiers in a QCL chain.

The RS transmission component 1320 may transmit, within the TTI, a set of RS resources within the set of resources indicated in the monitoring configuration.

In some examples, the RS transmission component 1320 may transmit, within the TTI, a set of RSs within the set of link quality monitoring RS resources indicated in the monitoring configuration.

In some examples, the RS transmission component 1320 may transmit, within the TTI, a set of RSs within the set of RS resources indicated in the monitoring configuration.

The CSI component 1335 may receive a capability message that indicates a capability of a UE to monitor a defined number of channel state information measurement RS resources for RSRP measurement, interference measurement, or both, across a set of CCs within a TTI.

In some examples, the CSI component 1335 may receive the capability message that indicates the capability of the UE to monitor the defined number of channel state information measurement RS resources that are RS resources, synchronization signal block resources, or both.

In some examples, the CSI component 1335 may receive the capability message that indicates the capability of the UE to monitor the defined number of channel state information measurement RS resources that are aperiodic resources, periodic resources, semi-static resources, or any combination thereof.

In some examples, the CSI component 1335 may receive the capability message that indicates the capability of the UE to monitor the defined number of channel state information measurement RS resources that is a RSRP resource, a CMR, an IMR, or any combination thereof.

In some examples, the CSI component 1335 may receive a beam measurement report indicating at least one measurement of at least one channel state information measurement RS resource of the set of channel state information measurement RS resources within the TTI based on the monitoring.

In some examples, the CSI component 1335 may receive the beam measurement report indicating the at least one measurement that is a L1-RSRP measurement, a layer one signal to interference plus noise ratio measurement of a CMR of the set of channel state information measurement RS resources, a layer one signal to interference plus noise ratio measurement of an IMR of the set of channel state information measurement RS resources, or any combination thereof. In some examples, the defined number of channel state information measurement reference signal resources includes one or more reference signals for layer one reference signal receive power measurement, for signal part measurement of layer one signal to interference plus noise measurement, for interference part measurement of layer one signal to interference plus noise measurement, or any combination thereof.

In some examples, the CSI component 1335 may transmit a measurement report indicating at least one measurement of at least one CSI measurement RS resource of the set of resources within the TTI based on the monitoring.

In some examples, the CSI component 1335 may transmit the measurement report indicated the at least one measurement that is a L1-RSRP measurement, a L1-SINR measurement of a CMR of the set of resources, a L1-SINR of an IMR of the set of resources, or any combination thereof.

In some examples, the CSI component 1335 may transmit, within the TTI, a set of RSs within the set of channel state information measurement RS resources indicated in the monitoring configuration.

The RS capability reception component 1340 may receive a capability message that indicates a capability of a UE to monitor a defined number of RS resources across a set of CCs within a TTI and indicates a duration of the TTI, a first numerology of a first CC of the set of CCs being different than a second numerology of a second CC of the set of CCs.

In some examples, the RS capability reception component 1340 may receive the capability message that indicates the duration of the TTI based on a subset of the set of CCs that have a same numerology.

In some examples, the RS capability reception component 1340 may receive the capability message that indicates the duration of the TTI based on a highest numerology of the set of CCs.

In some examples, the RS capability reception component 1340 may receive the capability message that indicates the duration of the TTI based on a set of TTIs overlapping in time across the set of CCs.

In some examples, the RS capability reception component 1340 may receive the capability message that indicates the duration of the TTI based on a reference time duration.

The beam capability reception component 1345 may receive a capability message that indicates a capability of a UE to monitor a defined number of different active beams across a set of CCs or a set of bandwidth parts.

In some examples, the beam capability reception component 1345 may receive the capability message that indicates the capability of the UE to monitor the defined number of different active beams that are one or more downlink beams, one or more uplink beams, or any combination thereof.

In some cases, the defined number is a maximum supported number of different active beams.

In some cases, the maximum supported number of different active beams that are downlink beams is defined based on a number of different activated transmission configuration indicator state identifiers.

In some cases, the maximum supported number of different active beams that are downlink beams is defined based on a number of different QCL RS identifiers for a set of different activated transmission configuration indicator state identifiers.

In some cases, the maximum supported number of different active beams that are downlink beams is defined based on a number of different root QCL RS identifiers for a set of different activated transmission configuration indicator state identifiers.

In some cases, the maximum supported number of different active beams that are uplink beams is defined based on a number of different activated spatial relation information identifiers that correspond to the set of active beams that are uplink beams.

In some cases, the maximum supported number of different active beams that are uplink beams is defined based on a number of different spatial RS identifiers for a set of different activated spatial relation information identifiers.

The beam RS transmission component 1350 may transmit a set of RSs via the set of active beams in accordance with the monitoring configuration.

The beam failure reception component 1325 may receive a beam failure message corresponding a first beam link quality monitoring RS resource of the set of link quality monitoring RS resources based on the monitoring.

In some examples, the beam failure reception component 1325 may receive a beam failure message corresponding to a first beam of the set of active beams based on the monitoring.

The report reception component 1355 may receive a beam measurement report indicating at least one measurement of at least one active beam of the set of beams based on the monitoring.

Figure 14:
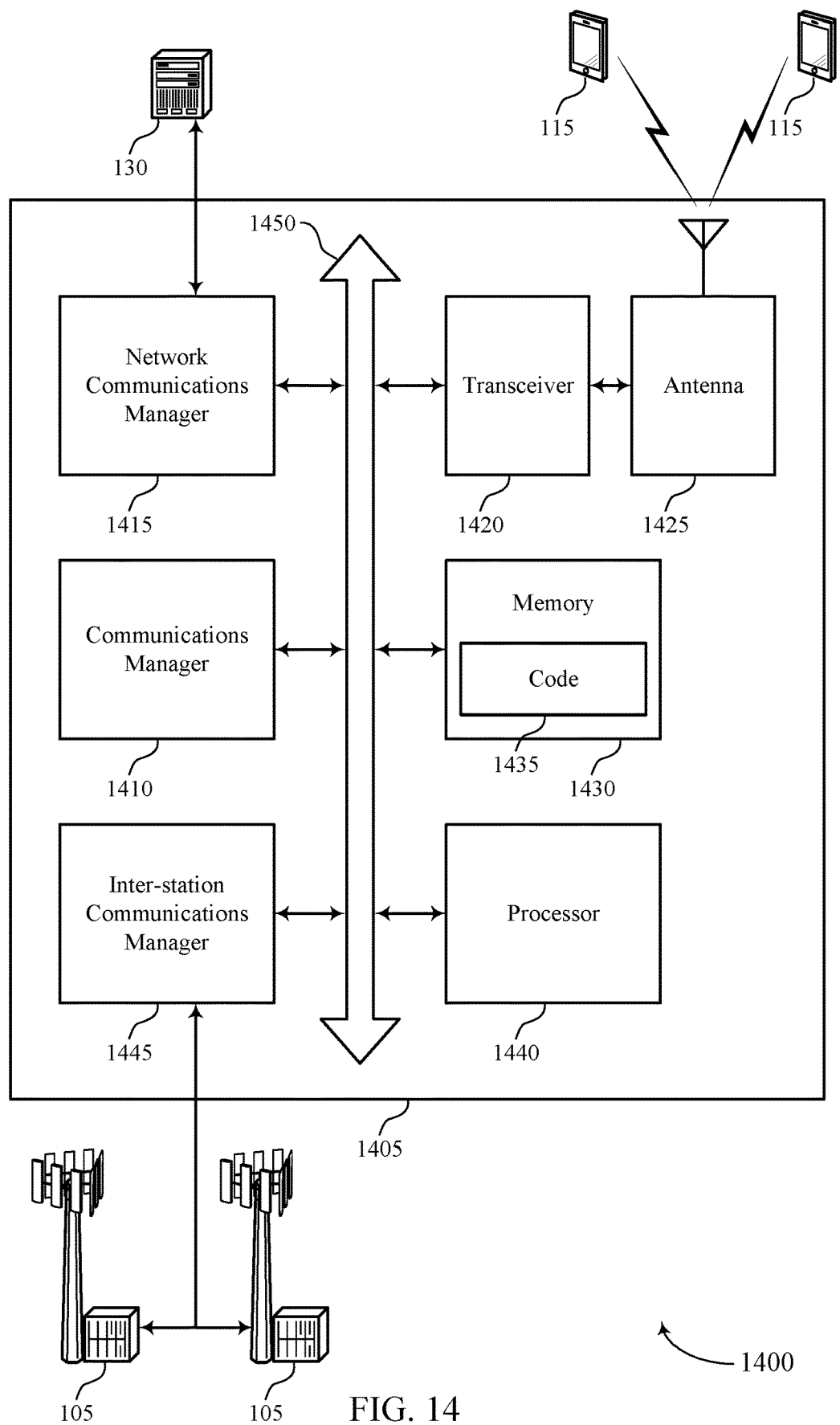
FIG. 14 shows a diagram of a system including a device in accordance with aspects of the present disclosure.

FIG. 14 shows a diagram of a system 1400 including a device 1405 that supports indication of UE capability for BFD and beam management in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may receive a capability message that indicates a capability of a UE to monitor a defined number of resources across a set of CCs within a TTI, transmit a monitoring configuration that indicates a set of resources for the UE to monitor in one or more CCs within the TTI based on the capability message, and transmit, within the TTI, a set of RSs within the set of resources indicated in the monitoring configuration. The communications manager 1410 may also receive a capability message that indicates a capability of a UE to monitor a defined number of link quality monitoring RS resources across a set of CCs within a TTI, transmit a monitoring configuration that indicates a set of link quality monitoring RS resources for the UE to monitor in one or more CCs within the TTI based on the capability message, and transmit, within the TTI, a set of RSs within the set of link quality monitoring RS resources indicated in the monitoring configuration. The communications manager 1410 may also receive a capability message that indicates a capability of a UE to monitor a defined number of channel state information measurement RS resources for RSRP measurement, interference measurement, or both, across a set of CCs within a TTI, transmit a monitoring configuration that indicates a set of channel state information measurement RS resources for the UE to monitor in one or more CCs within the TTI based on the capability message, and transmit, within the TTI, a set of RSs within the set of channel state information measurement RS resources indicated in the monitoring configuration. The communications manager 1410 may also receive a capability message that indicates a capability of a UE to monitor a defined number of RS resources across a set of CCs within a TTI and indicates a duration of the TTI, a first numerology of a first CC of the set of CCs being different than a second numerology of a second CC of the set of CCs, transmit a monitoring configuration that indicates a set of RS resources for the UE to monitor in one or more CCs within the TTI based on the capability message, and transmit, within the TTI, a set of RSs within the set of RS resources indicated in the monitoring configuration. The communications manager 1410 may also receive a capability message that indicates a capability of a UE to monitor a defined number of different active beams across a set of CCs or a set of bandwidth parts, transmit a monitoring configuration that indicates a set of active beams for the UE to monitor across one or more CCs or one or more bandwidth parts based on the capability message, and transmit a set of RSs via the set of active beams in accordance with the monitoring configuration.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting indication of UE capability for BFD and beam management).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
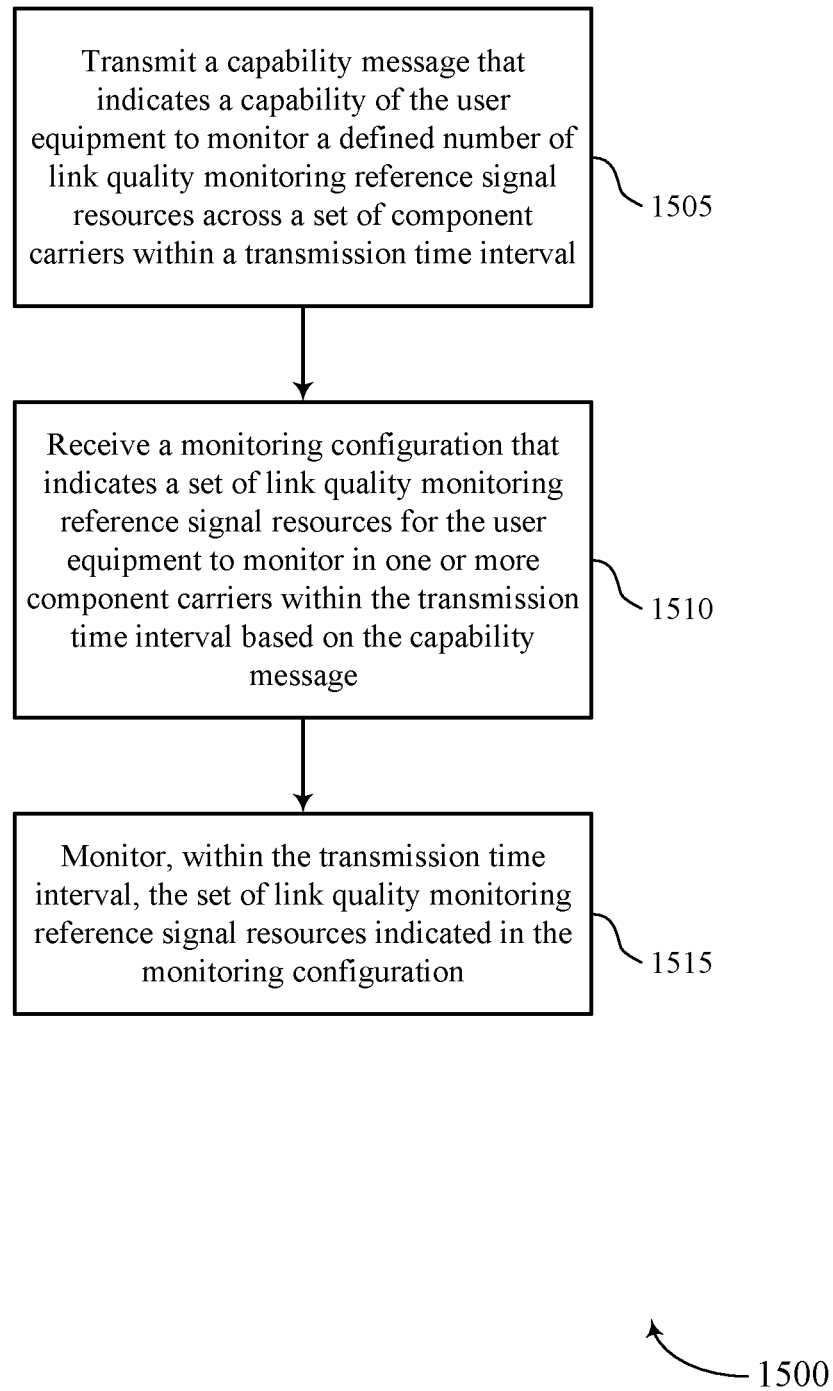
FIGS. 15 through 20 show flowcharts illustrating methods in accordance with aspects of the present disclosure.

FIG. 15 shows a flowchart illustrating a method 1500 that supports indication of UE capability for BFD and beam management in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may transmit a capability message that indicates a capability of the UE to monitor a defined number of link quality monitoring RS resources across a set of CCs within a TTI. The operations of 1505 may be performed according to the methods described herein. In some examples, aspects of the operations of 1505 may be performed by a link quality capability component as described with reference to FIGS. 7 through 10.

At 1510, the UE may receive a monitoring configuration that indicates a set of link quality monitoring RS resources for the UE to monitor in one or more CCs within the TTI based on the capability message. The operations of 1510 may be performed according to the methods described herein. In some examples, aspects of the operations of 1510 may be performed by a monitoring component as described with reference to FIGS. 7 through 10.

At 1515, the UE may monitor, within the TTI, the set of link quality monitoring RS resources indicated in the monitoring configuration. The operations of 1515 may be performed according to the methods described herein. In some examples, aspects of the operations of 1515 may be performed by a monitoring component as described with reference to FIGS. 7 through 10.

Figure 16:
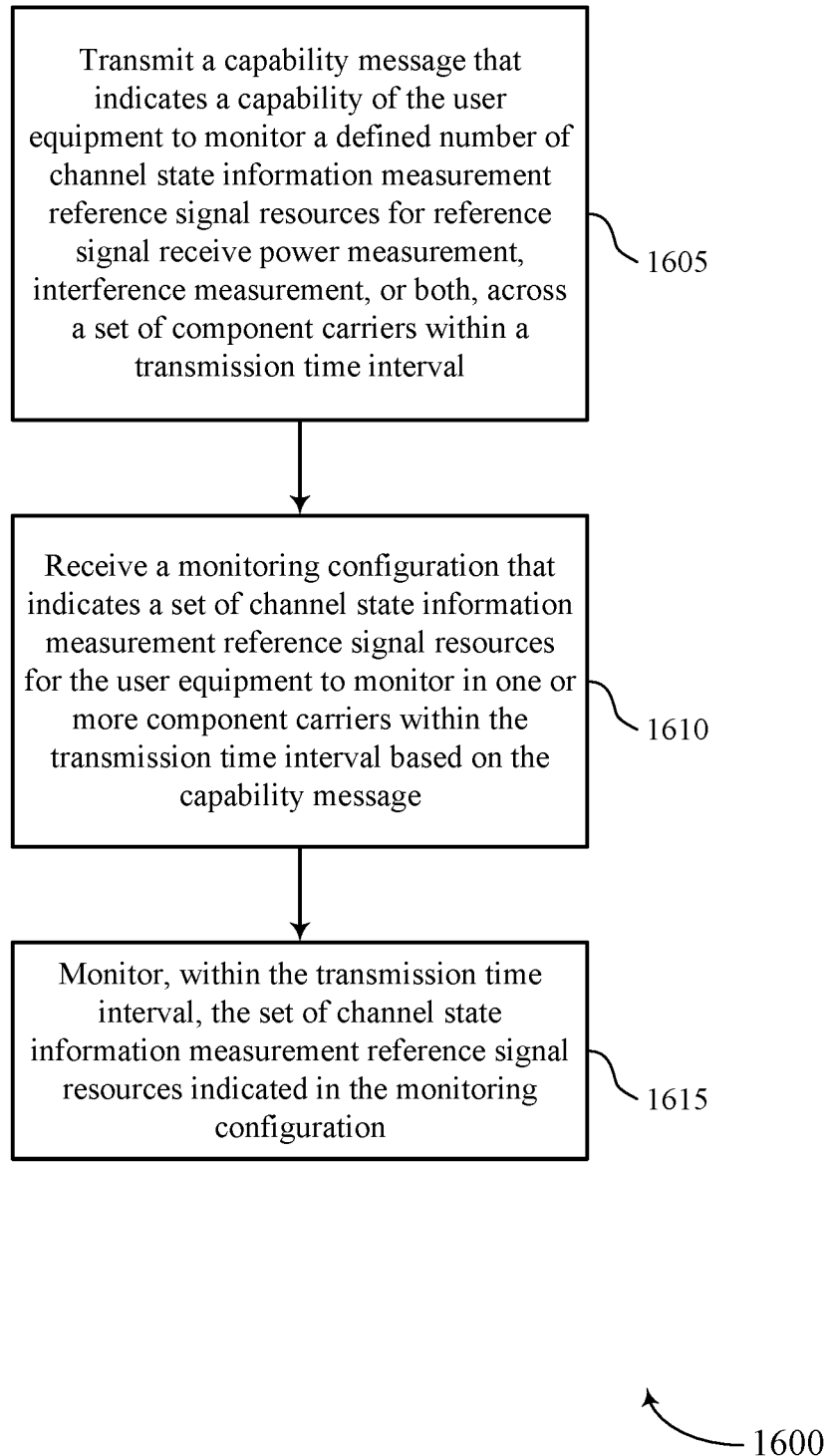

FIG. 16 shows a flowchart illustrating a method 1600 that supports indication of UE capability for BFD and beam management in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may transmit a capability message that indicates a capability of the UE to monitor a defined number of channel state information measurement RS resources for RSRP measurement, interference measurement, or both, across a set of CCs within a TTI. The operations of 1605 may be performed according to the methods described herein. In some examples, aspects of the operations of 1605 may be performed by a CSI capability component as described with reference to FIGS. 7 through 10.

At 1610, the UE may receive a monitoring configuration that indicates a set of channel state information measurement RS resources for the UE to monitor in one or more CCs within the TTI based on the capability message. The operations of 1610 may be performed according to the methods described herein. In some examples, aspects of the operations of 1610 may be performed by a monitoring component as described with reference to FIGS. 7 through 10.

At 1615, the UE may monitor, within the TTI, the set of channel state information measurement RS resources indicated in the monitoring configuration. The operations of 1615 may be performed according to the methods described herein. In some examples, aspects of the operations of 1615 may be performed by a monitoring component as described with reference to FIGS. 7 through 10.

Figure 17:
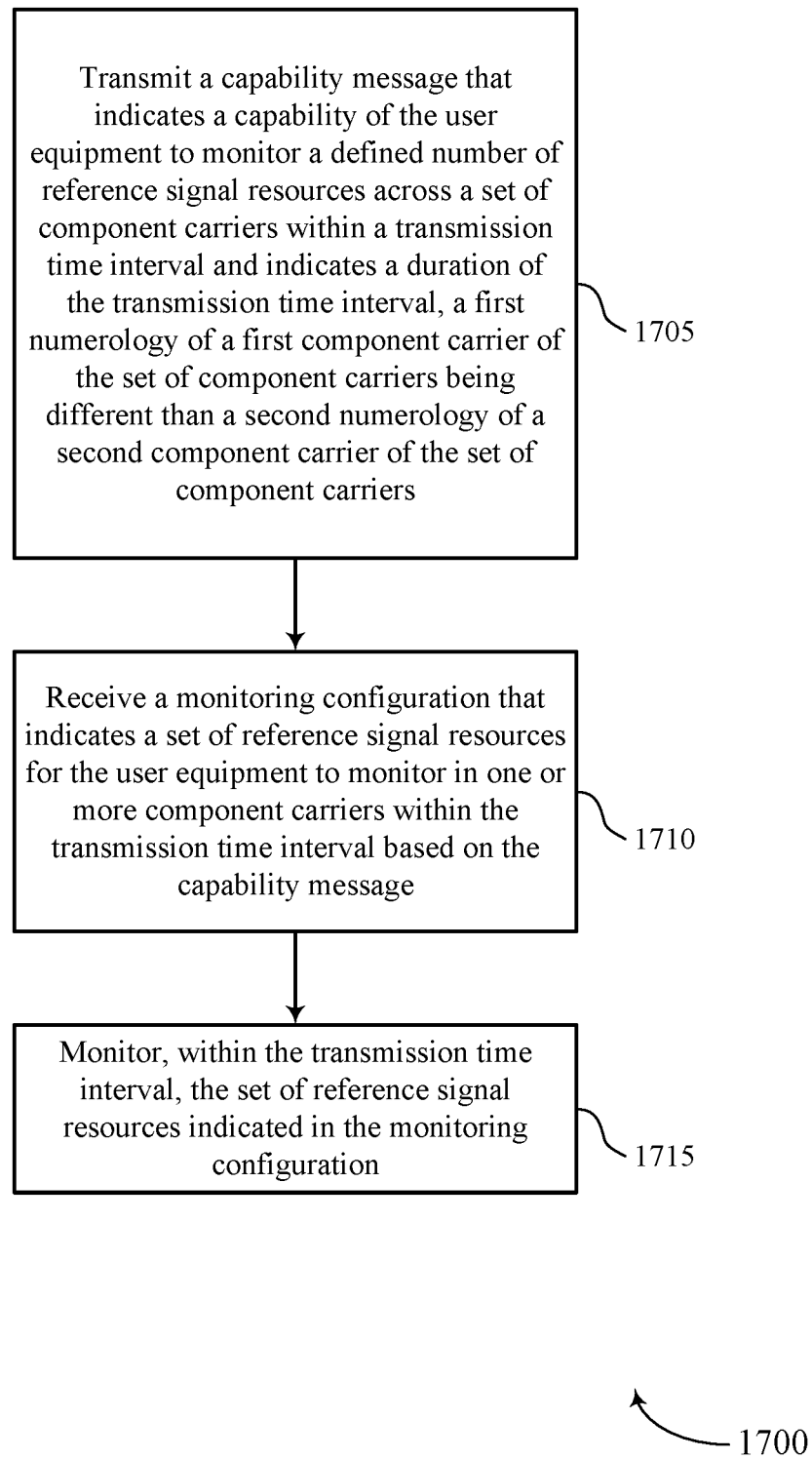

FIG. 17 shows a flowchart illustrating a method 1700 that supports indication of UE capability for BFD and beam management in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may transmit a capability message that indicates a capability of the UE to monitor a defined number of RS resources across a set of CCs within a TTI and indicates a duration of the TTI, a first numerology of a first CC of the set of CCs being different than a second numerology of a second CC of the set of CCs. The operations of 1705 may be performed according to the methods described herein. In some examples, aspects of the operations of 1705 may be performed by a RS capability component as described with reference to FIGS. 7 through 10.

At 1710, the UE may receive a monitoring configuration that indicates a set of RS resources for the UE to monitor in one or more CCs within the TTI based on the capability message. The operations of 1710 may be performed according to the methods described herein. In some examples, aspects of the operations of 1710 may be performed by a monitoring component as described with reference to FIGS. 7 through 10.

At 1715, the UE may monitor, within the TTI, the set of RS resources indicated in the monitoring configuration. The operations of 1715 may be performed according to the methods described herein. In some examples, aspects of the operations of 1715 may be performed by a monitoring component as described with reference to FIGS. 7 through 10.

Figure 18:
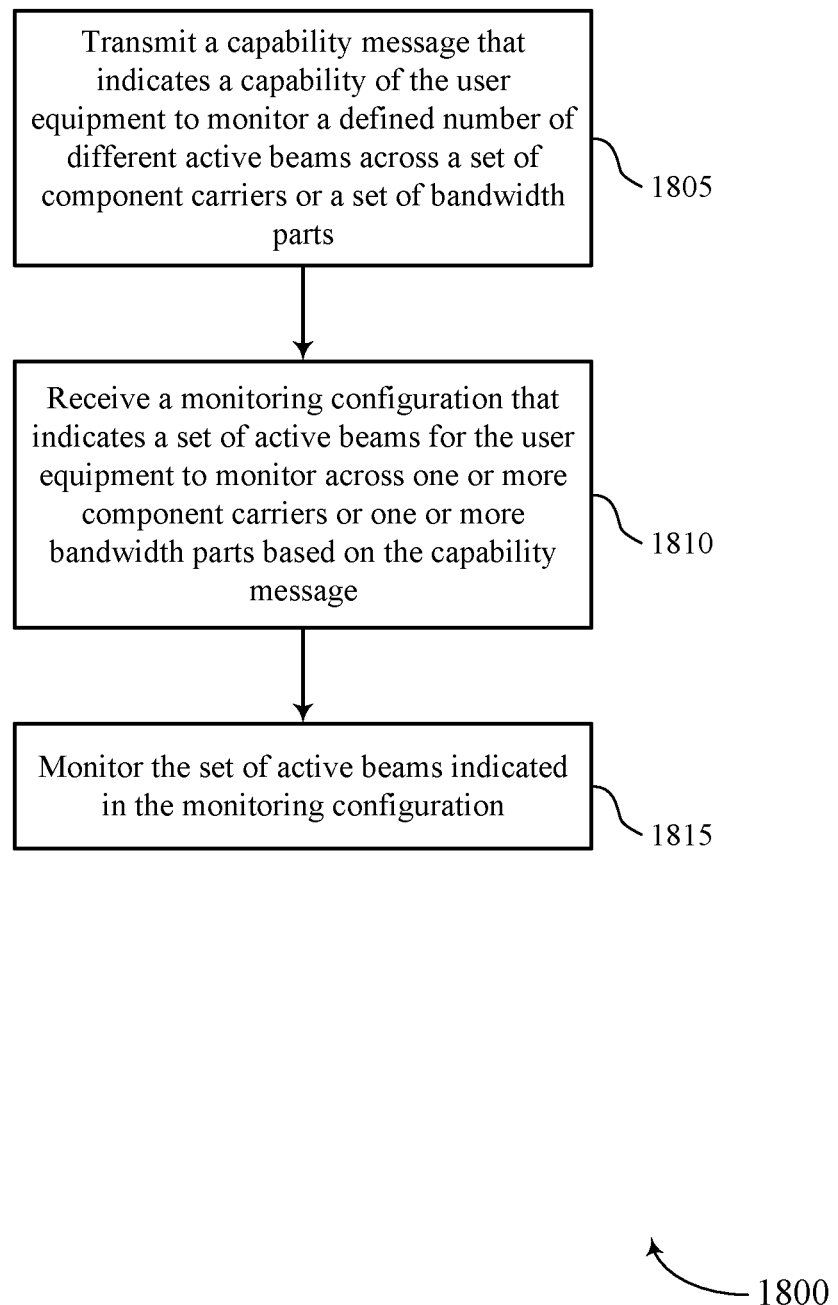

FIG. 18 shows a flowchart illustrating a method 1800 that supports indication of UE capability for BFD and beam management in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may transmit a capability message that indicates a capability of the UE to monitor a defined number of different active beams across a set of CCs or a set of bandwidth parts. The operations of 1805 may be performed according to the methods described herein. In some examples, aspects of the operations of 1805 may be performed by a beam capability component as described with reference to FIGS. 7 through 10.

At 1810, the UE may receive a monitoring configuration that indicates a set of active beams for the UE to monitor across one or more CCs or one or more bandwidth parts based on the capability message. The operations of 1810 may be performed according to the methods described herein. In some examples, aspects of the operations of 1810 may be performed by a monitoring component as described with reference to FIGS. 7 through 10.

At 1815, the UE may monitor the set of active beams indicated in the monitoring configuration. The operations of 1815 may be performed according to the methods described herein. In some examples, aspects of the operations of 1815 may be performed by a monitoring component as described with reference to FIGS. 7 through 10.

Figure 19:
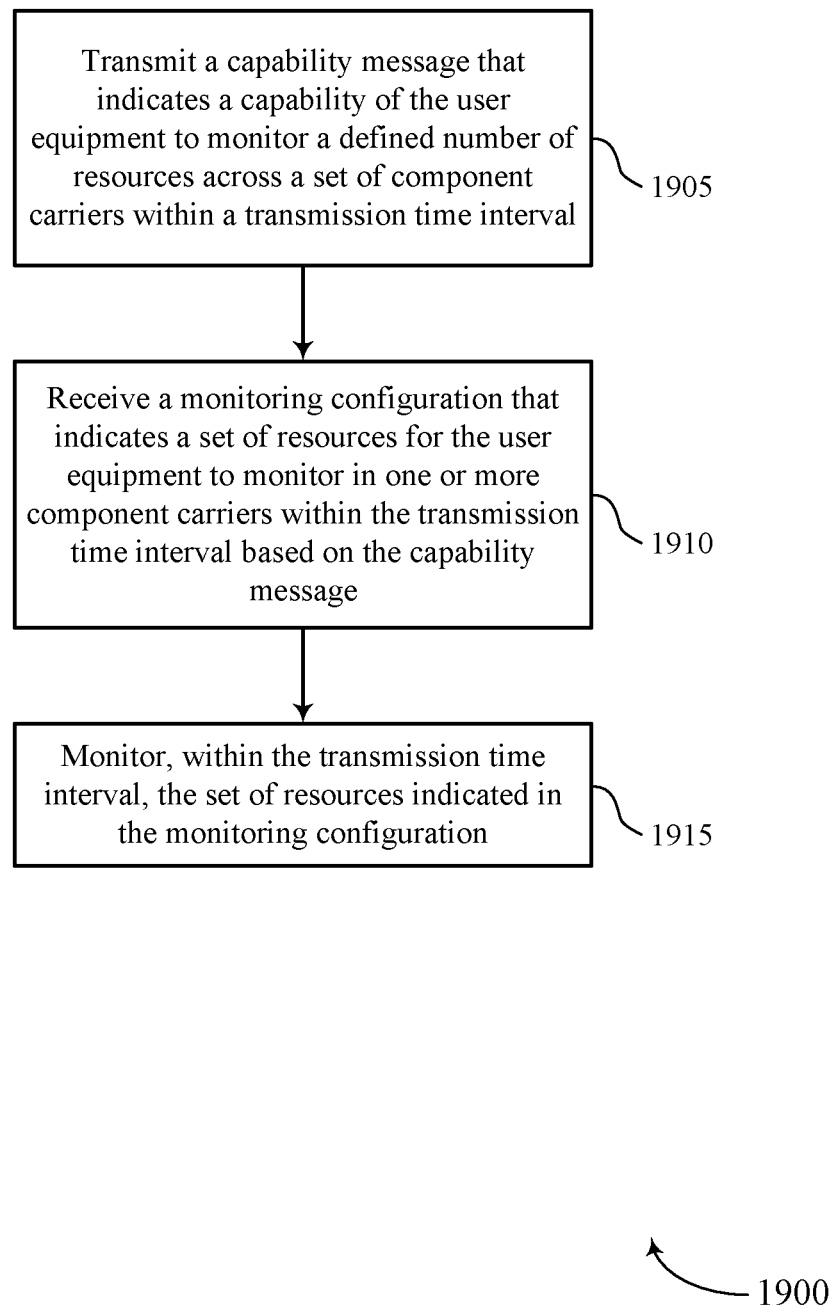

FIG. 19 shows a flowchart illustrating a method 1900 that supports indication of UE capability for BFD and beam management in accordance with aspects of the present disclosure. The operations of method 1900 may be implemented by a UE 115 or its components as described herein. For example, the operations of method 1900 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1905, the UE may transmit a capability message that indicates a capability of the UE to monitor a defined number of resources across a set of CCs within a TTI. The operations of 1905 may be performed according to the methods described herein. In some examples, aspects of the operations of 1905 may be performed by a capability component as described with reference to FIGS. 7 through 10.

At 1910, the UE may receive a monitoring configuration that indicates a set of resources for the UE to monitor in one or more CCs within the TTI based on the capability message. The operations of 1910 may be performed according to the methods described herein. In some examples, aspects of the operations of 1910 may be performed by a monitoring component as described with reference to FIGS. 7 through 10.

At 1915, the UE may monitor, within the TTI, the set of resources indicated in the monitoring configuration. The operations of 1915 may be performed according to the methods described herein. In some examples, aspects of the operations of 1915 may be performed by a monitoring component as described with reference to FIGS. 7 through 10.

Figure 20:
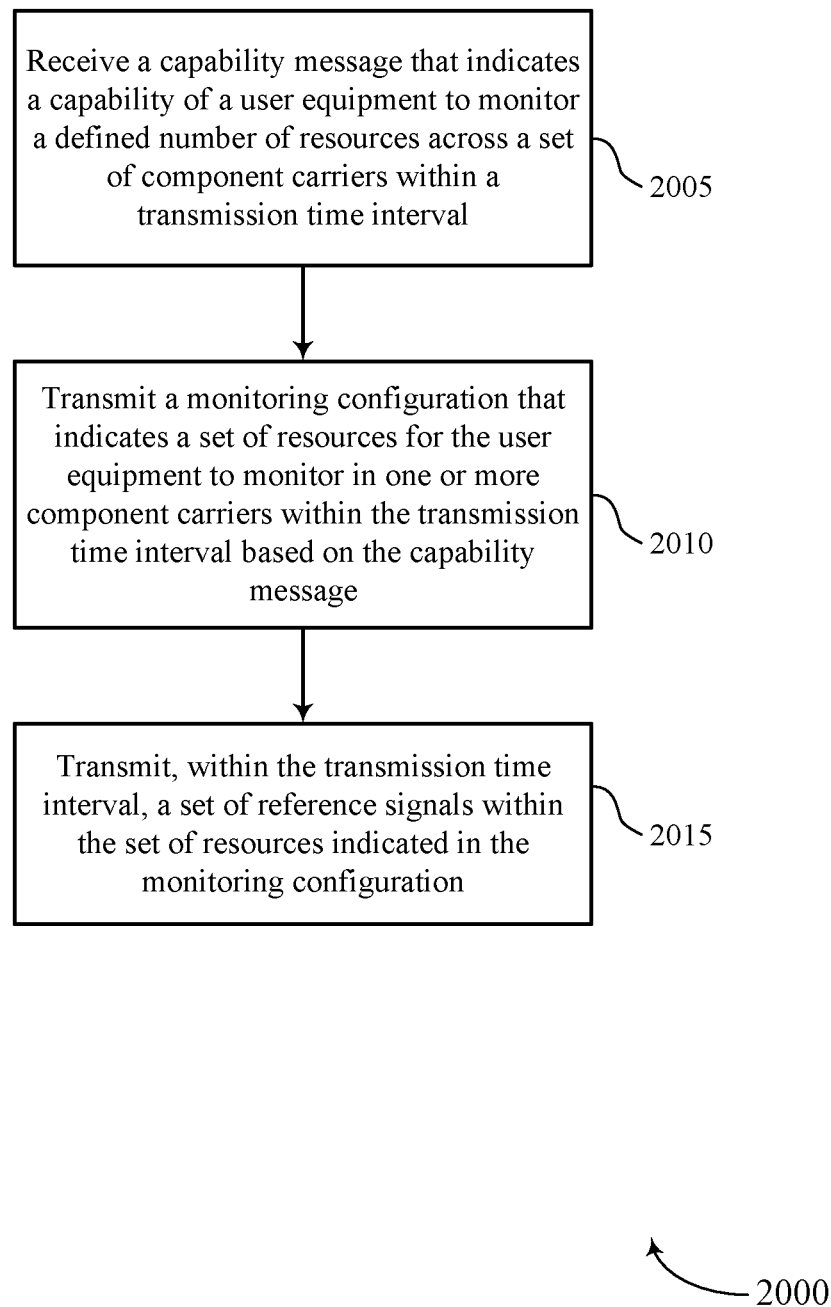

FIG. 20 shows a flowchart illustrating a method 2000 that supports indication of UE capability for BFD and beam management in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may receive a capability message that indicates a capability of a UE to monitor a defined number of resources across a set of CCs within a TTI. The operations of 2005 may be performed according to the methods described herein. In some examples, aspects of the operations of 2005 may be performed by a capability reception component as described with reference to FIGS. 11 through 14.

At 2010, the base station may transmit a monitoring configuration that indicates a set of resources for the UE to monitor in one or more CCs within the TTI based on the capability message. The operations of 2010 may be performed according to the methods described herein. In some examples, aspects of the operations of 2010 may be performed by a configuration transmission component as described with reference to FIGS. 11 through 14.

At 2015, the base station may transmit, within the TTI, a set of reference signals within the set of resources indicated in the monitoring configuration. The operations of 2015 may be performed according to the methods described herein. In some examples, aspects of the operations of 2015 may be performed by a RS transmission component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

SUMMARY OF ASPECTS

The following provides an overview of aspects of the present disclosure:

Aspect 1: A method for wireless communications by a user equipment, comprising: transmitting a capability message that indicates a capability of the user equipment to monitor a defined number of resources across a plurality of component carriers within a transmission time interval; receiving a monitoring configuration that indicates a plurality of resources for the user equipment to monitor in one or more component carriers within the transmission time interval based at least in part on the capability message; and monitoring, within the transmission time interval, the plurality of resources indicated in the monitoring configuration.

Aspect 2: The method of aspect 1, wherein transmitting the capability message comprises: transmitting the capability message that indicates the capability of the user equipment to monitor the defined number of resources that are channel measurement resources for signal to interference plus noise measurement.

Aspect 3: The method of aspect 2, wherein the signal to interference plus noise measurement is a layer one signal to interference plus noise ratio measurement of a channel measurement resource of the plurality of resources.

Aspect 4: The method of aspect 1, wherein transmitting the capability message comprises: transmitting the capability message that indicates the capability of the user equipment to monitor the defined number of resources that are interference measurement resources for signal to interference plus noise measurement.

Aspect 5: The method of aspect 4, wherein the signal to interference plus noise measurement is a layer one signal to interference plus noise ratio measurement of an interference measurement resource of the plurality of resources.

Aspect 6: The method of any of aspects 1 through 5, wherein transmitting the capability message comprises: transmitting the capability message that indicates the capability of the user equipment to monitor the defined number of resources or a maximum number of resources within the transmission time interval.

Aspect 7: The method of any of aspects 1 through 6, wherein transmitting the capability message comprises: transmitting the capability message that indicates the capability of the user equipment to monitor the defined number of resources that are reference signal resources, synchronization signal block resources, or both.

Aspect 8: The method of any of aspects 1 through 7, wherein transmitting the capability message comprises: transmitting the capability message that indicates the capability of the user equipment to monitor the defined number of resources across the plurality of component carriers that are a plurality of serving component carriers in a plurality of frequency bands.

Aspect 9: The method of any of aspects 1 through 7, wherein transmitting the capability message comprises: transmitting the capability message that indicates the capability of the user equipment to monitor the defined number of resources across the plurality of component carriers that are a plurality of serving component carriers in a cell group.

Aspect 10: The method of any of aspects 1 through 7, wherein transmitting the capability message comprises: transmitting the capability message that indicates the capability of the user equipment to monitor the defined number of resources across the plurality of component carriers that are a plurality of serving component carriers in a single frequency band.

Aspect 11: The method of any of aspects 1 through 10, wherein transmitting the capability message comprises: transmitting the capability message that indicates the capability of the user equipment to monitor the defined number of resources across the plurality of component carriers within the transmission time interval that is a slot.

Aspect 12: The method of any of aspects 1 through 11, wherein the transmission time interval is a slot and a duration of the slot is based at least in part on a numerology of at least one component carrier of the plurality of component carriers.

Aspect 13: The method of any of aspects 1 through 12, wherein transmitting the capability message comprises: transmitting the capability message that indicates the capability of the user equipment to monitor the defined number of resources that comprise one or more new beam identification resources.

Aspect 14: The method of any of aspects 1 through 13, wherein transmitting the capability message comprises: transmitting the capability message that indicates the capability of the user equipment to monitor the defined number of resources that comprise one or more reference signal resources for reference signal receive power measurement, one or more reference signal resources for signal to interference plus noise measurement, one or more reference signal resources for beam failure detection, one or more reference signal resources for radio link monitoring, one or more reference signal resources for link quality monitoring, one or more reference signal resources for channel state information measurement, or any combination thereof.

Aspect 15: A method for wireless communications by a base station, comprising: receiving a capability message that indicates a capability of a user equipment to monitor a defined number of resources across a plurality of component carriers within a transmission time interval; transmitting a monitoring configuration that indicates a plurality of resources for the user equipment to monitor in one or more component carriers within the transmission time interval based at least in part on the capability message; and transmitting, within the transmission time interval, a plurality of reference signals within the plurality of resources indicated in the monitoring configuration.

Aspect 16: The method of aspect 15, wherein receiving the capability message comprises: receiving the capability message that indicates the capability of the user equipment to monitor the defined number of resources that are channel measurement resources for signal to interference plus noise measurement.

Aspect 17: The method of aspect 15, wherein receiving the capability message comprises: receiving the capability message that indicates the capability of the user equipment to monitor the defined number of resources that are interference measurement resources for signal to interference plus noise measurement.

Aspect 18: The method of any of aspects 15 through 17, wherein receiving the capability message comprises: receiving the capability message that indicates the capability of the user equipment to monitor the defined number of resources that are reference signal resources, synchronization signal block resources, or both.

Aspect 19: The method of any of aspects 15 through 18, wherein receiving the capability message comprises: receiving the capability message that indicates the capability of the user equipment to monitor the defined number of resources across the plurality of component carriers that are a plurality of serving component carriers in a plurality of frequency bands.

Aspect 20: The method of any of aspects 15 through 18, wherein receiving the capability message comprises: receiving the capability message that indicates the capability of the user equipment to monitor the defined number of resources across the plurality of component carriers that are a plurality of serving component carriers in a cell group.

Aspect 21: The method of any of aspects 15 through 18, wherein receiving the capability message comprises: receiving the capability message that indicates the capability of the user equipment to monitor the defined number of resources across the plurality of component carriers that are a plurality of serving component carriers in a single frequency band.

Aspect 22: The method of any of aspects 15 through 21, wherein receiving the capability message comprises: receiving the capability message that indicates the capability of the user equipment to monitor the defined number of resources across the plurality of component carriers and a component carrier list that identifies the plurality of component carriers.

Aspect 23: The method of any of aspects 15 through 22, wherein receiving the capability message comprises: receiving the capability message that indicates the capability of the user equipment to monitor the defined number of resources across the plurality of component carriers within the transmission time interval that is a slot.

Aspect 24: The method of any of aspects 15 through 23, wherein the transmission time interval is a slot and a duration of the slot is based at least in part on a numerology of at least one component carrier of the plurality of component carriers.

Aspect 25: The method of any of aspects 15 through 24, wherein the defined number of resources are beam resources.

Aspect 26: The method of any of aspects 15 through 25, further comprising: transmitting a measurement report indicating at least one measurement of at least one channel state information measurement reference signal resource of the plurality of resources within the transmission time interval based at least in part on the monitoring.

Aspect 27: The method of aspect 26, wherein transmitting the measurement report comprises: transmitting the measurement report indicating the at least one measurement that is a layer one reference signal receive power measurement, a layer one signal to interference plus noise ratio measurement of a channel measurement resource of the plurality of resources, a layer one signal to interference plus noise ratio measurement of an interference measurement resource of the plurality of resources, or any combination thereof.

Aspect 28: The method of any of aspects 15 through 27, wherein receiving the capability message comprises: receiving the capability message that indicates the capability of the user equipment to monitor the defined number of resources that comprise one or more reference signal resources for reference signal receive power measurement, one or more reference signal resources for signal to interference plus noise measurement, one or more reference signal resources for beam failure detection, one or more reference signal resources for radio link monitoring, one or more reference signal resources for link quality monitoring, one or more reference signal resources for channel state information measurement, or any combination thereof.

Aspect 29: An apparatus for wireless communications by a user equipment comprising a processor and memory coupled to the processor, the processor and memory configured to perform a method of any of aspects 1 through 14.

Aspect 30: An apparatus for wireless communications by a user equipment comprising at least one means for performing a method of any of aspects 1 through 14.

Aspect 31: A non-transitory computer-readable medium storing code for wireless communications by a user equipment the code comprising instructions executable by a processor to perform a method of any of aspects 1 through 14.

Aspect 32: An apparatus for wireless communications by a base station comprising a processor and memory coupled to the processor, the processor and memory configured to perform a method of any of aspects 15 through 28.

Aspect 33: An apparatus for wireless communications by a base station comprising at least one means for performing a method of any of aspects 15 through 28.

Aspect 34: A non-transitory computer-readable medium storing code for wireless communications by a base station the code comprising instructions executable by a processor to perform a method of any of aspects 15 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment, comprising:

transmitting a capability message that indicates a capability of the user equipment to monitor a maximum quantity of time and frequency resources across a plurality of component carriers within a slot, the time and frequency resources comprising channel measurement resources, interference measurement resources, or both for signal to interference plus noise measurement, wherein a duration of the slot to which the capability of the user equipment applies corresponds to a highest numerology from among a plurality of numerologies associated with the plurality of component carriers;

receiving a monitoring configuration that indicates a plurality of time and frequency resources for the user equipment to monitor in one or more component carriers within the slot, wherein a quantity of the plurality of time and frequency resources for the user equipment to monitor within the slot is based at least in part on the maximum quantity of time and frequency resources indicated via the capability message; and monitoring, within the slot, the plurality of time and frequency resources indicated in the monitoring configuration.

2. The method of claim 1, wherein receiving the monitoring configuration comprises:

receiving the monitoring configuration that indicates the interference measurement resources for the signal to interference plus noise measurement, the interference measurement resources based at least in part on the maximum quantity of time and frequency resources indicated via the capability message.

3. The method of claim 1, wherein the signal to interference plus noise measurement is a layer one signal to interference plus noise ratio measurement of a channel measurement resource of the plurality of time and frequency resources.

4. The method of claim 1, wherein the interference measurement resources are channel state information interference measurement resources for the signal to interference plus noise measurement.

5. The method of claim 1, wherein the signal to interference plus noise measurement is a layer one signal to interference plus noise ratio measurement of an interference measurement resource of the plurality of time and frequency resources.

6. The method of claim 1, wherein transmitting the capability message comprises:
transmitting the capability message that indicates the capability of the user equipment to monitor a defined quantity of time and frequency resources within the slot.

7. The method of claim 1, wherein the time and frequency resources comprise reference signal resources, synchronization signal block resources, or both.

8. The method of claim 1, wherein transmitting the capability message comprises:
transmitting the capability message that indicates the capability of the user equipment to monitor the maximum quantity of time and frequency resources across the plurality of component carriers that are a plurality of serving component carriers in a plurality of frequency bands.

9. The method of claim 1, wherein transmitting the capability message comprises:
transmitting the capability message that indicates the capability of the user equipment to monitor the maximum quantity of time and frequency resources across the plurality of component carriers that are a plurality of serving component carriers in a cell group.

10. The method of claim 1, wherein transmitting the capability message comprises:
transmitting the capability message that indicates the capability of the user equipment to monitor the maximum quantity of time and frequency resources across the plurality of component carriers that are a plurality of serving component carriers in a single frequency band.

11. The method of claim 1, wherein transmitting the capability message comprises:
transmitting the capability message that indicates the capability of the user equipment to monitor the maximum quantity of time and frequency resources across the plurality of component carriers within the slot.

12. The method of claim 1, wherein transmitting the capability message comprises:
transmitting the capability message that indicates the capability of the user equipment to monitor the maximum quantity of time and frequency resources that comprise one or more new beam identification resources.

13. The method of claim 1, wherein the time and frequency resources comprise one or more reference signal resources for reference signal receive power measurement, one or more reference signal resources for signal to interference plus noise measurement, one or more reference signal resources for beam failure detection, one or more reference signal resources for radio link monitoring, one or more reference signal resources for link quality monitoring, one or more reference signal resources for channel state information measurement, or any combination thereof.

14. The method of claim 1, wherein the capability message indicates a second capability of the user equipment to monitor a defined quantity of unique beams across the plurality of component carriers.

15. A method for wireless communications by a network device, comprising:
receiving a capability message that indicates a capability of a user equipment to monitor a maximum quantity of time and frequency resources across a plurality of component carriers within a slot, the time and frequency resources comprising channel measurement resources, interference measurement resources, or both for signal to interference plus noise measurement, wherein a duration of the slot to which the capability of the user equipment applies corresponds to a highest numerology from among a plurality of numerologies associated with the plurality of component carriers;
transmitting a monitoring configuration that indicates a plurality of time and frequency resources for the user equipment to monitor in one or more component carriers within the slot, wherein a quantity of the plurality of time and frequency resources for the user equipment to monitor within the slot is based at least in part on the maximum quantity of time and frequency resources indicated via the capability message; and
transmitting, within the slot, a plurality of reference signals within the plurality of time and frequency resources indicated in the monitoring configuration.

16. The method of claim 15, wherein transmitting the monitoring configuration comprises:
transmitting the monitoring configuration that indicates the interference measurement resources for the signal to interference plus noise measurement, the interference measurement resources based at least in part on the maximum quantity of time and frequency indicated via the capability message.

17. The method of claim 15, wherein the interference measurement resources are channel state information interference measurement resources for the signal to interference plus noise measurement.

18. The method of claim 15, wherein the time and frequency resources comprise reference signal resources, synchronization signal block resources, or both.

19. The method of claim 15, wherein receiving the capability message comprises:
receiving the capability message that indicates the capability of the user equipment to monitor the maximum quantity of time and frequency resources across the plurality of component carriers that are a plurality of serving component carriers in a plurality of frequency bands.

20. The method of claim 15, wherein receiving the capability message comprises:
receiving the capability message that indicates the capability of the user equipment to monitor the maximum quantity of time and frequency resources across the plurality of component carriers that are a plurality of serving component carriers in a cell group.

21. The method of claim 15, wherein receiving the capability message comprises:
receiving the capability message that indicates the capability of the user equipment to monitor the maximum quantity of time and frequency resources across the plurality of component carriers that are a plurality of serving component carriers in a single frequency band.

22. The method of claim 15, wherein receiving the capability message comprises:

receiving the capability message that indicates the capability of the user equipment to monitor the maximum quantity of time and frequency resources across the plurality of component carriers and a component carrier list that identifies the plurality of component carriers.

23. The method of claim 15, wherein receiving the capability message comprises:
receiving the capability message that indicates the capability of the user equipment to monitor the maximum quantity of time and frequency resources across the plurality of component carriers within the slot.

24. The method of claim 15, wherein the capability message indicates a second capability of the user equipment to monitor a defined quantity of unique beams across the plurality of component carriers.

25. The method of claim 15, further comprising:
receiving a measurement report indicating at least one measurement of at least one channel state information measurement reference signal resource of the plurality of time and frequency resources within the slot.

26. The method of claim 25, wherein receiving the measurement report comprises:
receiving the measurement report indicating the at least one measurement that is a layer one reference signal receive power measurement, a layer one signal to interference plus noise ratio measurement of a channel measurement resource of the plurality of time and frequency resources, a layer one signal to interference plus noise ratio measurement of an interference measurement resource of the plurality of time and frequency resources, or any combination thereof.

27. An apparatus for wireless communications by a user equipment, comprising:
one or more processors; and
one or more memories coupled with the one or more processors, the one or more memories comprising instructions executable by the one or more processors individually or collectively to cause the apparatus to:
transmit a capability message that indicates a capability of the user equipment to monitor a maximum quantity of time and frequency resources across a plurality of component carriers within a slot, the time and frequency resources comprising channel measurement resources, interference measurement resources, or both for signal to interference plus noise measurement, wherein a duration of the slot to which the capability of the user equipment applies corresponds to a highest numerology from among a plurality of numerologies associated with the plurality of component carriers;
receive a monitoring configuration that indicates a plurality of time and frequency resources for the user equipment to monitor in one or more component carriers within the slot, wherein a quantity of the plurality of time and frequency resources for the user equipment to monitor within the slot is based at least in part on the maximum quantity of time and frequency resources indicated via the capability message; and
monitor, within the slot, the plurality of time and frequency resources indicated in the monitoring configuration.

28. An apparatus for wireless communications by a network device, comprising:
one or more processors; and
one or more memories coupled with the one or more processors, the one or more memories comprising instructions executable by the one or more processors individually or collectively to cause the apparatus to:
receive a capability message that indicates a capability of a user equipment to monitor a maximum quantity of time and frequency resources across a plurality of component carriers within a slot, the time and frequency resources comprising channel measurement resources, interference measurement resources, or both for signal to interference plus noise measurement, wherein a duration of the slot to which the capability of the user equipment applies corresponds to a highest numerology from among a plurality of numerologies associated with the plurality of component carriers;
transmit a monitoring configuration that indicates a plurality of time and frequency resources for the user equipment to monitor in one or more component carriers within the slot, wherein a quantity of the plurality of time and frequency resources for the user equipment to monitor within the slot is based at least in part on the maximum quantity of time and frequency resources indicated via the capability message; and
transmit, within the slot, a plurality of reference signals within the plurality of time and frequency resources indicated in the monitoring configuration.

* * * * *